(12) United States Patent
Tang et al.

(10) Patent No.: US 10,663,693 B2
(45) Date of Patent: May 26, 2020

(54) IMAGING OPTICAL LENS ASSEMBLY, IMAGING APPARATUS AND ELECTRONIC DEVICE

(71) Applicant: LARGAN PRECISION CO., LTD., Taichung (TW)

(72) Inventors: Hsiang-Chi Tang, Taichung (TW); Chun-Che Hsueh, Taichung (TW); Chun-Yen Chen, Taichung (TW); Yu-Tai Tseng, Taichung (TW); Wei-Yu Chen, Taichung (TW)

(73) Assignee: LARGAN PRECISION CO., LTD., Taichung (TW)

(*) Notice: Subject to any disclaimer, the term of this patent is extended or adjusted under 35 U.S.C. 154(b) by 0 days.

(21) Appl. No.: 16/026,370

(22) Filed: Jul. 3, 2018

(65) Prior Publication Data

US 2019/0227277 A1    Jul. 25, 2019

(30) Foreign Application Priority Data

Jan. 25, 2018  (TW) .............................. 107102696 A

(51) Int. Cl.
  *G02B 13/00* (2006.01)
  *G02B 9/64* (2006.01)

(52) U.S. Cl.
  CPC ........... *G02B 13/0045* (2013.01); *G02B 9/64* (2013.01)

(58) Field of Classification Search
  CPC .............................. G02B 13/0045; G02B 9/64
  USPC ....................................................... 359/708
  See application file for complete search history.

(56) References Cited

U.S. PATENT DOCUMENTS

| 9,671,591 | B2 | 6/2017 | Chen |
| 2015/0268448 | A1 | 9/2015 | Kubota et al. |
| 2015/0378131 | A1 | 12/2015 | Tang et al. |
| 2016/0299319 | A1* | 10/2016 | Tang ................... G02B 9/64 |
| 2016/0306140 | A1 | 10/2016 | Chen |
| 2018/0180855 | A1 | 6/2018 | Baik et al. |

FOREIGN PATENT DOCUMENTS

| CN | 106908931 A | 6/2017 |
| CN | 107577034 A | 1/2018 |
| CN | 107678135 A | 2/2018 |
| CN | 107797239 A | 3/2018 |
| CN | 107797254 A | 3/2018 |
| CN | 107918195 A | 4/2018 |
| CN | 108121055 A | 6/2018 |
| JP | 2012155223 | 8/2012 |
| JP | 2015072403 | 4/2015 |

* cited by examiner

*Primary Examiner* — Nicholas R. Pasko
*Assistant Examiner* — Mitchell T Oestreich
(74) *Attorney, Agent, or Firm* — Locke Lord LLP; Tim Tingkang Xia, Esq.

(57) ABSTRACT

An imaging optical lens assembly includes seven lens elements, the seventh lens elements being, in order from an object side to an image side: a first lens element, a second lens element, a third lens element, a fourth lens element, a fifth lens element, a sixth lens element, and a seventh lens element. The first lens element with positive refractive power has an object-side surface being convex in a paraxial region thereof. The second lens element has negative refractive power. The seventh lens element has an image-side surface being concave in a paraxial region thereof and having a critical point in an off-axis region thereof. The image-side surface and an object-side surface of the seventh lens element are both aspheric.

30 Claims, 22 Drawing Sheets

IMAGING OPTICAL LENS ASSEMBLY, IMAGING APPARATUS AND ELECTRONIC DEVICE

RELATED APPLICATIONS

This application claims priority to Taiwan Application Serial Number 107102696, filed on Jan. 25, 2018, which is incorporated by reference herein in its entirety.

BACKGROUND

Technical Field

The present disclosure relates to an imaging optical lens assembly and an imaging apparatus, and more particularly, to an imaging optical lens assembly and an imaging apparatus applicable to electronic devices.

Description of Related Art

As semi-conductor manufacturing technology advances, the performance of image sensors has improved along with smaller pixels. Hence, optical lenses with high image quality are becoming an indispensable part of the specification of modem electronic devices. Given the rapid development of technologies, applications of electronic devices with an optical lens imaging apparatus are expanding tremendously and the demands for optical lenses have diversified. It is difficult for conventional optical lenses to obtain a good balance among imaging quality, sensitivity, aperture size, volume, and field of view, this present application provides an imaging optical lens assembly aiming to meet the aforementioned requirements.

SUMMARY

According to the present disclosure, an imaging optical lens assembly includes seven lens elements, the seven lens elements being, in order from an object side to an image side: a first lens element, a second lens element, a third lens element, a fourth lens element, a fifth lens element, a sixth lens element, and a seven lens element. The first lens element with positive refractive power has an object-side surface being convex in a paraxial region thereof. The second lens element has negative refractive power. The seventh lens element has an image-side surface being concave in a paraxial region thereof and having at least one critical point in an off-axis region thereof, wherein the image-side surface and an object-side surface of the seventh lens element are both aspheric. An Abbe number of the second lens element is V2, an Abbe number of the third lens element is V3, a focal length of the imaging optical lens assembly is f, a curvature radius of an object-side surface of the third lens element is R5, a curvature radius of an image-side surface of the fifth lens element is R10, an axial distance between the fourth lens element and the fifth lens element is T45, an axial distance between the sixth lens element and the seventh lens element is T67, an axial distance between the object-side surface of the first lens element and an image surface is TL, a maximum image height of the imaging optical lens assembly is ImgH, and the following conditions are satisfied:

$V2+V3 \leq 60$;

$0 \leq f/R5$;

$0 \leq f/R10$;

$T67/T45<8.0$; and $TL/ImgH<1.80$.

According to another aspect of the present disclosure, an imaging apparatus includes the aforementioned imaging optical lens assembly and an image sensor.

According to another aspect of the present disclosure, an electronic device includes the aforementioned imaging apparatus.

According to another aspect of the present disclosure, an imaging optical lens assembly includes seven lens elements, the seven lens elements being, in order from an object side to an image side: a first lens element, a second lens element, a third lens element, a fourth lens element, a fifth lens element, a sixth lens element, and a seventh lens element. The first lens element with positive refractive power has an object-side surface being convex in a paraxial region thereof; the second lens element has negative refractive power; the seventh lens element has an object-side surface being convex in a paraxial region thereof, an image-side surface being concave in a paraxial region thereof and having at least one critical point in an off-axis region thereof, wherein the image-side surface and the object-side surface of the seventh lens element are both aspheric. An Abbe number of the second lens element is V2, an Abbe number of the third lens element is V3, a focal length of the imaging optical lens assembly is f, a curvature radius of the object-side surface of the third lens element is R5, a curvature radius of the image-side surface of the fifth lens element is R10, and the following conditions are satisfied:

$V2+V3 \leq 70$;

$0 \leq f/R5$; and $0 \leq f/R10$.

DETAILED DESCRIPTION

Figure 1A:
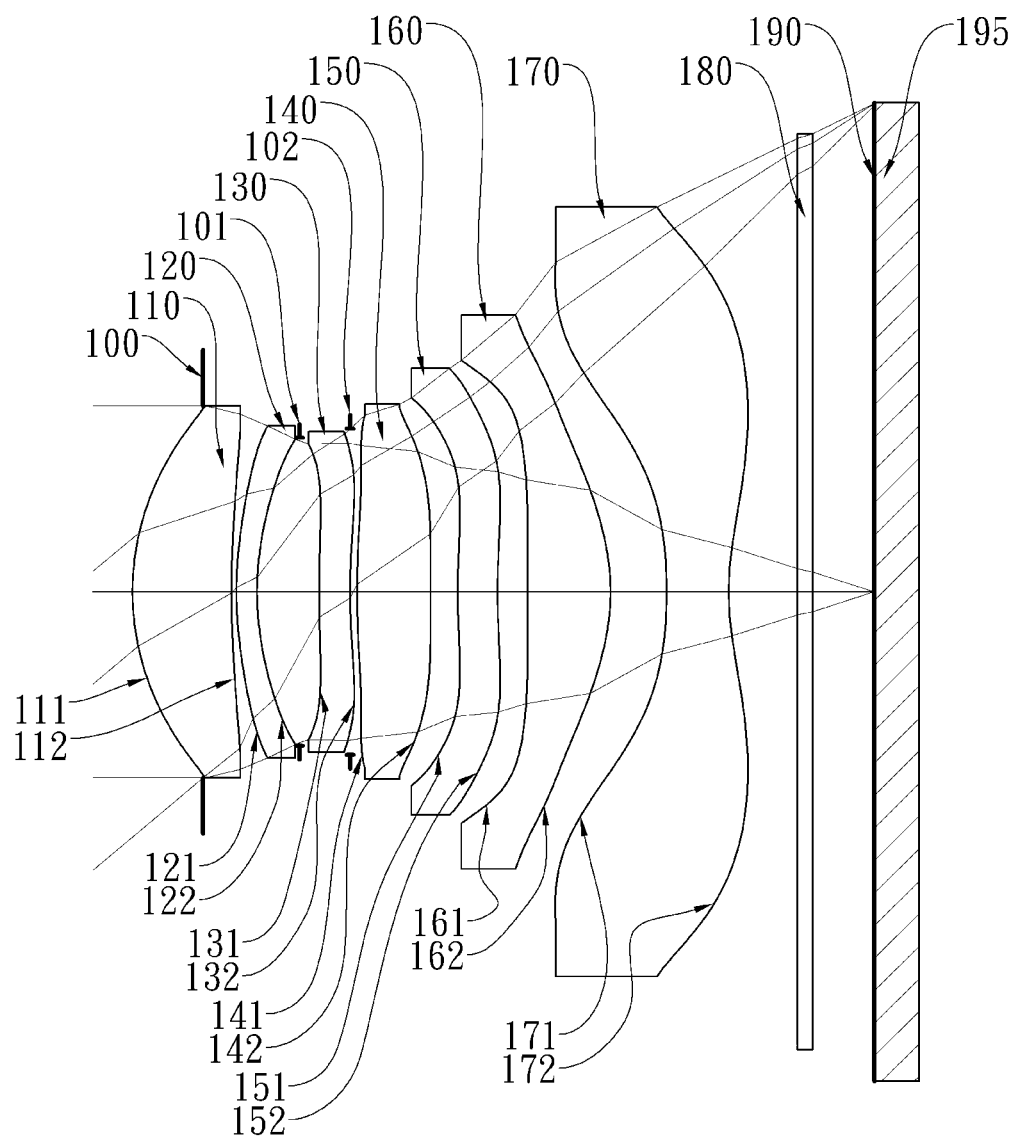
FIG. 1A is a schematic view of an imaging apparatus according to the 1st embodiment of the present disclosure.

The present disclosure provides an imaging optical lens assembly, including seven lens elements. The seven lens elements are, from an object side to an image side, a first lens element, a second lens element, a third lens element, a fourth lens element, a fifth lens element, a sixth lens element and a seventh lens element.

The first lens element has positive refractive power for favorably shortening the total track length and an object-side surface being convex in a paraxial region thereof, which can further enhance the converging power of the first lens element.

The second lens element has negative refractive power, which can balance spherical aberration and chromatic aberration caused by the first lens element. The second lens element may have an object-side surface being convex in a paraxial region thereof and an image-side surface being concave in a paraxial region thereof, which is favorable for correcting astigmatisms.

The third lens element may have an image-side surface being concave in a paraxial region thereof and at least one critical point in an off-axis region to correct aberrations in the off-axis region.

The fourth lens element may have an image-side surface being convex in a paraxial region to reduce surface reflection of surrounding light and to enhance illumination on an image surface.

The sixth lens element may have positive refractive power, which can balance the distribution of refractive power of the imaging optical lens assembly for reducing aberrations and sensitivity.

The seventh lens element has an image-side surface being concave in a paraxial region thereof, which can move the principal point toward the object side to reduce the back focal length and total length. The image-side surface of the seventh lens element may have at least one critical point in an off-axis region, which can further correct aberrations in the off-axis region and reduce the surface reflection from surrounding light for enhancing illumination on the image surface. In addition, the seventh lens element may have an object-side surface being convex in a paraxial region, which is favorable for correcting the off-axis field curvature and enhancing peripheral image quality.

An Abbe number of the second lens element is V2, an Abbe number of the third lens element is V3. When the following condition is satisfied: V2+V3≤70, it is favorable for enhancing the capacity of correcting chromatic aberrations and balancing the overall aberration corrections of the imaging optical lens assembly. Preferably, the following condition may be satisfied: V2+V3≤60. More preferably, the following condition may be satisfied: 20<V2+V3<50.

A focal length of the imaging optical lens assembly is f, and a curvature radius of an object-side surface of the third lens element is R5. When the following condition is satisfied: 0≤f/R5, it is favorable for correcting aberrations generated by the first lens element and the second lens element while further enhancing the image quality of the image center.

The focal length of the imaging optical lens assembly is f, and a curvature radius of an image-side surface of the fifth lens element is R10. When the following condition is satisfied: 0≤f/R10, it is favorable for reducing the manufacturing sensitivity of the fifth lens element and moving the principal point of the imaging optical lens assembly toward the object side to reduce the back focal length.

An axial distance between the fourth lens element and the fifth lens element is T45, an axial distance between the sixth lens element and the seventh lens element is T67. When the following condition is satisfied: T67/T45<8.0, it is favorable for allocating proper axial distances between every adjacent lens elements.

An axial distance between the first element and the image surface is TL, and a maximum image height of the imaging optical lens assembly is ImgH. When the following condition is satisfied: TL/ImgH<1.80, it is favorable for providing proper angles of view and the total track length. Preferably, the following condition is satisfied: 1.0<TL/ImgH<1.60.

A vertical distance between the convex critical point farthest away from the optical axis within a maximum effective diameter of an image-side surface of the sixth lens element and the optical axis is Yc62 (if the critical point is located on the optical axis, Yc62 is 0). A vertical distance between the convex critical point farthest away from the optical axis within a maximum effective diameter of the image-side surface of the seventh lens element and the optical axis is Yc72 (if the critical point is located on the optical axis, Yc72 is 0). When the following condition is satisfied: 0.20<Yc62/Yc72<1.70, it is favorable for further enhancing aberration corrections of peripheral images.

A central thickness of the second lens element is CT2, a central thickness of the third lens element is CT3, and a central thickness of the fourth lens element is CT4. When the following condition is satisfied: 0.75<CT4/(CT2+CT3)<2.5, it is favorable for configuring a thinner thickness of the fourth lens element so as to improve the overall structure of the imaging optical lens assembly.

An Abbe number of the first lens element is V1. When the imaging optical lens assembly satisfies the following condition: 50<V1, it is favorable for providing proper color dispersion and to reduce system aberrations.

An Abbe number of one lens elements is V and a refractive index of the said lens element is N. When the following condition is satisfied: at least one lens element satisfies 8.0<V/N<12.5, it is favorable for enhancing the capacity of correcting chromatic aberration and to further enhance the image quality of peripheral images. Preferably, the following condition is satisfied: 8.0<V/N<12.0.

The focal length of the imaging optical lens assembly is f, and a focal length of the sixth lens element is f6. When the following condition is satisfied: 0.50<f/f6<1.80, it is favorable for avoiding excessive refractive power of the sixth lens element as well as over-correction of aberrations of the central image.

An axial distance between the first lens element and the second lens element is T12, an axial distance between the second lens element and the third lens element is T23, an axial distance between the third lens element and the fourth lens element is T34, the axial distance between the fourth lens element and the fifth lens element is T45, an axial distance between the fifth lens element and the sixth lens element is T56, and the axial distance between the sixth lens element and the seventh lens element is T67. When the following condition is satisfied: (T12+T34+T45+T56)/(T23+T67)<1.0, it is favorable for space configurations between lens elements and avoiding overly narrow or wide spacing of the lens elements.

A curvature radius of the object-side surface of the sixth lens element is R11, and a curvature radius of the image-side surface of the sixth lens element is R12. When the following condition is satisfied: (R11+R12)/(R11−R12)<0.65, it is favorable for adjusting the shape and the intensity of the refractive power of the seventh lens element so as to avoid drastic variations in the refractive power of the image side of the imaging optical lens assembly that causes excessive or insufficient image corrections.

A maximum effective radius of the object-side surface of the first lens element is Y11, a maximum effective radius of an image-side surface of the first lens element is Y12, a maximum effective radius of the object-side surface of the second lens element is Y21, a maximum effective radius of the image-side surface of the second lens element is Y22, a maximum effective radius of the object-side surface of the third lens element is Y31, a maximum effective radius of the object-side surface of the fourth lens element is Y41, a maximum effective radius of an image-side surface of the fourth lens element is Y42, a maximum effective radius of an object-side surface of an fifth lens element is Y51, a maximum effective radius of the image-side surface of the fifth lens element is Y52, a maximum effective radius of the object-side surface of the sixth lens element is Y61, a maximum effective radius of the image-side surface of the sixth lens element is Y62, a maximum effective radius of the object-side surface of the seventh lens element is Y71, and a maximum effective radius of the image-side surface of the seventh lens element is Y72. When the following conditions are satisfied: Y31/Y11<1.0; Y31/Y12<1.0; Y31/Y21<1.0; Y31/Y22<1.0; Y31/Y41<1.0; Y31/Y42<1.0; Y31/Y51<1.0; Y31/Y52<1.0; Y31/Y61<1.0; Y31/Y62<1.0; Y31/Y71<1.0; and Y31/Y72<1.0, it is favorable for enhancing the adjustment flexibility of peripheral light and properly balancing among image quality, focal depth, and relative illumination, etc.

A total number of the lens elements having an Abbe number less than 25 is V25. When the following condition is satisfied: 3≤V25, it is favorable for eliminating chromatic aberration to enhance the image quality of peripheral images.

An entrance pupil diameter of the imaging optical lens assembly is EPD, the central thickness of the second lens element is CT2, and the central thickness of the third lens element is CT3. When the following condition is satisfied: 4.50<EPD/(CT2+CT3)<9.0, it is favorable for enhancing image quality due to the large aperture of the present disclosure.

The highest refractive index of a lens element among the seven lens elements is Nmax. When the following condition is satisfied: 1.650<Nmax<1.750, it is favorable for eliminating chromatic aberration to further enhance the image quality of peripheral images.

A central thickness of the first lens element is CT1, the central thickness of the second lens element is CT2, the central thickness of the third lens element is CT3, and a central thickness of the fifth lens element is CT5. When the following condition is satisfied: 0.75<CT1/(CT2+CT3+CT5)<2.0, it is favorable for obtaining good image quality and manufacturing structure with high yield rates of the first lens element.

The focal length of the imaging optical lens assembly is f, and a focal length of a lens element of the imaging optical lens assembly is fx. When the following conditions are satisfied: 0.25<(|P2|+|P3|+|P4|+|P5|)/(|P6|+|P7|)<1.0, Px=f/fx, and x=2~7, it is favorable for providing sufficient refractive power on the image side of the imaging optical lens assembly for higher image quality.

An f-number of the imaging optical lens assembly is Fno. When the following condition is satisfied: 1.0<Fno≤1.70, it is favorable for enhancing image quality due to the large aperture of the present disclosure.

Each of the aforementioned features of the imaging optical lens assembly can be utilized in numerous combinations to achieve the corresponding effects.

According to the imaging optical lens assembly of the present disclosure, the lens elements thereof can be made of glass or plastic material. When the lens elements are made of glass material, the distribution of the refractive power of the imaging optical lens assembly may be more flexible to design. When the lens elements are made of plastic material, the manufacturing costs can be effectively reduced. Furthermore, surfaces of each lens element can be arranged to be aspheric (ASP). Since these aspheric surfaces can be easily formed into shapes other than spherical shapes so as to have more control variables for eliminating aberrations and to further decrease the required quantity of lens elements, the total track length of the imaging optical lens assembly can be effectively reduced.

According to the imaging optical lens assembly of the present disclosure, if a surface of a lens element is aspheric, it means that the surface has an aspheric shape throughout its optically effective area, or a portion(s) thereof.

According to the imaging optical lens assembly of the present disclosure, when the lens element has a convex surface and the region of convex shape is not defined, it indicates that the surface can be convex in the paraxial region thereof. When the lens element has a concave surface and the region of concave shape is not defined, it indicates that the surface can be concave in the paraxial region thereof. Likewise, when the region of refractive power or focal length of a lens element is not defined, it indicates that the region of refractive power or focal length of the lens element can be in the paraxial region thereof.

According to the imaging optical lens assembly of the present disclosure, the critical point is a non-axial point on the surface of the lens element where a tangential plane of the point is perpendicular to an optical axis.

According to the imaging optical lens assembly of the present disclosure, the imaging optical lens assembly can include at least one stop, such as an aperture stop, a glare stop or a field stop, to reduce stray light and thereby improving image quality.

According to the imaging optical lens assembly of the present disclosure, the aperture stop can be configured as a front stop or a middle stop. The front stop disposed between an imaged object and the first lens element can provide a longer distance between the exit pupil and the image surface so that there is a telecentric effect for improving the image-sensing efficiency of an image sensor, such as a CCD or CMOS sensor. The middle stop disposed between the first lens element and the image surface is favorable for enlarging the field of view, thereby providing advantages of a wide-angle lens system.

According to the imaging optical lens assembly of the present disclosure, the image surface of the imaging optical lens assembly, based on the corresponding image sensor, can be a plane or a curved surface with an arbitrary curvature, especially a curved surface being concave facing towards the object side. Meanwhile, the imaging optical lens assembly of the present disclosure may optionally include one or more image correction components (such as a field flattener) between the image surface and the nearest lens element to the image surface to improve image corrections (such as field curvature). The optical properties of the image correction components such as curvatures, thicknesses, indices, positions and shapes (convex or concave, spherical or aspheric, diffractive surface and Fresnel surface, etc.) can be adjusted according to the requirement of the imaging apparatus. In general, a preferred image correction component may be a thin plano-concave component having a surface being concave toward the object side and arranged near to the image surface.

According to the above descriptions of the present disclosure, the following 1st-12th specific embodiments are provided for further explanation.

1st Embodiment

Figure 1B:
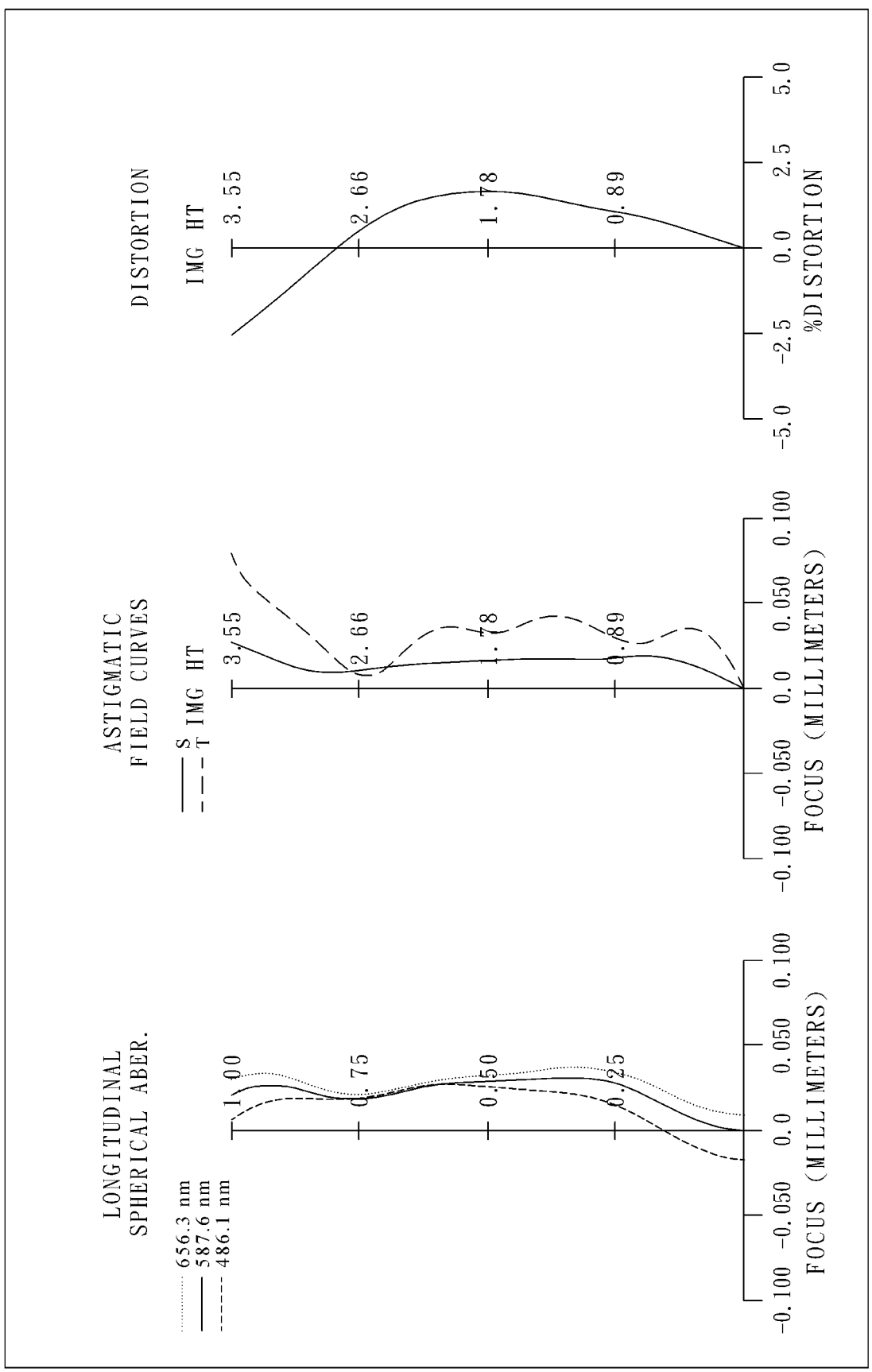
FIG. 1B shows aberration curves of the imaging apparatus according to the 1st embodiment of the present disclosure.

FIG. 1A is a schematic view of an imaging apparatus according to the 1st embodiment of the present disclosure. FIG. 1B shows, in order from left to right, longitudinal spherical aberration curves, astigmatic field curves and a distortion curve of the imaging apparatus according to the 1st embodiment.

In FIG. 1A, the imaging apparatus includes an imaging optical lens assembly (not otherwise herein labeled) of the present disclosure and an image sensor 195. The imaging optical lens assembly includes, in order from an object side to an image side: an aperture stop 100, a first lens element 110, a second lens element 120, a stop 101, a third lens element 130, a stop 102, a fourth lens element 140, a fifth lens element 150, a sixth lens element 160, a seventh lens element 170, an IR cut filter 180, and an image surface 190. The image sensor 195 is disposed on or near the image surface 190 of the imaging optical lens assembly. The optical image capturing lens assembly includes seven lens elements (110, 120, 130, 140, 150, 160 and 170) with no additional lens element disposed between the first lens element 110 and the seventh lens element 170.

The first lens element 110 with positive refractive power has an object-side surface 111 being convex in a paraxial region thereof and an image-side surface 112 being concave in a paraxial region thereof, which are both aspheric, and the first lens element 110 is made of plastic material.

The second lens element 120 with negative refractive power has an object-side surface 121 being convex in a paraxial region thereof and an image-side surface 122 being concave in a paraxial region thereof, which are both aspheric, and the second lens element 120 is made of plastic material.

The third lens element 130 with negative refractive power has an object-side surface 131 being convex in a paraxial region thereof and an image-side surface 132 being concave in a paraxial region thereof, which are both aspheric, and the third lens element 130 is made of plastic material. Moreover, the image-side surface 132 has at least one critical point in an off-axis region thereof.

The fourth lens element 140 with positive refractive power has an object-side surface 141 being convex in a paraxial region thereof and an image-side surface 142 being plano in a paraxial region thereof, which are both aspheric, and the fourth lens element 140 is made of plastic material.

The fifth lens element 150 with positive refractive power has an object-side surface 151 being convex in a paraxial region thereof, an image-side surface 152 being concave in a paraxial region thereof, which are both aspheric, and the fifth lens element 150 is made of plastic material.

The sixth lens element 160 with positive refractive power has an object-side surface 161 being concave in a paraxial region thereof and an image-side surface 162 being convex in a paraxial region thereof, which are both aspheric, and the sixth lens element 160 is made of plastic material.

The seventh lens element 170 with negative refractive power has an object-side surface 171 being concave in a paraxial region thereof and an image-side surface 172 being concave in a paraxial region thereof, which are both aspheric, and the seventh lens element 170 is made of plastic material. Moreover, the image-side surface 172 has at least one critical point in an off-axis region thereof.

The IR cut filter 180 is disposed between the seventh lens element 170 and the image surface 190. Furthermore, the IR cut filter 180 is made of glass material and will not affect the focal length of the imaging optical lens assembly.

The detailed optical data of the 1st embodiment are shown in TABLE 1, and the aspheric surface data are shown in TABLE 2. The units of a curvature radius, a thickness, and a focal length are expressed in mm. HFOV is half of the maximal field of view. Surfaces #1 to #14 refer to the surfaces in order from the object side to the image side. The aspheric surface data are shown in TABLE 2, wherein k is the conic coefficient in the equation of the aspheric surface profiles, and A4-A16 refer to the 4th to 16th order aspheric coefficients.

Further, it should be noted that the tables shown in each of the following embodiments are associated with the schematic view and diagrams of longitudinal spherical aberration curves, astigmatic field curves and a distortion curve for the respective embodiment. Also, the definitions of the parameters presented in later tables are the same as those of the parameters presented in TABLE 1 and TABLE 2 for the 1st embodiment. Explanations in this regard will not be provided again.

TABLE 1

(1st Embodiment)
f = 4.33 mm, Fno = 1.60, HFOV = 40.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.513 | | | | |
| 2 | Lens 1 | 1.919 | ASP | 0.719 | Plastic | 1.545 | 56.0 | 4.68 |
| 3 | | 6.750 | ASP | 0.036 | | | | |
| 4 | Lens 2 | 2.858 | ASP | 0.150 | Plastic | 1.688 | 18.7 | −16.36 |

TABLE 1-continued (1st Embodiment)
f = 4.33 mm, Fno = 1.60, HFOV = 40.0 deg.

| Surface # | | Curvature Radius | | Thickness | Material | Index | Abbe # | Focal Length |
|---|---|---|---|---|---|---|---|---|
| 5 | | 2.231 | ASP | 0.308 | | | | |
| 6 | Stop 1 | Plano | | 0.144 | | | | |
| 7 | Lens 3 | 9.034 | ASP | 0.224 | Plastic | 1.688 | 18.7 | −14.76 |
| 8 | | 4.733 | ASP | −0.001 | | | | |
| 9 | Stop 2 | Plano | | 0.052 | | | | |
| 10 | Lens 4 | 6.497 | ASP | 0.535 | Plastic | 1.544 | 55.9 | 11.95 |
| 11 | | ∞ | ASP | 0.196 | | | | |
| 12 | Lens 5 | 4.951 | ASP | 0.289 | Plastic | 1.688 | 18.7 | 173.55 |
| 13 | | 5.042 | ASP | 0.220 | | | | |
| 14 | Lens 6 | −100.000 | ASP | 0.601 | Plastic | 1.555 | 47.5 | 2.91 |
| 15 | | −1.592 | ASP | 0.408 | | | | |
| 16 | Lens 7 | −3.433 | ASP | 0.450 | Plastic | 1.534 | 55.9 | −2.27 |
| 17 | | 1.954 | ASP | 0.500 | | | | |
| 18 | IR cut filter | Plano | | 0.110 | Glass | 1.517 | 64.2 | — |
| 19 | | Plano | | 0.450 | | | | |
| 20 | Image surface | Plano | | — | | | | |

Note:
Reference wavelength is d-line 587.6 nm
The effective radius of Surface 6 is 1.120 mm
The effective radius of Surface 9 is 1.187 mm
The effective radius of Surface 13 is 1.625 mm

TABLE 2

Aspheric Coefficients

| Surface # | 2 | 3 | 4 | 5 | 7 |
|---|---|---|---|---|---|
| k = | −2.7269E−01 | 1.8591E+01 | 1.2322E+00 | 9.7742E−01 | −3.3508E+01 |
| A4 = | 1.4724E−03 | −6.1446E−02 | −8.9537E−02 | −4.9163E−02 | −7.9070E−02 |
| A6 = | 1.6635E−02 | 5.4127E−02 | 5.2599E−02 | −2.8628E−03 | 1.1280E−01 |
| A8 = | −3.9918E−02 | −3.6821E−02 | −2.2692E−02 | 2.1786E−02 | −4.8312E−01 |
| A10 = | 5.2301E−02 | 1.3832E−02 | 4.1910E−02 | 1.1852E−02 | 8.8741E−01 |
| A12 = | −3.8923E−02 | −4.7445E−03 | −5.4103E−02 | −3.3899E−02 | −9.2680E−01 |
| A14 = | 1.5241E−02 | 1.8974E−03 | 3.1954E−02 | 1.6077E−02 | 4.9878E−01 |
| A16 = | −2.5419E−03 | −6.0894E−04 | −6.6397E−03 | | −1.0612E−01 |

| Surface # | 8 | 10 | 11 | 12 | 13 |
|---|---|---|---|---|---|
| k = | −7.5778E+01 | 1.9679E+01 | −1.0000E+00 | 8.7790E+00 | −1.9314E+01 |
| A4 = | −1.8508E−02 | −7.9928E−02 | −1.0702E−01 | −1.6718E−01 | −9.5019E−02 |
| A6 = | 3.0689E−02 | 1.4924E−01 | 2.9233E−02 | −3.8815E−02 | −6.9549E−02 |
| A8 = | −3.0085E−01 | −3.3161E−01 | 3.1597E−02 | 1.7074E−01 | 1.4119E−01 |
| A10 = | 4.5550E−01 | 3.0464E−01 | −1.3060E−01 | −2.7660E−01 | −1.4234E−01 |
| A12 = | −3.7252E−01 | −1.1982E−01 | 1.4613E−01 | 2.1523E−01 | 7.9487E−02 |
| A14 = | 1.7505E−01 | 1.7315E−02 | −7.0688E−02 | −7.7553E−02 | −2.1838E−02 |
| A16 = | −3.5198E−02 | | 1.3094E−02 | 1.0271E−02 | 2.2891E−03 |

| Surface # | 14 | 15 | 16 | 17 |
|---|---|---|---|---|
| k = | 9.0000E+01 | −1.3809E+01 | −1.9257E+00 | −1.1874E+01 |
| A4 = | 6.7959E−03 | −2.2394E−01 | −1.1706E−01 | −7.3603E−02 |
| A6 = | −7.6086E−02 | 3.9080E−01 | 6.6366E−02 | 3.6729E−02 |
| A8 = | 7.0663E−02 | −4.8117E−01 | −4.4094E−02 | −1.6059E−02 |
| A10 = | −3.7321E−02 | 3.9782E−01 | 2.6130E−02 | 5.1846E−03 |
| A12 = | 1.3235E−02 | −2.0726E−01 | −9.2077E−03 | −1.1872E−03 |
| A14 = | −4.2692E−03 | 6.6431E−02 | 1.9133E−03 | 1.8367E−04 |
| A16 = | 8.0196E−04 | −1.2699E−02 | −2.3510E−04 | −1.8159E−05 |
| A18 = | −3.8263E−05 | 1.3296E−03 | 1.5942E−05 | 1.0334E−06 |
| A20 = | | −5.8775E−05 | −4.6245E−07 | −2.5577E−08 |

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

where:
X is the relative distance between a point on the aspheric surface spaced at a distance Y from the optical axis and the tangential plane at the aspheric surface vertex on the optical axis;
Y is the vertical distance from the point on the aspheric surface profile to the optical axis;
R is the curvature radius;

k is the conic coefficient; and

Ai is the i-th aspheric coefficient.

In the 1st embodiment, the focal length of the imaging optical lens assembly is f, an f-number of the imaging optical lens assembly is Fno, half of a maximal field of view of the imaging optical lens assembly is HFOV, and these parameters have the following values: f=4.33 mm; Fno=1.60; and HFOV=40.0 degrees.

In the 1st embodiment, a total number of the lens elements having an Abbe number less than 25 is V25, and they satisfy the condition: V25=3.

In the 1st embodiment, an Abbe number of the second lens element 120 is V2, an Abbe number of the third lens element 130 is V3, and they satisfy the condition: V2+V3=37.40.

In the 1st embodiment, a highest refractive index among those of the seven lens elements is Nmax, and it satisfies the condition: Nmax=1.69.

In the 1st embodiment, an Abbe number of the first lens element 110 is V1, a refractive index of the first lens element 110 is N1, and they satisfy the condition: V1=56.0, V1/N1=36.27.

In the 1st embodiment, an Abbe number of the second lens element 120 is V2, a refractive index of the second lens element 120 is N2, and they satisfy the condition: V2/N2=11.08.

In the 1st embodiment, an Abbe number of the third lens element 130 is V3, a refractive index of the third lens element 130 is N3, and they satisfy the condition: V3/N3=11.08.

In the 1st embodiment, an Abbe number of the fourth lens element 140 is V4, a refractive index of the fourth lens element 140 is N4, and they satisfy the condition: V4/N4=36.23.

In the 1st embodiment, an Abbe number of the fifth lens element 150 is V5, a refractive index of the fifth lens element 150 is N5, and they satisfy the condition: V5/N5=11.08.

In the 1st embodiment, an Abbe number of the sixth lens element 160 is V6, a refractive index of the sixth lens element 160 is N6, and they satisfy the condition: V6/N6=30.55.

In the 1st embodiment, an Abbe number of the seventh lens element 170 is V7, a refractive index of the seventh lens element 170 is N7, and they satisfy the condition: V7/N7=36.46.

In the 1st embodiment, a maximum effective radius of the object-side surface 111 of the first lens element 110 is Y11, a maximum effective radius of the image-side surface 112 of the first lens element 110 is Y12, a maximum effective radius of the object-side surface 121 of the second lens element 120 is Y21, a maximum effective radius of the image-side surface 122 of the second lens element 120 is Y22, a maximum effective radius of the object-side surface 131 of the third lens element 130 is Y31, a maximum effective radius of the object-side surface 141 of the fourth lens element 140 is Y41, a maximum effective radius of the image-side surface 142 of the fourth lens element 140 is Y42, a maximum effective radius of the object-side surface 151 of an fifth lens element 150 is Y51, a maximum effective radius of the image-side surface 152 of the fifth lens element 150 is Y52, a maximum effective radius of the object-side surface 161 of the sixth lens element 160 is Y61, a maximum effective radius of the image-side surface 162 of the sixth lens element 160 is Y62, a maximum effective radius of the object-side surface 171 of the seventh lens element 170 is Y71, a maximum effective radius of the image-side surface 172 of the seventh lens element 170 is Y72, and they satisfy the conditions: Y31/Y11=0.79; Y31/Y12=0.83; Y31/Y21=0.89; Y31/Y22=0.97; Y31/Y41=0.84; Y31/Y42=0.79; Y31/Y51=0.76; Y31/Y52=0.66; Y31/Y61=0.64; Y31/Y62=0.53; Y31/Y71=0.45; Y31/Y72=0.38.

In the 1st embodiment, a vertical distance between the convex critical point farthest away from the optical axis within a maximum effective diameter of the image-side surface 162 of the sixth lens element 160 and the optical axis is Yc62 (if the critical point is located on the optical axis, Yc62 is 0), a vertical distance between the convex critical point farthest away from the optical axis within a maximum effective diameter of the image-side surface 172 of the seventh lens element 170 and the optical axis is Yc72 (if the critical point is located on the optical axis, Yc72 is 0), and they satisfy the condition: Yc62/Yc72=0 (Yc62=0).

In the 1st embodiment, an entrance pupil diameter of the imaging optical lens assembly is EPD, a central thickness of the second lens element 120 is CT2, a central thickness of the third lens element 130 is CT3, and they satisfy the condition: EPD(CT2+CT3)=7.23.

In the 1st embodiment, a central thickness of the first lens element 110 is CT1, the central thickness of the second lens element 120 is CT2, the central thickness of the third lens element 130 is CT3, a central thickness of the fifth lens element 150 is CT5, and they satisfy the condition: CT1/(CT2+CT3+CT5)=1.08.

In the 1st embodiment, the central thickness of the second lens element 120 is CT2, the central thickness of the third lens element 130 is CT3, a central thickness of the fourth lens element 140 is CT4, and they satisfy the condition: CT4/(CT2+CT3)=1.43.

In the 1st embodiment, an axial distance between the first lens element 110 and the second lens element 120 is T12, an axial distance between the second lens element 120 and the third lens element 130 is T23, an axial distance between the third lens element 130 and the fourth lens element 140 is T34, an axial distance between the fourth lens element 140 and the fifth lens element 150 is T45, an axial distance between the fifth lens element 150 and the sixth lens element 160 is T56, an axial distance between the sixth lens element 160 and the seventh lens element 170 is T67, and they satisfy the condition: (T12+T34+T45+T56)/(T23+T67)=0.58.

In the 1st embodiment, the axial distance between the fourth lens element 140 and the fifth lens element 150 is T45, the axial distance between the sixth lens element 160 and the seventh lens element 170 is T67, and they satisfy the condition: T67/T45=2.08.

In the 1st embodiment, a curvature radius of the object-side surface 161 of the sixth lens element 160 is R11, a curvature radius of the image-side surface 162 of the sixth lens element 160 is R12, and they satisfy the condition: (R11+R12)/(R11−R12)=1.03.

In the 1st embodiment, the focal length of the imaging optical lens assembly is f, a curvature radius of the object-side surface of 131 the third lens element 130 is R5, and they satisfy the condition: f/R5=0.48.

In the 1st embodiment, the focal length of the imaging optical lens assembly is f, a curvature radius of an image-side surface 152 of the fifth lens element 150 is R10, and they satisfy the condition: f/R10=0.86.

In the 1st embodiment, an axial distance between the object-side surface 111 of the first element 110 and the image surface 190 is TL, a maximum image height of the imaging optical lens assembly is ImgH, and they satisfy the condition: TL/ImgH=1.52.

In the 1st embodiment, the focal length of the imaging optical lens assembly is f, a focal length of the sixth lens element 160 is f6, and they satisfy the condition: f/f6=1.49.

In the 1st embodiment, the focal length of the imaging optical lens assembly is f, a focal length of a lens element is fx, a parameter of the refractive power of the said lens element is Px, wherein Px=f/fx, x=2~7, and they satisfy the condition: (|P2|+|P3|+|P4|+|P5|)/(|P6|+|P7|)=0.28.

2nd Embodiment

Figure 2A:
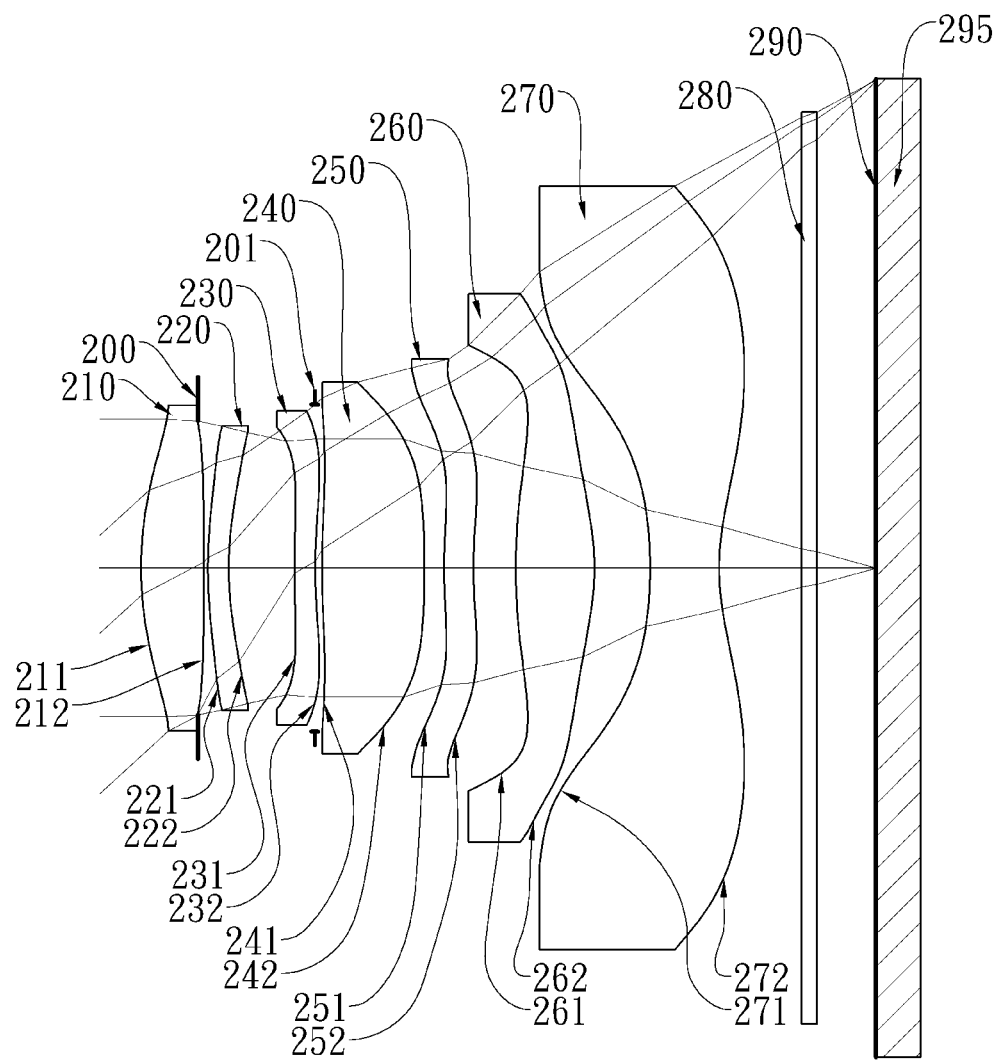
FIG. 2A is a schematic view of an imaging apparatus according to the 2nd embodiment of the present disclosure.
Figure 2B:
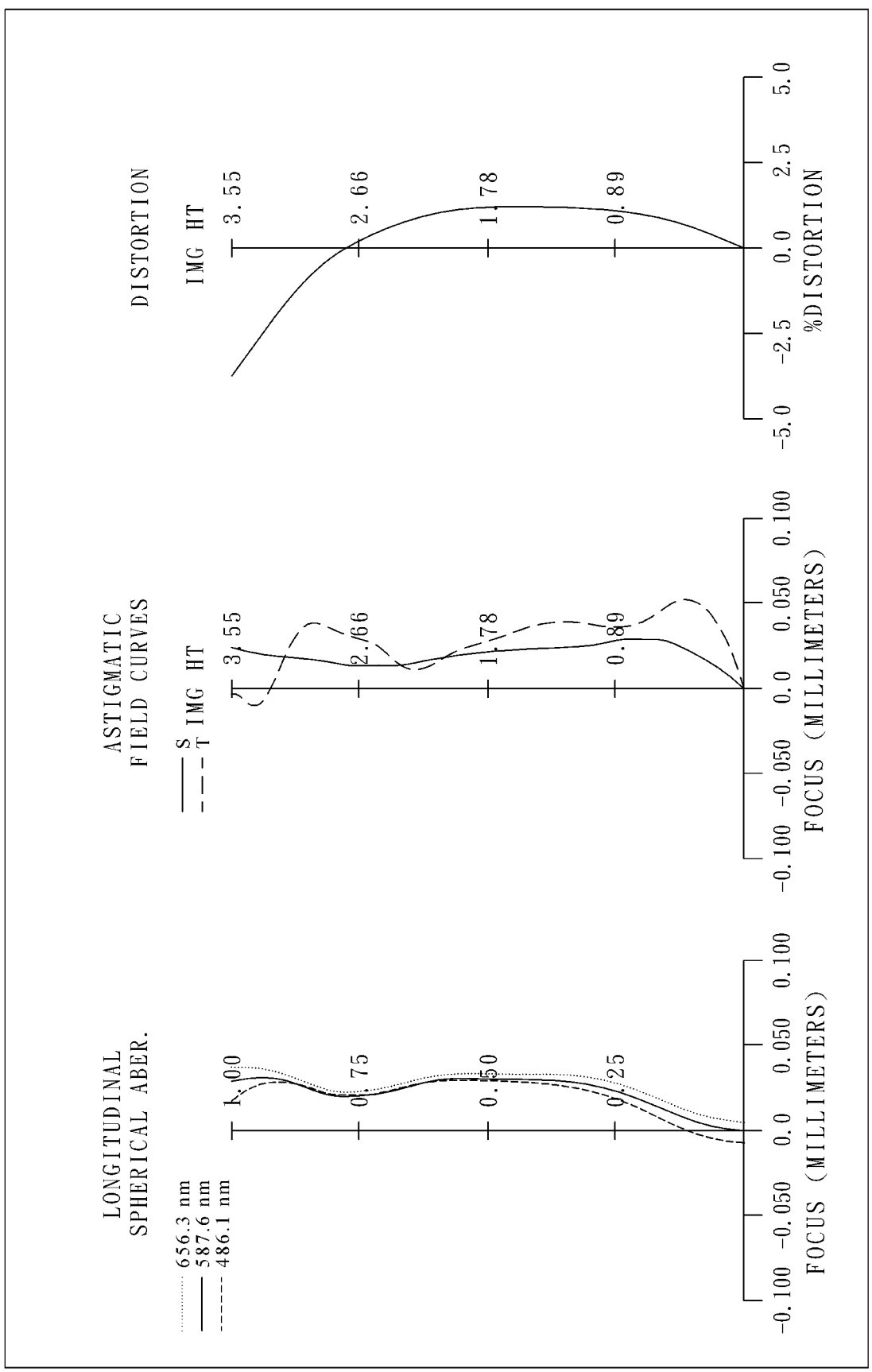
FIG. 2B shows aberration curves of the imaging apparatus according to the 2nd embodiment of the present disclosure.

FIG. 2A is a schematic view of an imaging apparatus according to the 2nd embodiment of the present disclosure. FIG. 2B shows, in order from left to right, longitudinal spherical aberration curves, astigmatic field curves and a distortion curve of the imaging apparatus according to the 2nd embodiment.

In FIG. 2A, the imaging apparatus includes an imaging optical lens assembly (not otherwise herein labeled) of the present disclosure and an image sensor 295. The imaging optical lens assembly includes, in order from an object side to an image side: a first lens element 210, an aperture stop 200, a second lens element 220, a third lens element 230, a stop 201, a fourth lens element 240, a fifth lens element 250, a sixth lens element 260, a seventh lens element 270, an IR cut filter 280, and an image surface 290. The image sensor 295 is disposed on or near the image surface 290 of the imaging optical lens assembly. The optical image capturing lens assembly includes seven lens elements (210, 220, 230, 240, 250, 260 and 270) with no additional lens element disposed between the first lens element 210 and the seventh lens element 270.

The first lens element 210 with positive refractive power has an object-side surface 211 being convex in a paraxial region thereof and an image-side surface 212 being convex in a paraxial region thereof, which are both aspheric, and the first lens element 210 is made of plastic material.

The second lens element 220 with negative refractive power has an object-side surface 221 being convex in a paraxial region thereof and an image-side surface 222 being concave in a paraxial region thereof, which are both aspheric, and the second lens element 220 is made of plastic material.

The third lens element 230 with negative refractive power has an object-side surface 231 being convex in a paraxial region thereof and an image-side surface 232 being concave in a paraxial region thereof, which are both aspheric, and the third lens element 230 is made of plastic material. Moreover, the image-side surface 232 has at least one critical point in an off-axis region thereof.

The fourth lens element 240 with positive refractive power has an object-side surface 241 being convex in a paraxial region thereof and an image-side surface 242 being convex in a paraxial region thereof, which are both aspheric, and the fourth lens element 240 is made of plastic material.

The fifth lens element 250 with negative refractive power has an object-side surface 251 being convex in a paraxial region thereof and an image-side surface 252 being concave in a paraxial region thereof, which are both aspheric, and the fifth lens element 250 is made of plastic material.

The sixth lens element 260 with positive refractive power has an object-side surface 261 being convex in a paraxial region thereof and an image-side surface 262 being convex in a paraxial region thereof, which are both aspheric, and the sixth lens element 260 is made of plastic material.

The seventh lens element 270 with negative refractive power has an object-side surface 271 being concave in a paraxial region thereof and an image-side surface 272 being concave in a paraxial region thereof, which are both aspheric, and the seventh lens element 270 is made of plastic material. Moreover, the image-side surface 272 has at least one critical point in an off-axis region thereof.

The IR cut filter 280 is disposed between the seventh lens element 270 and the image surface 290. Furthermore, the IR cut filter 280 is made of glass material and will not affect the focal length of the imaging optical lens assembly.

The detailed optical data of the 2nd embodiment are shown in TABLE 3, the aspheric surface data are shown in TABLE 4, wherein the units of the curvature radius, the thickness and the focal length are expressed in mm, and HFOV is half of the maximal field of view.

TABLE 3

(2nd Embodiment)
f = 4.00 mm, Fno = 1.85, HFOV = 42.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.658 | ASP | 0.455 | Plastic | 1.545 | 56.1 | 4.77 |
| 2 | | −109.733 | ASP | −0.043 | | | | |
| 3 | Ape. Stop | Plano | | 0.073 | | | | |
| 4 | Lens 2 | 3.608 | ASP | 0.151 | Plastic | 1.614 | 26.0 | −13.86 |
| 5 | | 2.493 | ASP | 0.478 | | | | |
| 6 | Lens 3 | 9.424 | ASP | 0.150 | Plastic | 1.688 | 18.7 | −12.31 |
| 7 | | 4.432 | ASP | −0.004 | | | | |
| 8 | Stop | Plano | | 0.054 | | | | |
| 9 | Lens 4 | 8.347 | ASP | 0.742 | Plastic | 1.544 | 56.0 | 7.31 |
| 10 | | −7.358 | ASP | 0.143 | | | | |
| 11 | Lens 5 | 4.913 | ASP | 0.213 | Plastic | 1.669 | 19.5 | −34.15 |
| 12 | | 3.973 | ASP | 0.307 | | | | |
| 13 | Lens 6 | 5.295 | ASP | 0.569 | Plastic | 1.550 | 50.0 | 2.54 |
| 14 | | −1.828 | ASP | 0.405 | | | | |
| 15 | Lens 7 | −2.938 | ASP | 0.501 | Plastic | 1.534 | 55.9 | −2.00 |
| 16 | | 1.773 | ASP | 0.600 | | | | |
| 17 | IR cut filter | Plano | | 0.110 | Glass | 1.517 | 64.2 | — |
| 18 | | Plano | | 0.427 | | | | |
| 19 | Image surface | Plano | | — | | | | |

Note:
Reference wavelength is d-line 587.6 nm
The effective radius of Surface 8 is 1.187 mm

TABLE 4

Aspheric Coefficients

| Surface # | 1 | 2 | 4 | 5 | 6 |
|---|---|---|---|---|---|
| k = | −2.4331E+00 | −9.9000E+01 | 4.5575E−01 | −1.2180E+00 | −5.1756E+01 |
| A4 = | 3.9829E−03 | −2.0257E−02 | −8.8326E−02 | −8.2338E−02 | −8.3139E−02 |
| A6 = | 4.2048E−03 | 3.5698E−03 | 8.1467E−02 | 4.3486E−02 | −4.3619E−02 |
| A8 = | −5.1689E−02 | −4.7625E−02 | −2.7353E−01 | −1.4052E−01 | −2.0416E−01 |
| A10 = | 8.3866E−02 | 9.9053E−02 | 6.2608E−01 | 2.7848E−01 | 7.3233E−01 |
| A12 = | −8.0263E−02 | −1.1564E−01 | −7.3451E−01 | −2.5662E−01 | −1.2241E+00 |
| A14 = | 3.3560E−02 | 6.5544E−02 | 4.4254E−01 | 1.0056E−01 | 9.3477E−01 |
| A16 = | −4.8055E−03 | −1.3961E−02 | −1.0239E−01 |  | −2.6986E−01 |

| Surface # | 7 | 9 | 10 | 11 | 12 |
|---|---|---|---|---|---|
| k = | −7.3795E+01 | 1.9005E+01 | −1.0000E+00 | 8.6427E+00 | −3.6940E+01 |
| A4 = | 7.4296E−02 | 2.7181E−02 | −4.2209E−02 | −1.0163E−01 | −2.9394E−02 |
| A6 = | −5.1828E−01 | −3.1687E−01 | −2.7455E−01 | −3.8392E−01 | −3.9912E−01 |
| A8 = | 8.9799E−01 | 4.7436E−01 | 4.2719E−01 | 5.3812E−01 | 5.4140E−01 |
| A10 = | −9.7076E−01 | −3.5182E−01 | −4.0924E−01 | −3.4097E−01 | −3.4709E−01 |
| A12 = | 5.9974E−01 | 1.3234E−01 | 2.5855E−01 | 1.1571E−01 | 1.1907E−01 |
| A14 = | −1.8224E−01 | −1.9355E−02 | −9.5674E−02 | −1.7304E−02 | −1.8937E−02 |
| A16 = | 1.8661E−02 |  | 1.5376E−02 | 3.0825E−04 | 8.6152E−04 |

| Surface # | 13 | 14 | 15 | 16 |
|---|---|---|---|---|
| k = | −2.3993E+01 | −2.0790E+01 | −2.5804E+00 | −6.9644E+00 |
| A4 = | 7.5633E−02 | −1.1609E−01 | −2.8072E−02 | −8.4658E−02 |
| A6 = | −6.0194E−02 | 4.6367E−01 | −9.7632E−02 | 3.5680E−02 |
| A8 = | −1.3240E−01 | −7.4912E−01 | 9.7950E−02 | −1.0698E−02 |
| A10 = | 2.4254E−01 | 6.7998E−01 | −5.2094E−02 | 2.2062E−03 |
| A12 = | −1.8079E−01 | −3.7344E−01 | 1.9935E−02 | −3.3852E−04 |
| A14 = | 7.1795E−02 | 1.2481E−01 | −5.1704E−03 | 4.2742E−05 |
| A16 = | −1.5735E−02 | −2.4692E−02 | 8.1833E−04 | −4.4269E−06 |
| A18 = | 1.5317E−03 | 2.6525E−03 | −7.0279E−05 | 3.0151E−07 |
| A20 = |  | −1.1911E−04 | 2.5029E−06 | −9.0219E−09 |

In the 2nd embodiment, the equation of the aspheric surface profiles of the aforementioned lens elements is the same as the equation from the 1st embodiment. Also, the definitions of the parameters shown in the table below are the same as those stated in the 1st embodiment, but the values for the conditions in the 2nd embodiment are as specified below.

| 2nd Embodiment | | | | |
|---|---|---|---|---|
| f [mm] | 4.00 | Y31/Y11 | 0.86 | Yc62/Yc72 | 0 |
| Fno | 1.85 | Y31/Y12 | 0.95 | EPD/(CT2 + CT3) | 7.18 |
| HFOV [deg.] | 42.6 | Y31/Y21 | 0.99 | CT1/(CT2 + CT3 + CT5) | 0.89 |
| V25 | 2 | Y31/Y22 | 1.02 | CT4/(CT2 + CT3) | 2.47 |
| V2 + V3 | 44.67 | Y31/Y41 | 0.83 | (T12 + T34 + T45 + T56)/(T23 + T67) | 0.60 |
| Nmax | 1.69 | Y31/Y42 | 0.76 | T67/T45 | 2.83 |
| V1/N1 | 36.30 | Y31/Y51 | 0.70 | (R11 + R12)/(R11 − R12) | 0.49 |
| V2/N2 | 16.09 | Y31/Y52 | 0.67 | f/R5 | 0.42 |
| V3/N3 | 11.08 | Y31/Y61 | 0.63 | f/R10 | 1.01 |
| V4/N4 | 36.26 | Y31/Y62 | 0.51 | TL/ImgH | 1.50 |
| V5/N5 | 11.66 | Y31/Y71 | 0.47 | f/f6 | 1.57 |
| V6/N6 | 32.26 | Y31/Y72 | 0.37 | (\|P2\| + \|P3\| + \|P4\| + \|P5\|)/(\|P6\| + \|P7\|) | 0.36 |
| V7/N7 | 36.46 | | | | |

3rd Embodiment

Figure 3A:
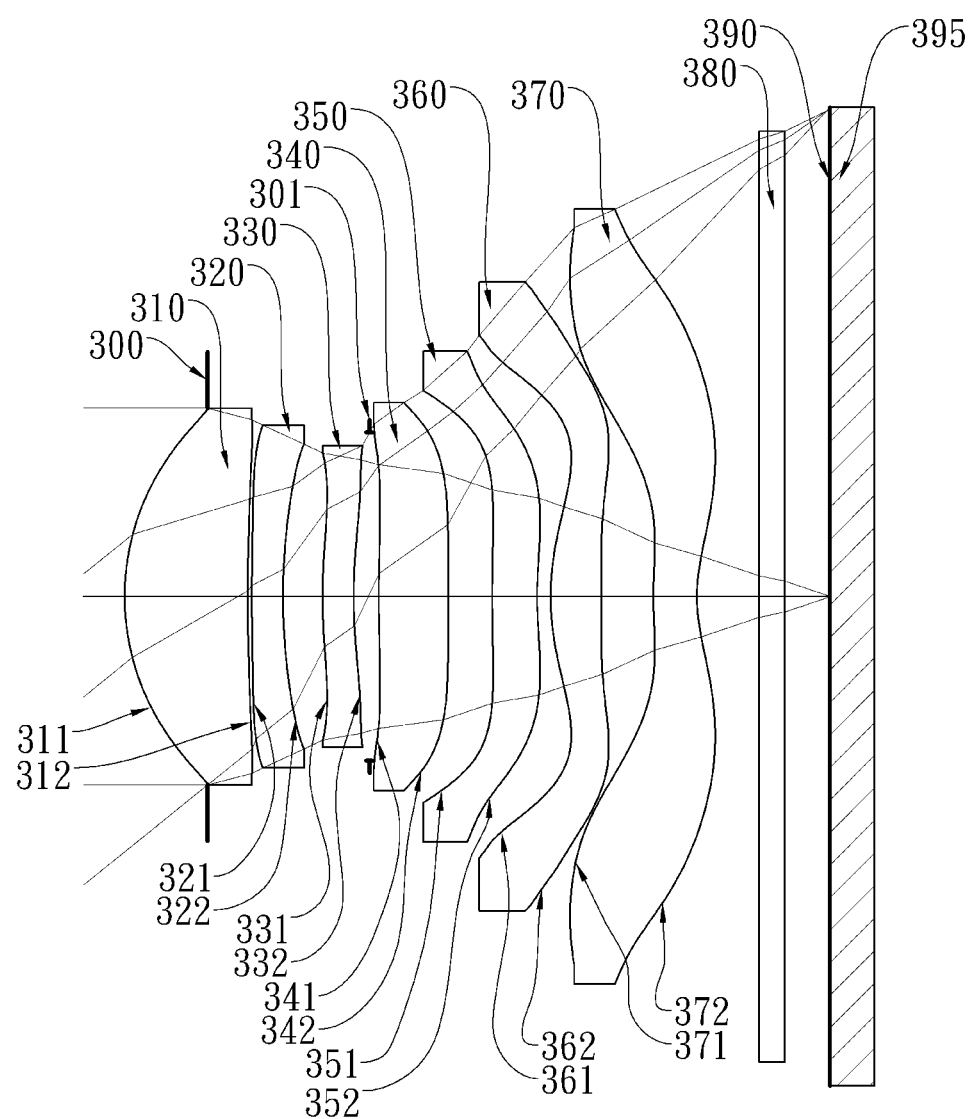
FIG. 3A is a schematic view of an imaging apparatus according to the 3rd embodiment of the present disclosure.
Figure 3B:
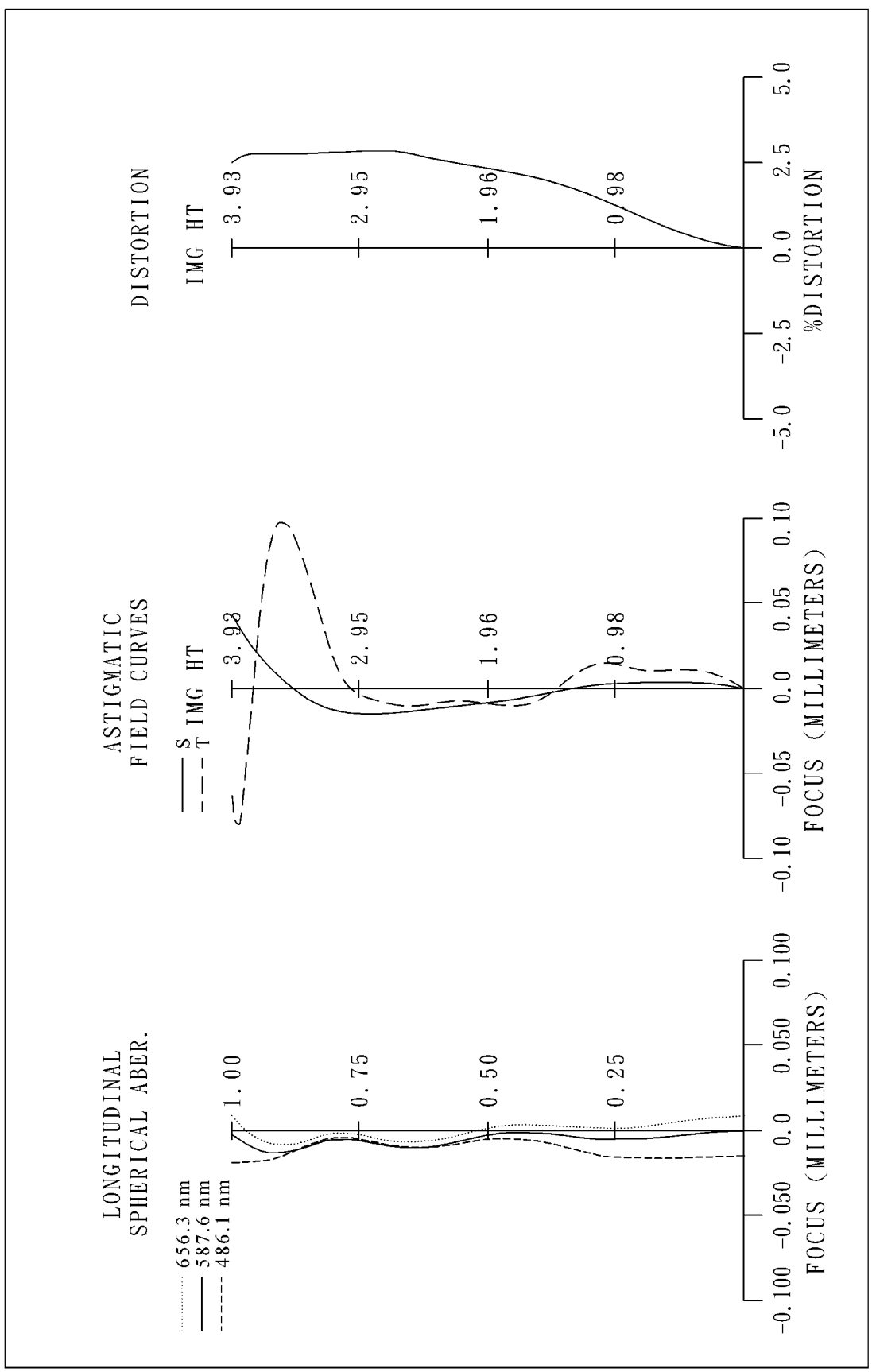
FIG. 3B shows aberration curves of the imaging apparatus according to the 3rd embodiment of the present disclosure.

FIG. 3A is a schematic view of an imaging apparatus according to the 3rd embodiment of the present disclosure. FIG. 3B shows, in order from left to right, longitudinal spherical aberration curves, astigmatic field curves and a distortion curve of the imaging apparatus according to the 3rd embodiment.

In FIG. 3A, the imaging apparatus includes an imaging optical lens assembly (not otherwise herein labeled) of the present disclosure and an image sensor 395. The imaging optical lens assembly includes, in order from an object side to an image side: an aperture stop 300, a first lens element 310, a second lens element 320, a third lens element 330, a stop 301, a fourth lens element 340, a fifth lens element 350, a sixth lens element 360, a seventh lens element 370, an IR cut filter 380, and an image surface 390. The image sensor 395 is disposed on or near the image surface 390 of the imaging optical lens assembly. The optical image capturing lens assembly includes seven lens elements (310, 320, 330, 340, 350, 360 and 370) with no additional lens element disposed between the first lens element 310 and the seventh lens element 370.

The first lens element 310 with positive refractive power has an object-side surface 311 being convex in a paraxial region thereof and an image-side surface 312 being concave in a paraxial region thereof, which are both aspheric, and the first lens element 310 is made of plastic material.

The second lens element 320 with negative refractive power has an object-side surface 321 being convex in a paraxial region thereof and an image-side surface 322 being concave in a paraxial region thereof, which are both aspheric, and the second lens element 320 is made of plastic material.

The third lens element 330 with negative refractive power has an object-side surface 331 being convex in a paraxial region thereof and an image-side surface 332 being concave in a paraxial region thereof, which are both aspheric, and the third lens element 330 is made of plastic material. Moreover, the image-side surface 332 has at least one critical point in an off-axis region thereof.

The fourth lens element 340 with positive refractive power has an object-side surface 341 being convex in a paraxial region thereof and an image-side surface 342 being concave in a paraxial region thereof, which are both aspheric, and the fourth lens element 340 is made of plastic material.

The fifth lens element 350 with negative refractive power has an object-side surface 351 being convex in a paraxial region thereof, an image-side surface 352 being concave in a paraxial region thereof, which are both aspheric, and the fifth lens element 350 is made of plastic material.

The sixth lens element 360 with positive refractive power has an object-side surface 361 being convex in a paraxial region thereof and an image-side surface 362 being convex in a paraxial region thereof, which are both aspheric, and the sixth lens element 360 is made of plastic material.

The seventh lens element 370 with negative refractive power has an object-side surface 371 being convex in a paraxial region thereof and an image-side surface 372 being concave in a paraxial region thereof, which are both aspheric, and the seventh lens element 370 is made of plastic material. Moreover, the image-side surface 372 has at least one critical point in an off-axis region thereof.

The IR cut filter 380 is disposed between the seventh lens element 370 and the image surface 390. Furthermore, the IR cut filter 380 is made of glass material and will not affect the focal length of the imaging optical lens assembly.

The detailed optical data of the 3rd embodiment are shown in TABLE 5 and the aspheric surface data are shown in TABLE 6, wherein the units of the curvature radius, the thickness and the focal length are expressed in mm, and HFOV is half of the maximal field of view.

TABLE 5

(Embodiment 3)
f = 4.74 mm, Fno = 1.56, HFOV = 39.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.668 | | | | |
| 2 | Lens 1 | 1.966 | ASP | 0.989 | Plastic | 1.545 | 56.1 | 4.28 |
| 3 | | 10.245 | ASP | 0.035 | | | | |
| 4 | Lens 2 | 15.581 | ASP | 0.250 | Plastic | 1.669 | 19.5 | −10.92 |
| 5 | | 4.942 | ASP | 0.319 | | | | |
| 6 | Lens 3 | 4.928 | ASP | 0.250 | Plastic | 1.669 | 19.5 | −118.39 |
| 7 | | 4.545 | ASP | 0.126 | | | | |
| 8 | Stop | Plano | | 0.076 | | | | |
| 9 | Lens 4 | 13.551 | ASP | 0.557 | Plastic | 1.544 | 56.0 | 31.44 |
| 10 | | 64.246 | ASP | 0.355 | | | | |
| 11 | Lens 5 | 10.656 | ASP | 0.361 | Plastic | 1.566 | 37.4 | −9.16 |
| 12 | | 3.444 | ASP | 0.108 | | | | |
| 13 | Lens 6 | 2.069 | ASP | 0.409 | Plastic | 1.544 | 56.0 | 3.58 |
| 14 | | −30.370 | ASP | 0.417 | | | | |
| 15 | Lens 7 | 3.663 | ASP | 0.350 | Plastic | 1.544 | 56.0 | −3.84 |
| 16 | | 1.285 | ASP | 0.500 | | | | |
| 17 | IR cut filter | Plano | | 0.210 | Class | 1.517 | 64.2 | — |
| 18 | | Plano | | 0.360 | | | | |
| 19 | Image surface | Plano | | — | | | | |

Note:
Reference wavelength is d-line 587.6 nm
The effective radius of Surface 8 is 1.322 mm

TABLE 6

Aspheric Coefficients

| Surface # | 2 | 3 | 4 | 5 | 6 |
|---|---|---|---|---|---|
| k = | −2.1816E−01 | 3.0407E+01 | 8.5082E+01 | 5.9392E+00 | −9.9000E+01 |
| A4 = | 5.51885E−03 | −6.9775E−02 | −6.8898E−02 | −2.5677E−02 | 5.3139E−02 |
| A6 = | −8.43054E−03 | 8.6021E−02 | 9.8983E−02 | 2.8402E−02 | −2.6216E−01 |
| A8 = | 1.67859E−02 | −6.8554E−02 | −7.2066E−02 | −1.1791E−02 | 4.5827E−01 |
| A10 = | −1.52809E−02 | 3.4386E−02 | 3.1516E−02 | −4.9150E−03 | −5.5241E−01 |
| A12 = | 6.92181E−03 | −1.0007E−02 | −6.8747E−03 | 4.7073E−03 | 3.8372E−01 |
| A14 = | −1.28823E−03 | 1.1273E−03 | 6.8974E−04 | | −1.3499E−01 |
| A16 = | | | | | 1.8789E−02 |

| Surface # | 7 | 9 | 10 | 11 | 12 |
|---|---|---|---|---|---|
| k = | −2.4445E+01 | 5.8499E+01 | 3.6148E+01 | 1.9180E+01 | −1.7865E+01 |
| A4 = | 3.3475E−03 | −2.4000E−02 | −3.0781E−02 | −8.5505E−02 | −1.9586E−01 |
| A6 = | −1.2835E−01 | −5.1015E−02 | −5.2067E−02 | 4.4127E−02 | 5.9082E−02 |
| A8 = | 2.5345E−01 | 9.5628E−02 | 8.5451E−02 | −3.2927E−03 | 2.6056E−02 |
| A10 = | −3.1393E−01 | −9.9920E−02 | −8.7664E−02 | 6.3176E−03 | −4.2868E−02 |
| A12 = | 2.1273E−01 | 4.8796E−02 | 4.9333E−02 | −1.1997E−03 | 1.9750E−02 |
| A14 = | −6.7852E−02 | −8.4789E−03 | −1.4742E−02 | 6.0864E−04 | −3.8701E−03 |
| A16 = | 8.1101E−03 | | 1.8272E−03 | −8.9069E−05 | 2.7761E−04 |

TABLE 6-continued

| Aspheric Coefficients | | | | |
|---|---|---|---|---|
| Surface # | 13 | 14 | 15 | 16 |
| k = | −9.4429E+00 | 8.4758E+01 | −8.9976E+01 | −8.3553E+00 |
| A4 = | 5.7570E−02 | 1.1391E−01 | −2.9130E−01 | −1.5114E−01 |
| A6 = | −1.5341E−01 | −1.2293E−02 | 1.8859E−01 | 9.4225E−02 |
| A8 = | 1.7006E−01 | −8.7512E−02 | −8.3241E−02 | −4.2585E−02 |
| A10 = | −1.5766E−01 | 7.2954E−02 | 2.6766E−02 | 1.2867E−02 |
| A12 = | 9.1735E−02 | −3.0262E−02 | −5.8235E−03 | −2.5061E−03 |
| A14 = | −3.1981E−02 | 7.4958E−03 | 8.1650E−04 | 3.0662E−04 |
| A16 = | 6.5088E−03 | −1.1121E−03 | −7.0360E−05 | −2.2605E−05 |
| A18 = | −7.0794E−04 | 9.0744E−05 | 3.3879E−06 | 9.1408E−07 |
| A20 = | 3.1535E−05 | −3.1227E−06 | −6.9807E−08 | −1.5533E−08 |

In the 3rd embodiment, the equation of the aspheric surface profiles of the aforementioned lens elements is the same as the equation from the 1st embodiment. Also, the definitions of the parameters shown in the table below are the same as those stated in the 1st embodiment, but the values for the conditions in the 3rd embodiment are as specified below.

| Embodiment 3 | | | | |
|---|---|---|---|---|
| f [mm] | 4.74 | Y31/Y11 | 0.77 | Yc62/Yc72 | 0.242, 1.068 |
| Fno | 1.56 | Y31/Y12 | 0.82 | EPD/(CT2 + CT3) | 6.06 |
| HFOV [deg.] | 39.0 | Y31/Y21 | 0.85 | CT1/(CT2 + CT3 + CT5) | 1.15 |
| V25 | 2 | Y31/Y22 | 0.95 | CT4/(CT2 + CT3) | 1.11 |
| V2 + V3 | 38.90 | Y31/Y41 | 0.84 | (T12 + T34 + T45 + T56)/(T23 + T67) | 0.95 |
| Nmax | 1.67 | Y31/Y42 | 0.75 | T67/T45 | 1.17 |
| V1/N1 | 36.30 | Y31/Y51 | 0.71 | (R11 + R12)/(R11 − R12) | −0.87 |
| V2/N2 | 11.66 | Y31/Y52 | 0.59 | f/R5 | 0.96 |
| V3/N3 | 11.66 | Y31/Y61 | 0.56 | f/R10 | 1.38 |
| V4/N4 | 36.26 | Y31/Y62 | 0.46 | TL/ImgH | 1.44 |
| V5/N5 | 23.91 | Y31/Y71 | 0.39 | f/f6 | 1.32 |
| V6/N6 | 36.26 | Y31/Y72 | 0.38 | (|P2| + |P3| + |P4| + |P5|)/(|P6| + |P7|) | 0.45 |
| V7/N7 | 36.26 | | | | |

4th Embodiment

Figure 4A:
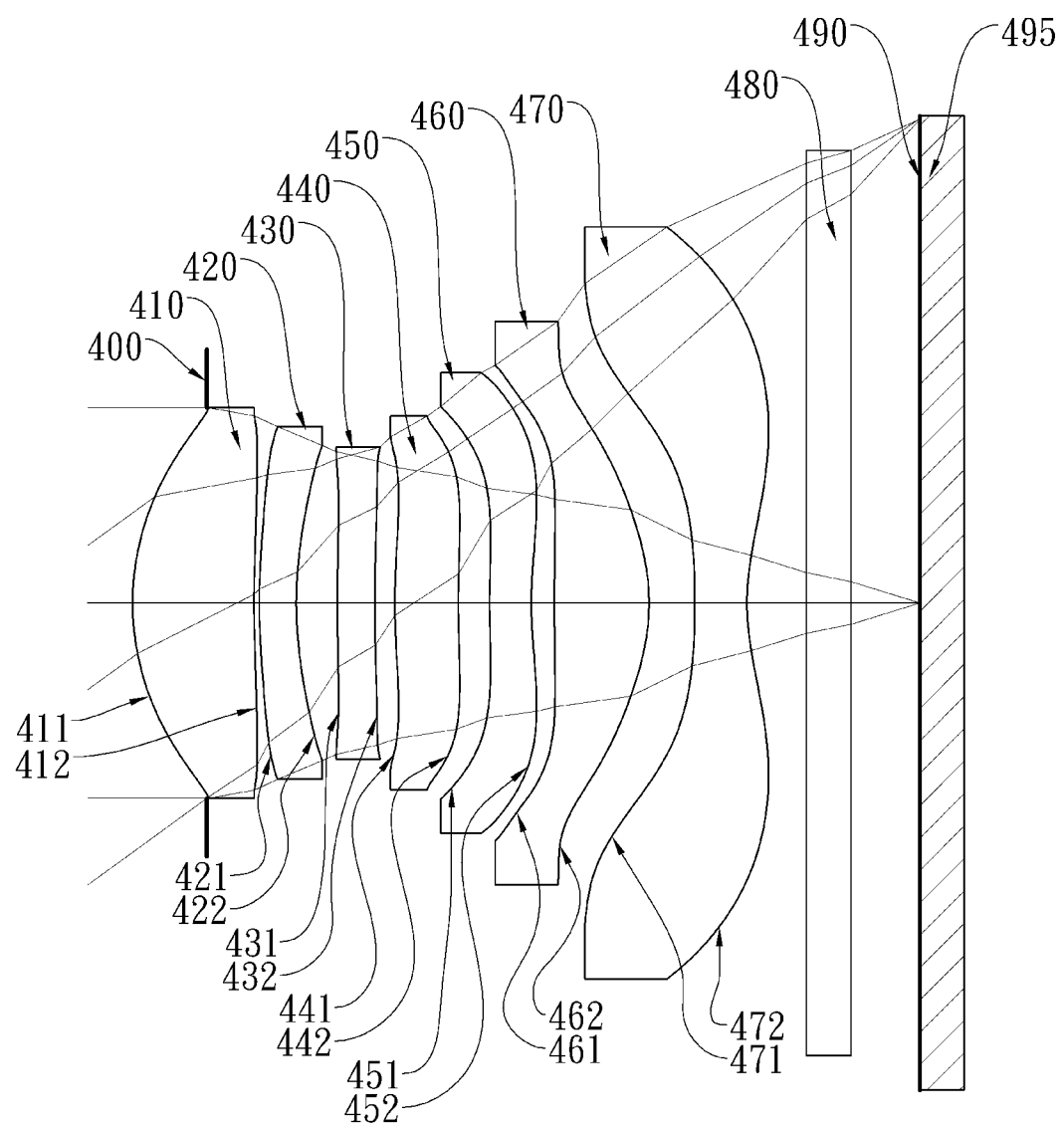
FIG. 4A is a schematic view of an imaging apparatus according to the 4th embodiment of the present disclosure.
Figure 4B:
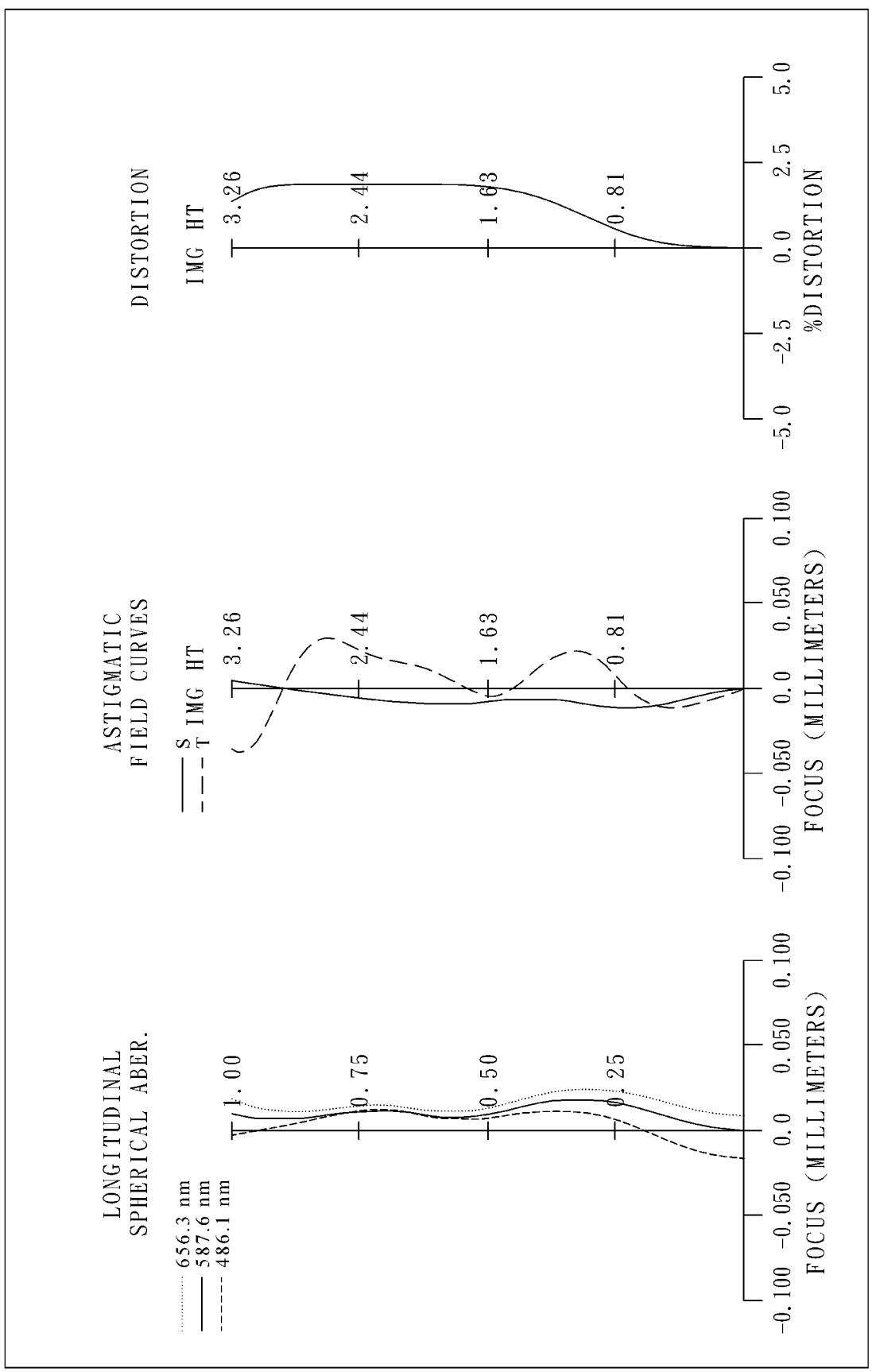
FIG. 4B shows aberration curves of the imaging apparatus according to the 4th embodiment of the present disclosure.

FIG. 4A is a schematic view of an imaging apparatus according to the 4th embodiment of the present disclosure. FIG. 4B shows, in order from left to right, longitudinal spherical aberration curves, astigmatic field curves and a distortion curve of the imaging apparatus according to the 4th embodiment.

In FIG. 4A, the imaging apparatus includes an imaging optical lens assembly (not otherwise herein labeled) of the present disclosure and an image sensor 495. The imaging optical lens assembly includes, in order from an object side to an image side: an aperture stop 400, a first lens element 410, a second lens element 420, a third lens element 430, a fourth lens element 440, a fifth lens element 450, a sixth lens element 460, a seventh lens element 470, an IR cut filter 480, and an image surface 490. The image sensor 495 is disposed on or near the image surface 490 of the imaging optical lens assembly. The optical image capturing lens assembly includes seven lens elements (410, 420, 430, 440, 450, 460 and 470) with no additional lens element disposed between the first lens element 410 and the seventh lens element 470.

The first lens element 410 with positive refractive power has an object-side surface 411 being convex in a paraxial region thereof and an image-side surface 412 being concave in a paraxial region thereof, which are both aspheric, and the first lens element 410 is made of plastic material.

The second lens element 420 with negative refractive power has an object-side surface 421 being convex in a paraxial region thereof and an image-side surface 422 being concave in a paraxial region thereof, which are both aspheric, and the second lens element 420 is made of plastic material.

The third lens element 430 with negative refractive power has an object-side surface 431 being convex in a paraxial region thereof and an image-side surface 432 being concave in a paraxial region thereof, which are both aspheric, and the third lens element 430 is made of plastic material. Moreover, the image-side surface 432 has at least one critical point in an off-axis region thereof.

The fourth lens element 440 with positive refractive power has an object-side surface 441 being convex in a paraxial region thereof and an image-side surface 442 being concave in a paraxial region thereof, which are both aspheric, and the fourth lens element 440 is made of plastic material.

The fifth lens element 450 with negative refractive power has an object-side surface 451 being convex in a paraxial region thereof and an image-side surface 452 being concave in a paraxial region thereof, which are both aspheric, and the fifth lens element 450 is made of plastic material.

The sixth lens element 460 with positive refractive power has an object-side surface 261 being convex in a paraxial region thereof and an image-side surface 462 being convex in a paraxial region thereof, which are both aspheric, and the sixth lens element 460 is made of plastic material.

The seventh lens element 470 with negative refractive power has an object-side surface 471 being concave in a paraxial region thereof and an image-side surface 472 being concave in a paraxial region thereof, which are both aspheric, and the seventh lens element 470 is made of plastic material. Moreover, the image-side surface 472 has at least one critical point in an off-axis region thereof.

The IR cut filter 480 is disposed between the seventh lens element 470 and the image surface 490. Furthermore, the IR cut filter 480 is made of glass material and will not affect the focal length of the imaging optical lens assembly.

The detailed optical data of the 4th embodiment are shown in TABLE 7, the aspheric surface data are shown in TABLE 8, wherein the units of the curvature radius, the thickness and the focal length are expressed in mm, and HFOV is half of the maximal field of view.

TABLE 7

(Embodiment 4)
f = 4.40 mm, Fno = 1.68, HFOV = 36.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.498 | | | | |
| 2 | Lens 1 | 1.773 | ASP | 0.816 | Plastic | 1.545 | 56.0 | 4.17 |
| 3 | | 6.781 | ASP | 0.035 | | | | |
| 4 | Lens 2 | 4.104 | ASP | 0.250 | Plastic | 1.671 | 19.3 | −15.17 |
| 5 | | 2.853 | ASP | 0.277 | | | | |
| 6 | Lens 3 | 16.391 | ASP | 0.250 | Plastic | 1.671 | 19.3 | −31.40 |
| 7 | | 9.162 | ASP | 0.135 | | | | |
| 8 | Lens 4 | 4.576 | ASP | 0.427 | Plastic | 1.544 | 56.0 | 18.42 |
| 9 | | 8.145 | ASP | 0.210 | | | | |
| 10 | Lens 5 | 6.100 | ASP | 0.280 | Plastic | 1.671 | 19.3 | −7.51 |
| 11 | | 2.709 | ASP | 0.155 | | | | |
| 12 | Lens 6 | 13.974 | ASP | 0.637 | Plastic | 1.566 | 37.4 | 2.24 |
| 13 | | −1.370 | ASP | 0.308 | | | | |
| 14 | Lens 7 | −5.263 | ASP | 0.350 | Plastic | 1.534 | 55.9 | −2.27 |
| 15 | | 1.611 | ASP | 0.400 | | | | |
| 16 | IR cut filter | Plano | | 0.300 | Glass | 1.517 | 64.2 | — |
| 17 | | Plano | | 0.461 | | | | |
| 18 | Image surface | Plano | | — | | | | |

Note:
Reference wavelength is d-line 587.6 nm
The effective radius of Surface 7 is 1.050 mm

TABLE 8

Aspheric Coefficients

| Surface # | 2 | 3 | 4 | 5 | 6 |
|---|---|---|---|---|---|
| k = | −3.8020E−01 | 1.9049E+01 | −9.2105E−02 | −1.0499E+00 | −3.3546E+01 |
| A4 = | 5.0662E−03 | −1.6472E−01 | −1.7519E−01 | −4.0205E−02 | −2.9236E−02 |
| A6 = | −1.0819E−03 | 2.7379E−01 | 2.9664E−01 | 3.3582E−02 | 4.8909E−02 |
| A8 = | 8.9350E−03 | −3.1840E−01 | −3.4414E−01 | −3.7592E−02 | −2.1411E−01 |
| A10 = | −1.4782E−02 | 2.1786E−01 | 2.5498E−01 | 9.0463E−03 | 2.9387E−01 |
| A12 = | 9.4686E−03 | −8.2578E−02 | −9.6181E−02 | 1.2306E−02 | −2.5214E−01 |
| A14 = | −2.9907E−03 | 1.2483E−02 | 1.4440E−02 | | 1.5427E−01 |
| A16 = | | | | | −4.0190E−02 |

| Surface # | 7 | 8 | 9 | 10 | 11 |
|---|---|---|---|---|---|
| k = | −9.0000E+01 | −3.6690E+01 | 2.8239E+01 | 4.9571E+00 | −2.9606E+01 |
| A4 = | −7.1834E−02 | −1.1043E−01 | −1.3160E−01 | −3.1648E−01 | −2.0024E−01 |
| A6 = | 1.7835E−01 | 2.0560E−01 | 9.3214E−02 | 3.6522E−01 | 2.6445E−01 |
| A8 = | −4.1638E−01 | −5.6243E−01 | −1.1073E−01 | −3.3553E−01 | −3.4574E−01 |
| A10 = | 5.3319E−01 | 7.6297E−01 | −9.7210E−02 | 8.2017E−02 | 2.7065E−01 |
| A12 = | −3.4909E−01 | −5.3432E−01 | 2.3945E−01 | 6.2280E−02 | −1.2877E−01 |
| A14 = | 1.1341E−01 | 1.5221E−01 | −1.6235E−01 | −4.0372E−02 | 3.4822E−02 |
| A16 = | −7.4620E−03 | | 3.9546E−02 | 6.4473E−03 | −4.0810E−03 |

| Surface # | 12 | 13 | 14 | 15 |
|---|---|---|---|---|
| k = | 5.5744E+01 | −5.6796E+00 | −5.7178E−01 | −9.6581E+00 |
| A4 = | −6.1836E−02 | −3.7692E−02 | −7.5037E−02 | −7.9478E−02 |
| A6 = | −4.0074E−02 | 3.8830E−02 | −1.4766E−02 | 1.8594E−02 |
| A8 = | 2.9229E−01 | −3.9534E−02 | −1.0565E−02 | −4.5030E−04 |
| A10 = | −7.4059E−01 | −1.2332E−02 | 3.0115E−02 | −1.7689E−03 |
| A12 = | 8.9439E−01 | 3.2987E−02 | −1.7182E−02 | 7.7573E−04 |
| A14 = | −6.0743E−01 | −1.6519E−02 | 5.0427E−03 | −1.8253E−04 |
| A16 = | 2.3712E−01 | 3.7081E−03 | −8.6589E−04 | 2.6127E−05 |
| A18 = | −4.9368E−02 | −3.9254E−04 | 8.3241E−05 | −2.1284E−06 |
| A20 = | 4.2267E−03 | 1.55678E−05 | −3.46924E−06 | 7.5201E−08 |

In the 4th embodiment, the equation of the aspheric surface profiles of the aforementioned lens elements is the same as the equation from the 1st embodiment. Also, the definitions of the parameters shown in the table below are the same as those stated in the 1st embodiment, but the values for the conditions in the 4th embodiment are as specified below.

| Embodiment 4 | | | | | |
|---|---|---|---|---|---|
| f [mm] | 4.40 | Y31/Y11 | 0.79 | Yc62/Yc72 | 0 |
| Fno | 1.68 | Y31/Y12 | 0.82 | EPD/(CT2 + CT3) | 5.25 |
| HFOV [deg.] | 36.1 | Y31/Y21 | 0.87 | CT1/(CT2 + CT3 + CT5) | 1.05 |

-continued

| | | Embodiment 4 | | |
|---|---|---|---|---|
| V25 | 3 | Y31/Y22 | 0.98 | CT4/(CT2 + CT3) | 0.85 |
| V2 + V3 | 38.59 | Y31/Y41 | 0.92 | (T12 + T34 + T45 + T56)/(T23 + T67) | 0.91 |
| Nmax | 1.67 | Y31/Y42 | 0.82 | T67/T45 | 1.47 |
| V1/N1 | 36.27 | Y31/Y51 | 0.78 | (R11 + R12)/(R11 − R12) | 0.82 |
| V2/N2 | 11.55 | Y31/Y52 | 0.67 | f/R5 | 0.27 |
| V3/N3 | 11.55 | Y31/Y61 | 0.65 | f/R10 | 1.62 |
| V4/N4 | 36.26 | Y31/Y62 | 0.55 | TL/ImgH | 1.62 |
| V5/N5 | 11.55 | Y31/Y71 | 0.48 | f/f6 | 1.97 |
| V6/N6 | 23.91 | Y31/Y72 | 0.41 | (|P2| + |P3| + |P4| + |P5|)/(|P6| + |P7|) | 0.32 |
| V7/N7 | 36.46 | | | | |

5th Embodiment

Figure 5A:
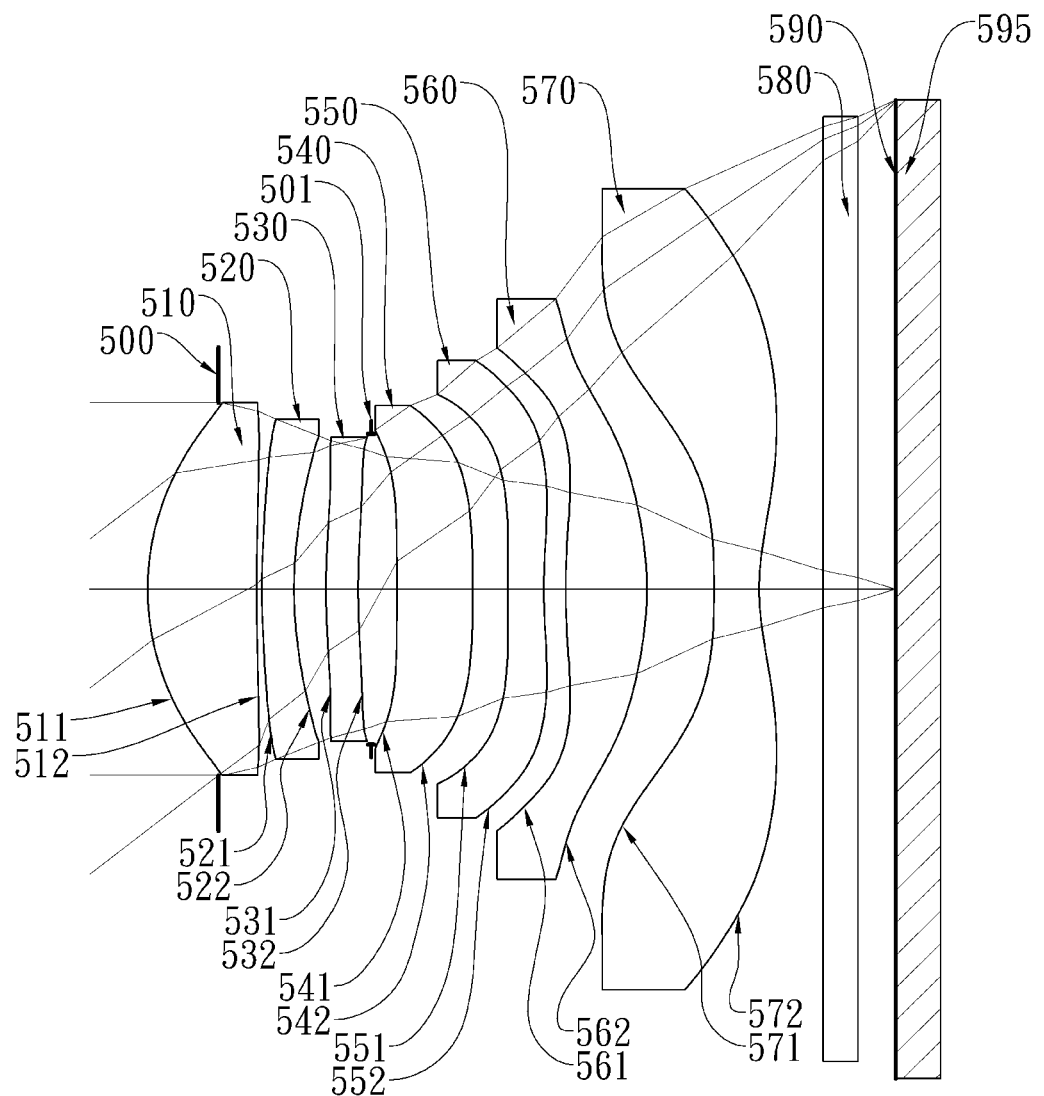
FIG. 5A is a schematic view of an imaging apparatus according to the 5th embodiment of the present disclosure.
Figure 5B:
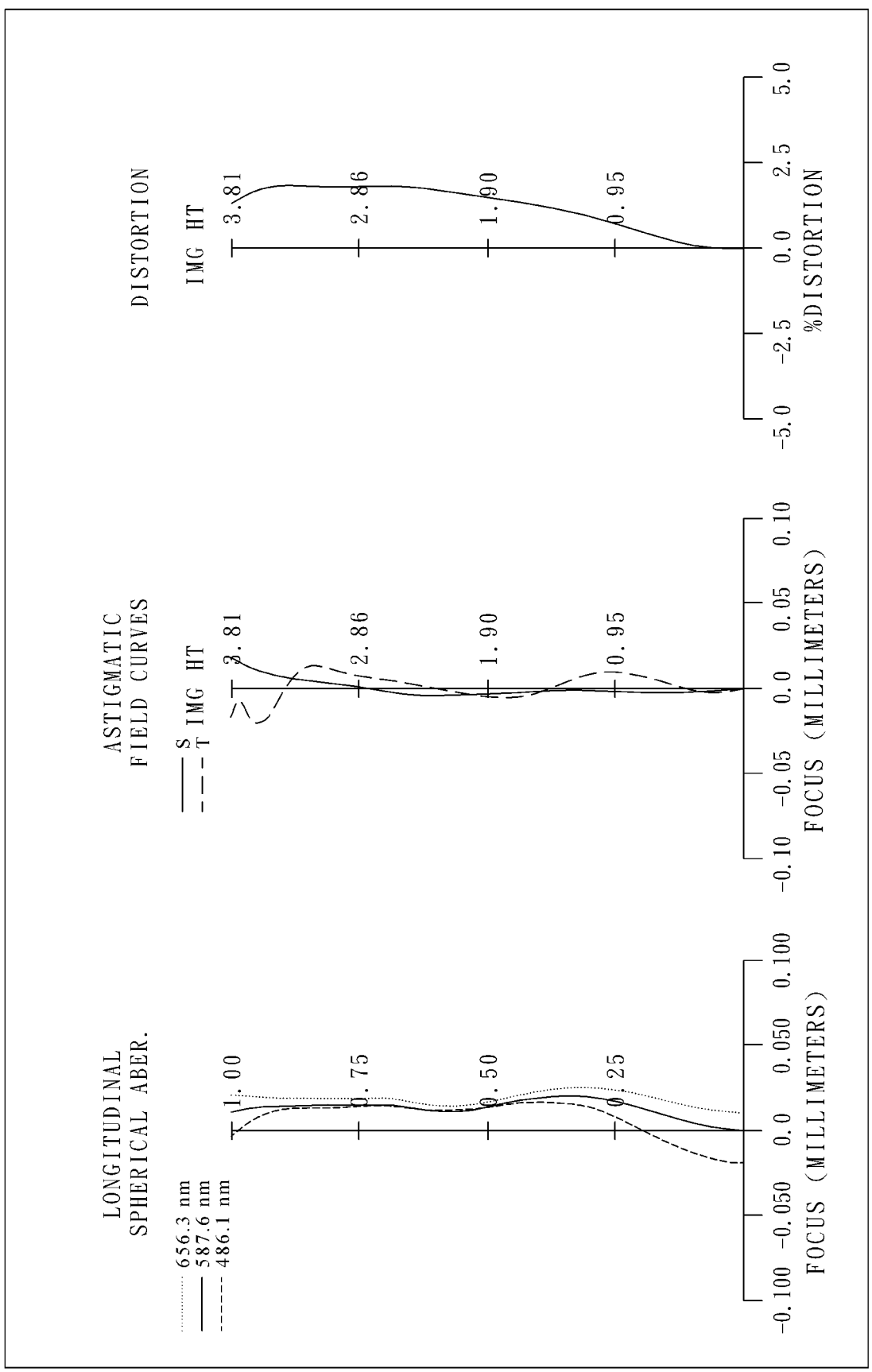
FIG. 5B shows aberration curves of the imaging apparatus according to the 5th embodiment of the present disclosure.

FIG. 5A is a schematic view of an imaging apparatus according to the 5th embodiment of the present disclosure. FIG. 5B shows, in order from left to right, longitudinal spherical aberration curves, astigmatic field curves and a distortion curve of the imaging apparatus according to the 5th embodiment.

In FIG. 5A, the imaging apparatus includes an imaging optical lens assembly (not otherwise herein labeled) of the present disclosure and an image sensor 595. The imaging optical lens assembly includes, in order from an object side to an image side: an aperture stop 500, a first lens element 510, a second lens element 520, a third lens element 530, a stop 501, a fourth lens element 540, a fifth lens element 550, a sixth lens element 560, a seventh lens element 570, an IR cut filter 580, and an image surface 590. The image sensor 595 is disposed on or near the image surface 590 of the imaging optical lens assembly. The optical image capturing lens assembly includes seven lens elements (510, 520, 530, 540, 550, 560 and 570) with no additional lens element disposed between the first lens element 510 and the seventh lens element 570.

The first lens element 510 with positive refractive power has an object-side surface 511 being convex in a paraxial region thereof and an image-side surface 512 being concave in a paraxial region thereof, which are both aspheric, and the first lens element 510 is made of plastic material.

The second lens element 520 with negative refractive power has an object-side surface 521 being convex in a paraxial region thereof and an image-side surface 522 being concave in a paraxial region thereof, which are both aspheric, and the second lens element 520 is made of plastic material.

The third lens element 530 with positive refractive power has an object-side surface 531 being convex in a paraxial region thereof and an image-side surface 532 being concave in a paraxial region thereof, which are both aspheric, and the third lens element 530 is made of plastic material.

The fourth lens element 540 with positive refractive power has an object-side surface 541 being convex in a paraxial region thereof and an image-side surface 542 being convex in a paraxial region thereof, which are both aspheric, and the fourth lens element 540 is made of plastic material.

The fifth lens element 550 with negative refractive power has an object-side surface 551 being convex in a paraxial region thereof, an image-side surface 552 being concave in a paraxial region thereof, which are both aspheric, and the fifth lens element 550 is made of plastic material.

The sixth lens element 560 with positive refractive power has an object-side surface 561 being convex in a paraxial region thereof and an image-side surface 562 being convex in a paraxial region thereof, which are both aspheric, and the sixth lens element 560 is made of plastic material.

The seventh lens element 570 with negative refractive power has an object-side surface 571 being concave in a paraxial region thereof and an image-side surface 572 being concave in a paraxial region thereof, which are both aspheric, and the seventh lens element 570 is made of plastic material. Moreover, the image-side surface 572 has at least one critical point in an off-axis region thereof.

The IR cut filter 580 is disposed between the seventh lens element 570 and the image surface 590. Furthermore, the IR cut filter 580 is made of glass material and will not affect the focal length of the imaging optical lens assembly.

The detailed optical data of the 5th embodiment are shown in TABLE 9, the aspheric surface data are shown in TABLE 10, wherein the units of the curvature radius, the thickness and the focal length are expressed in mm, and HFOV is half of the maximal field of view.

TABLE 9

(Embodiment 5)
f = 4.86 mm, Fno = 1.68, HFOV = 37.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.550 | | | | |
| 2 | Lens 1 | 1.990 | ASP | 0.847 | Plastic | 1.545 | 56.0 | 4.51 |
| 3 | | 8.894 | ASP | 0.042 | | | | |
| 4 | Lens 2 | 5.237 | ASP | 0.250 | Plastic | 1.671 | 19.3 | −12.76 |
| 5 | | 3.187 | ASP | 0.250 | | | | |
| 6 | Lens 3 | 6.001 | ASP | 0.250 | Plastic | 1.671 | 19.3 | 94.95 |
| 7 | | 6.514 | ASP | 0.100 | | | | |
| 8 | Stop | Plano | | 0.201 | | | | |
| 9 | Lens 4 | 749.590 | ASP | 0.591 | Plastic | 1.544 | 56.0 | 21.04 |
| 10 | | −11.619 | ASP | 0.272 | | | | |
| 11 | Lens 5 | 15.482 | ASP | 0.280 | Plastic | 1.671 | 19.3 | −8.42 |
| 12 | | 4.108 | ASP | 0.171 | | | | |
| 13 | Lens 6 | 6.086 | ASP | 0.631 | Plastic | 1.566 | 37.4 | 3.18 |
| 14 | | −2.466 | ASP | 0.524 | | | | |
| 15 | Lens 7 | −7.174 | ASP | 0.350 | Plastic | 1.534 | 55.9 | −2.79 |
| 16 | | 1.908 | ASP | 0.500 | | | | |
| 17 | IR cut filter | Plano | | 0.270 | Glass | 1.517 | 64.2 | — |

TABLE 9-continued (Embodiment 5)
f = 4.86 mm, Fno = 1.68, HFOV = 37.6 deg.

| Surface # | | Curvature Radius | Thickness | Material | Index | Abbe # | Focal Length |
|---|---|---|---|---|---|---|---|
| 18 | | Plano | 0.293 | | | | |
| 19 | Image surface | Plano | — | | | | |

Note:
Reference wavelength is d-line 587.6 nm
The effective radius of Surface 7 is 1.185 mm
The effective radius of Surface 8 is 1.210 mm

TABLE 10

Aspheric Coefficients

| Surface # | 2 | 3 | 4 | 5 | 6 |
|---|---|---|---|---|---|
| k = | −3.0038E−01 | 2.6129E+01 | −3.3015E−02 | −1.4233E+00 | −4.4056E+01 |
| A4 = | 4.1557E−03 | −1.4443E−01 | −1.7319E−01 | −6.3939E−02 | −3.4604E−02 |
| A6 = | −3.0769E−03 | 2.4042E−01 | 3.1134E−01 | 1.0929E−01 | 2.0715E−02 |
| A8 = | 7.0466E−03 | −2.3146E−01 | −3.1098E−01 | −9.1054E−02 | −4.2503E−02 |
| A10 = | −7.3917E−03 | 1.2295E−01 | 1.7603E−01 | 2.3891E−02 | 6.4636E−02 |
| A12 = | 3.7685E−03 | −3.4635E−02 | −5.2474E−02 | 2.5810E−03 | −9.0727E−02 |
| A14 = | −8.8179E−04 | 3.9204E−03 | 6.6658E−03 | | 6.8008E−02 |
| A16 = | | | | | −1.7312E−02 |

| Surface # | 7 | 9 | 10 | 11 | 12 |
|---|---|---|---|---|---|
| k = | −6.4763E+01 | 9.0000E+01 | −3.8595E+01 | 2.0000E+01 | −2.5061E+01 |
| A4 = | −3.3716E−02 | −6.6747E−02 | −7.4741E−02 | −1.6791E−01 | −1.2683E−01 |
| A6 = | 4.4366E−02 | 2.4037E−02 | −6.0918E−03 | 9.7157E−02 | 6.9382E−03 |
| A8 = | −1.3650E−01 | −7.6356E−02 | 1.2761E−02 | −3.6948E−02 | 6.5696E−02 |
| A10 = | 2.4744E−01 | 9.0151E−02 | −2.9112E−02 | −3.9970E−03 | −5.7763E−02 |
| A12 = | −2.5524E−01 | −5.9342E−02 | 2.0034E−02 | −3.3170E−03 | 1.9859E−02 |
| A14 = | 1.4183E−01 | 1.6650E−02 | −5.5781E−03 | 6.0802E−03 | −2.9285E−03 |
| A16 = | −3.0084E−02 | | 4.6508E−04 | −1.5403E−03 | 1.3948E−04 |

| Surface # | 13 | 14 | 15 | 16 |
|---|---|---|---|---|
| k = | −8.9769E−01 | −7.3697E+00 | 3.2015E+00 | −9.5797E+00 |
| A4 = | 1.1240E−02 | 4.4025E−02 | −1.4430E−01 | −9.2093E−02 |
| A6 = | −1.6029E−01 | −7.0526E−02 | 4.9215E−02 | 4.2269E−02 |
| A8 = | 1.8406E−01 | 2.8455E−02 | −1.1498E−02 | −1.3875E−02 |
| A10 = | −1.5549E−01 | −7.6722E−03 | 4.3080E−03 | 3.2825E−03 |
| A12 = | 1.0079E−01 | 3.1266E−03 | −1.2888E−03 | −5.5350E−04 |
| A14 = | −4.5754E−02 | −1.0671E−03 | 2.2178E−04 | 6.2796E−05 |
| A16 = | 1.2863E−02 | 1.9936E−04 | −2.1450E−05 | −4.4356E−06 |
| A18 = | −1.9570E−03 | −1.8570E−05 | 1.0987E−06 | 1.7327E−07 |
| A20 = | 1.2201E−04 | 6.8467E−07 | −2.3306E−08 | −2.8230E−09 |

In the 5th embodiment, the equation of the aspheric surface profiles of the aforementioned lens elements is the same as the equation from the 1st embodiment. Also, the definitions of the parameters shown in the table below are the same as those stated in the 1st embodiment, but the values for the conditions in the 5th embodiment are as specified below.

| Embodiment 5 | | | | |
|---|---|---|---|---|
| f [mm] | 4.86 | Y31/Y11 | 0.80 | Yc62/Yc72 | 0 |
| Fno | 1.68 | Y31/Y12 | 0.84 | EPD/(CT2 + CT3) | 5.80 |
| HFOV [deg.] | 37.6 | Y31/Y21 | 0.88 | CT1/(CT2 + CT3 + CT5) | 1.09 |
| V25 | 3 | Y31/Y22 | 0.98 | CT4/(CT2 + CT3) | 1.18 |
| V2 + V3 | 38.59 | Y31/Y41 | 0.94 | (T12 + T34 + T45 + T56)/(T23 + T67) | 1.02 |
| Nmax | 1.67 | Y31/Y42 | 0.82 | T67/T45 | 1.93 |
| V1/N1 | 36.27 | Y31/Y51 | 0.77 | (R11 + R12)/(R11 − R12) | 0.42 |

-continued

| Embodiment 5 | | | | |
|---|---|---|---|---|
| V2/N2 | 11.55 | Y31/Y52 | 0.66 | f/R5 | 0.81 |
| V3/N3 | 11.55 | Y31/Y61 | 0.62 | f/R10 | 1.18 |
| V4/N4 | 36.26 | Y31/Y62 | 0.52 | TL/ImgH | 1.53 |
| V5/N5 | 11.55 | Y31/Y71 | 0.43 | f/f6 | 1.53 |
| V6/N6 | 23.91 | Y31/Y72 | 0.37 | (|P2| + |P3| + |P4| + |P5|)/(|P6| + |P7|) | 0.38 |
| V7/N7 | 36.46 | | | | |

6th Embodiment

Figure 6A:
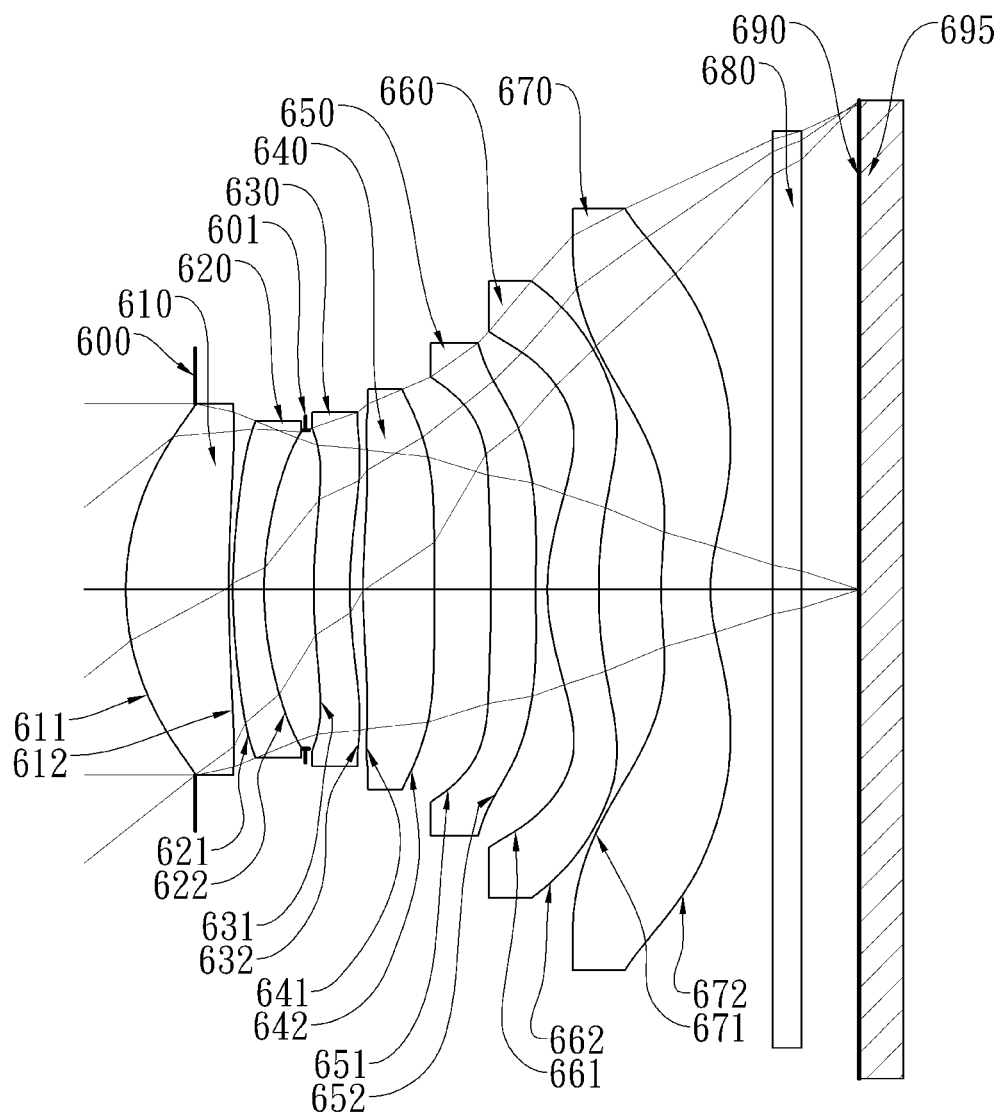
FIG. 6A is a schematic view of an imaging apparatus according to the 6th embodiment of the present disclosure.
Figure 6B:
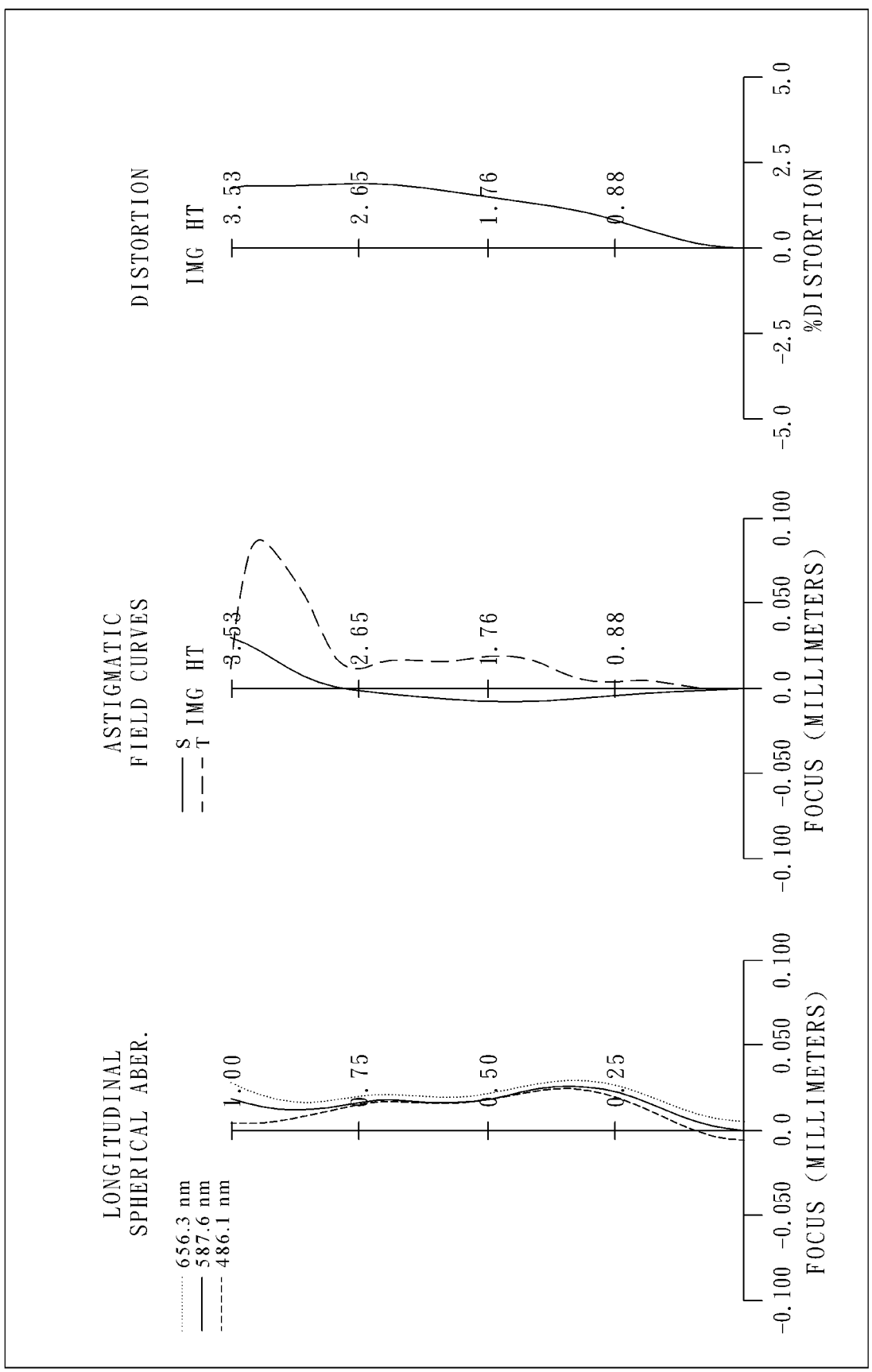
FIG. 6B shows aberration curves of the imaging apparatus according to the 6th embodiment of the present disclosure.

FIG. 6A is a schematic view of an imaging apparatus according to the 6th embodiment of the present disclosure. FIG. 6B shows, in order from left to right, longitudinal spherical aberration curves, astigmatic field curves and a distortion curve of the imaging apparatus according to the 6th embodiment.

In FIG. 6A, the imaging apparatus includes an imaging optical lens assembly (not otherwise herein labeled) of the present disclosure and an image sensor 695. The imaging optical lens assembly includes, in order from an object side to an image side: an aperture stop 600, a first lens element 610, a second lens element 620, a stop 601, a third lens element 630, a fourth lens element 640, a fifth lens element 650, a sixth lens element 660, a seventh lens element 670, an IR cut filter 680, and an image surface 690. The image sensor 695 is disposed on or near the image surface 690 of the imaging optical lens assembly. The optical image capturing lens assembly includes seven lens elements (610, 620, 630, 640, 650, 660 and 670) with no additional lens element disposed between the first lens element 610 and the seventh lens element 670.

The first lens element 610 with positive refractive power has an object-side surface 611 being convex in a paraxial region thereof and an image-side surface 612 being concave in a paraxial region thereof, which are both aspheric, and the first lens element 610 is made of plastic material.

The second lens element 620 with negative refractive power has an object-side surface 621 being convex in a paraxial region thereof and an image-side surface 622 being concave in a paraxial region thereof, which are both aspheric, and the second lens element 620 is made of plastic material.

The third lens element 630 with negative refractive power has an object-side surface 631 being convex in a paraxial region thereof and an image-side surface 632 being concave in a paraxial region thereof, which are both aspheric, and the third lens element 630 is made of plastic material. Moreover, the image-side surface 632 has at least one critical point in an off-axis region thereof.

The fourth lens element 640 with positive refractive power has an object-side surface 641 being convex in a paraxial region thereof and an image-side surface 642 being concave in a paraxial region thereof, which are both aspheric, and the fourth lens element 640 is made of plastic material.

The fifth lens element 650 with negative refractive power has an object-side surface 651 being concave in a paraxial region thereof and an image-side surface 652 being concave in a paraxial region thereof, which are both aspheric, and the fifth lens element 650 is made of plastic material.

The sixth lens element 660 with positive refractive power has an object-side surface 661 being convex in a paraxial region thereof and an image-side surface 662 being concave in a paraxial region thereof, which are both aspheric, and the sixth lens element 660 is made of plastic material.

The seventh lens element 670 with negative refractive power has an object-side surface 671 being convex in a paraxial region thereof and an image-side surface 672 being concave in a paraxial region thereof, which are both aspheric, and the seventh lens element 670 is made of plastic material. Moreover, the image-side surface 672 has at least one critical point in an off-axis region thereof.

The IR cut filter 680 is disposed between the seventh lens element 670 and the image surface 690. Furthermore, the IR cut filter 680 is made of glass material and will not affect the focal length of the imaging optical lens assembly.

The detailed optical data of the 6th embodiment are shown in TABLE 11, the aspheric surface data are shown in TABLE 12, wherein the units of the curvature radius, the thickness and the focal length are expressed in mm, and HFOV is half of the maximal field of view.

TABLE 11

(Embodiment 6)
f = 4.34 mm, Fno = 1.62, HFOV = 38.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.500 | | | | |
| 2 | Lens 1 | 1.906 | ASP | 0.743 | Plastic | 1.545 | 56.1 | 4.42 |
| 3 | | 7.879 | ASP | 0.030 | | | | |
| 4 | Lens 2 | 3.956 | ASP | 0.225 | Plastic | 1.671 | 19.3 | −10.81 |
| 5 | | 2.501 | ASP | 0.299 | | | | |
| 6 | Stop | Plano | | 0.060 | | | | |
| 7 | Lens 3 | 3.971 | ASP | 0.260 | Plastic | 1.671 | 19.3 | −20.02 |
| 8 | | 2.984 | ASP | 0.096 | | | | |
| 9 | Lens 4 | 5.147 | ASP | 0.513 | Plastic | 1.544 | 56.0 | 9.61 |
| 10 | | 319.625 | ASP | 0.409 | | | | |
| 11 | Lens 5 | −11.576 | ASP | 0.324 | Plastic | 1.566 | 37.4 | −10.18 |
| 12 | | 11.601 | ASP | 0.083 | | | | |
| 13 | Lens 6 | 1.506 | ASP | 0.371 | Plastic | 1.544 | 56.0 | 4.19 |
| 14 | | 4.047 | ASP | 0.450 | | | | |
| 15 | Lens 7 | 2.545 | ASP | 0.355 | Plastic | 1.534 | 55.9 | −4.62 |
| 16 | | 1.192 | ASP | 0.450 | | | | |
| 17 | IR cut filter | Plano | | 0.210 | Glass | 1.517 | 64.2 | — |
| 18 | | Plano | | 0.413 | | | | |
| 19 | Image surface | Plano | | — | | | | |

Note:
Reference wavelength is d-line 587.6 nm
The effective radius of Surface 6 is 1.150 mm

TABLE 12

Aspheric Coefficients

| Surface # | 2 | 3 | 4 | 5 | 7 |
|---|---|---|---|---|---|
| k = | −1.0074E+00 | 1.6648E+01 | 4.3918E−01 | −1.6234E−01 | −5.1092E+01 |
| A4 = | 1.2264E−02 | −7.6574E−02 | −9.6011E−02 | −3.9576E−02 | 4.5157E−03 |
| A6 = | 1.5228E−02 | 9.1787E−02 | 1.1381E−01 | 3.9794E−02 | −5.8740E−02 |
| A8 = | −1.9016E−02 | −7.3880E−02 | −7.2938E−02 | −1.6197E−02 | 3.1183E−02 |
| A10 = | 1.1305E−02 | 3.0954E−02 | 2.3870E−02 | 2.7265E−03 | −3.0207E−02 |
| A12 = | −2.7518E−03 | −5.8091E−03 | 2.4208E−03 | 2.0273E−03 | −4.0964E−03 |
| A14 = | −2.4138E−04 | −1.2225E−04 | −2.1708E−03 | | 9.6531E−03 |

| Surface # | 8 | 9 | 10 | 11 | 12 |
|---|---|---|---|---|---|
| k = | −2.7425E+01 | −7.1871E+01 | 9.0000E+01 | 4.1523E+01 | 1.8569E+01 |
| A4 = | 9.9727E−04 | −1.2779E−02 | −3.1516E−02 | 4.9229E−02 | −2.6663E−01 |
| A6 = | −1.2664E−01 | −1.5475E−01 | −4.0885E−02 | −4.8636E−02 | 2.9120E−01 |
| A8 = | 2.4766E−01 | 3.0661E−01 | 4.8273E−03 | 4.0903E−02 | −1.9222E−01 |
| A10 = | −2.8866E−01 | −2.9664E−01 | 1.9829E−02 | −6.9092E−02 | 5.2638E−02 |
| A12 = | 1.5449E−01 | 1.4581E−01 | −1.2064E−02 | 4.6500E−02 | 5.0772E−04 |
| A14 = | −2.8876E−02 | −2.7704E−02 | 2.2807E−03 | −1.4473E−02 | −2.6077E−03 |
| A16 = | | | | 1.7890E−03 | 3.1998E−04 |

| Surface # | 13 | 14 | 15 | 16 |
|---|---|---|---|---|
| k = | −3.6733E+00 | −9.0000E+01 | −2.8740E+01 | −6.4028E+00 |
| A4 = | −1.0296E−01 | 2.5158E−01 | −3.2085E−01 | −2.0612E−01 |
| A6 = | 1.0688E−01 | −4.1247E−01 | 1.9242E−01 | 1.4386E−01 |
| A8 = | −2.0926E−01 | 3.6797E−01 | −7.9021E−02 | −7.5848E−02 |
| A10 = | 2.4552E−01 | −2.3131E−01 | 2.5872E−02 | 2.8481E−02 |
| A12 = | −1.9241E−01 | 9.7229E−02 | −6.2610E−03 | −7.1870E−03 |
| A14 = | 9.4418E−02 | −2.6016E−02 | 1.0292E−03 | 1.1674E−03 |
| A16 = | −2.7125E−02 | 4.2253E−03 | −1.0708E−04 | −1.1638E−04 |
| A18 = | 4.1361E−03 | −3.7914E−04 | 6.3361E−06 | 6.4742E−06 |
| A20 = | −2.5729E−04 | 1.4415E−05 | −1.6233E−07 | −1.5391E−07 |

In the 6th embodiment, the equation of the aspheric surface profiles of the aforementioned lens elements is the same as the equation from the 1st embodiment. Also, the definitions of the parameters shown in the table below are the same as those stated in the 1st embodiment, but the values for the conditions in the 6th embodiment are as specified below.

| Embodiment 6 | | | |
|---|---|---|---|
| f [mm] | 4.34 | Y31/Y11 | 0.87 | Yc62/Yc72 | 1.11 |
| Fno | 1.62 | Y31/Y12 | 0.91 | EPD/(CT2 + CT3) | 5.53 |
| HFOV [deg.] | 38.5 | Y31/Y21 | 0.96 | CT1/(CT2 + CT3 + CT5) | 0.92 |
| V25 | 2 | Y31/Y22 | 1.02 | CT4/(CT2 + CT3) | 1.06 |
| V2 + V3 | 38.59 | Y31/Y41 | 0.87 | (T12 + T34 + T45 + T56)/(T23 + T67) | 0.76 |
| Nmax | 1.67 | Y31/Y42 | 0.81 | T67/T45 | 1.10 |
| V1/N1 | 36.30 | Y31/Y51 | 0.76 | (R11 + R12)/(R11 − R12) | −2.19 |
| V2/N2 | 11.55 | Y31/Y52 | 0.66 | f/R5 | 1.09 |
| V3/N3 | 11.55 | Y31/Y61 | 0.63 | f/R10 | 0.37 |
| V4/N4 | 36.26 | Y31/Y62 | 0.52 | TL/ImgH | 1.50 |
| V5/N5 | 23.91 | Y31/Y71 | 0.46 | f/f6 | 1.04 |
| V6/N6 | 36.26 | Y31/Y72 | 0.42 | (|P2| + |P3| + |P4| + |P5|)/(|P6| + |P7|) | 0.76 |
| V7/N7 | 36.46 | | | | |

7th Embodiment

Figure 7A:
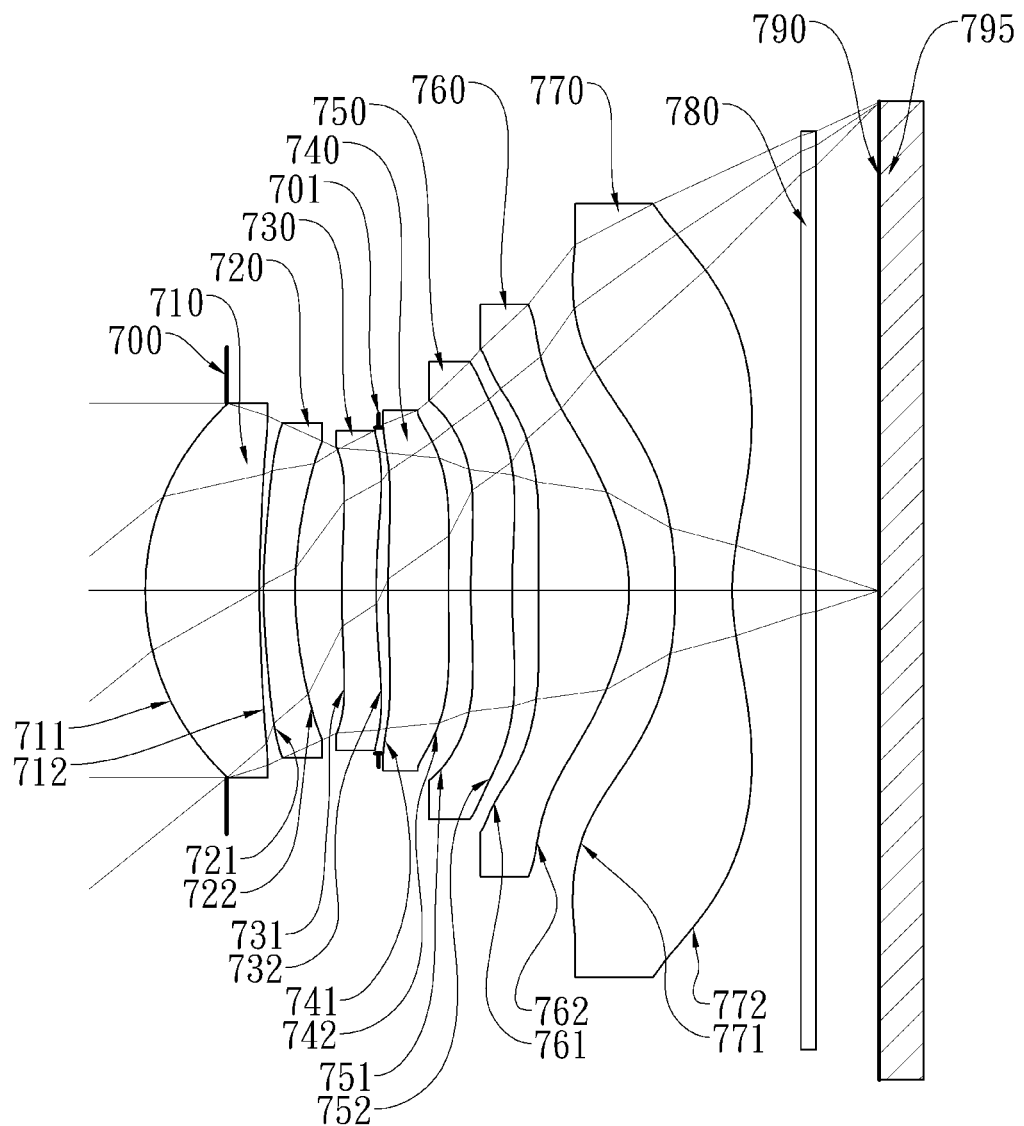
FIG. 7A is a schematic view of an imaging apparatus according to the 7th embodiment of the present disclosure.
Figure 7B:
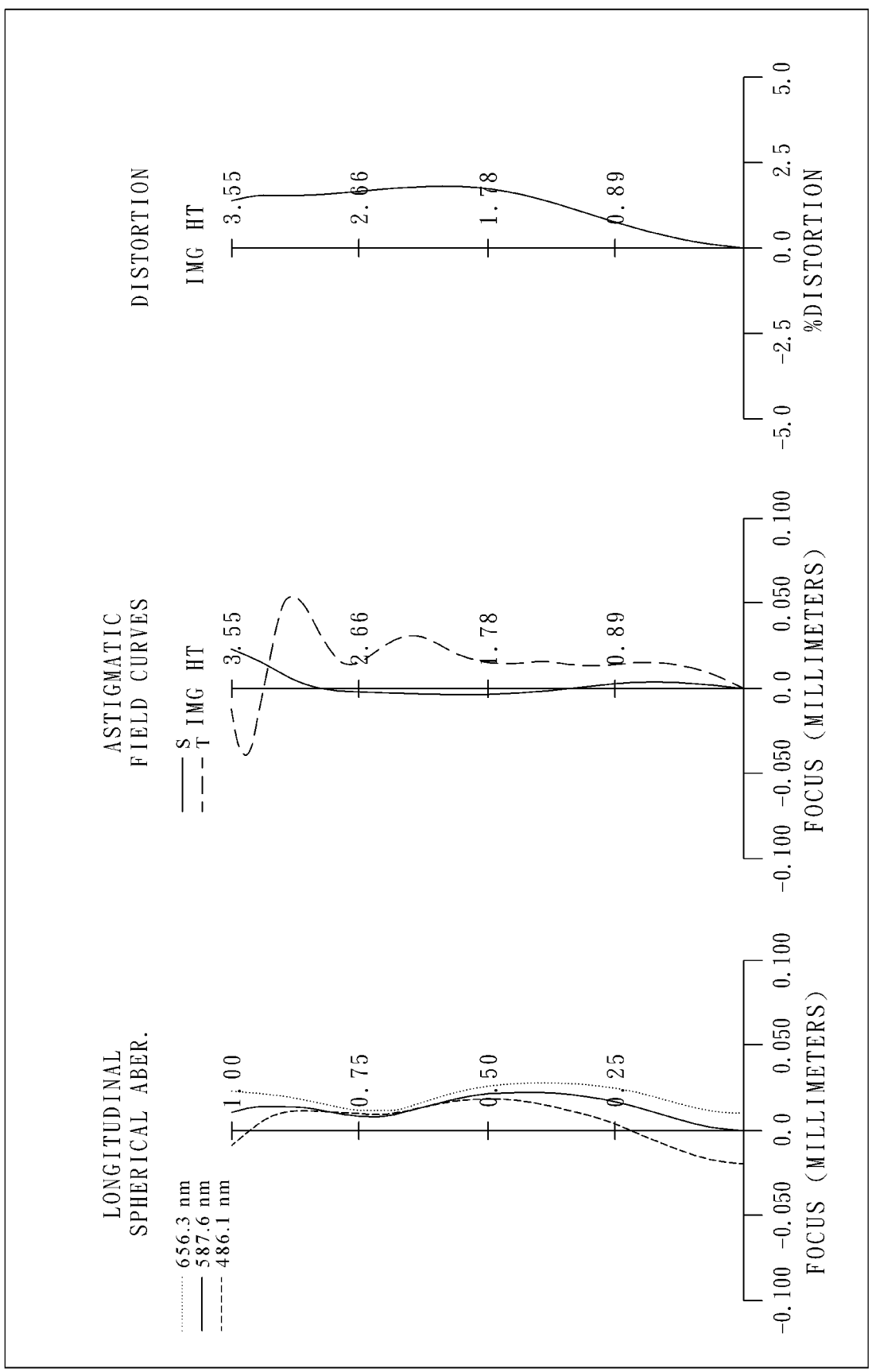
FIG. 7B shows aberration curves of the imaging apparatus according to the 7th embodiment of the present disclosure.

FIG. 7A is a schematic view of an imaging apparatus according to the 7th embodiment of the present disclosure. FIG. 7B shows, in order from left to right, longitudinal spherical aberration curves, astigmatic field curves and a distortion curve of the imaging apparatus according to the 7th embodiment.

In FIG. 7A, the imaging apparatus includes an imaging optical lens assembly (not otherwise herein labeled) of the present disclosure and an image sensor 795. The imaging optical lens assembly includes, in order from an object side to an image side: an aperture stop 700, a first lens element 710, a second lens element 720, a third lens element 730, a stop 701, a fourth lens element 740, a fifth lens element 750, a sixth lens element 760, a seventh lens element 770, an IR cut filter 780, and an image surface 790. The image sensor 795 is disposed on or near the image surface 790 of the imaging optical lens assembly. The optical image capturing lens assembly includes seven lens elements (710, 720, 730, 740, 750, 760 and 770) with no additional lens element disposed between the first lens element 710 and the seventh lens element 770.

The first lens element 710 with positive refractive power has an object-side surface 711 being convex in a paraxial region thereof and an image-side surface 712 being concave in a paraxial region thereof, which are both aspheric, and the first lens element 710 is made of plastic material.

The second lens element 720 with negative refractive power has an object-side surface 721 being convex in a paraxial region thereof and an image-side surface 722 being concave in a paraxial region thereof, which are both aspheric, and the second lens element 720 is made of plastic material.

The third lens element 730 with negative refractive power has an object-side surface 731 being convex in a paraxial region thereof and an image-side surface 732 being concave in a paraxial region thereof, which are both aspheric, and the third lens element 730 is made of plastic material. Moreover, the image-side surface 732 has at least one critical point in an off-axis region thereof.

The fourth lens element 740 with positive refractive power has an object-side surface 741 being convex in a paraxial region thereof and an image-side surface 742 being concave in a paraxial region thereof, which are both aspheric, and the fourth lens element 740 is made of plastic material.

The fifth lens element 750 with negative refractive power has an object-side surface 751 being convex in a paraxial region thereof, an image-side surface 752 being concave in a paraxial region thereof, which are both aspheric, and the fifth lens element 750 is made of plastic material.

The sixth lens element 760 with positive refractive power has an object-side surface 761 being convex in a paraxial region thereof and an image-side surface 762 being convex in a paraxial region thereof, which are both aspheric, and the sixth lens element 760 is made of plastic material.

The seventh lens element 770 with negative refractive power has an object-side surface 771 being concave in a paraxial region thereof and an image-side surface 772 being concave in a paraxial region thereof, which are both aspheric, and the seventh lens element 770 is made of plastic material. Moreover, the image-side surface 772 has at least one critical point in an off-axis region thereof.

The IR cut filter 780 is disposed between the seventh lens element 770 and the image surface 790. Furthermore, the IR cut filter 780 is made of glass material and will not affect the focal length of the imaging optical lens assembly.

The detailed optical data of the 7th embodiment are shown in TABLE 13, the aspheric surface data are shown in TABLE 14, wherein the units of the curvature radius, the thickness and the focal length are expressed in mm, and HFOV is half of the maximal field of view.

TABLE 13

(Embodiment 7)
f = 4.31 mm, Fno = 1.58, HFOV = 39.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.592 | | | | |
| 2 | Lens 1 | 1.847 | ASP | 0.831 | Plastic | 1.545 | 56.1 | 4.39 |
| 3 | | 6.786 | ASP | 0.030 | | | | |
| 4 | Lens 2 | 4.082 | ASP | 0.230 | Plastic | 1.669 | 19.5 | −14.82 |
| 5 | | 2.826 | ASP | 0.340 | | | | |
| 6 | Lens 3 | 7.274 | ASP | 0.250 | Plastic | 1.669 | 19.5 | −23.41 |
| 7 | | 4.898 | ASP | 0.017 | | | | |
| 8 | Stop | Plano | | 0.070 | | | | |
| 9 | Lens 4 | 8.256 | ASP | 0.440 | Plastic | 1.544 | 56.0 | 32.69 |
| 10 | | 15.119 | ASP | 0.162 | | | | |
| 11 | Lens 5 | 5.408 | ASP | 0.300 | Plastic | 1.669 | 19.5 | −323.67 |
| 12 | | 5.159 | ASP | 0.195 | | | | |
| 13 | Lens 6 | 393.802 | ASP | 0.657 | Plastic | 1.544 | 56.0 | 2.45 |
| 14 | | −1.339 | ASP | 0.337 | | | | |
| 15 | Lens 7 | −3.191 | ASP | 0.414 | Plastic | 1.534 | 55.9 | −2.12 |
| 16 | | 1.829 | ASP | 0.500 | | | | |
| 17 | IR cut filter | Plano | | 0.110 | Glass | 1.517 | 64.2 | — |
| 18 | | Plano | | 0.459 | | | | |
| 19 | Image surface | Plano | | — | | | | |

Note:
Reference wavelength is d-line 587.6 nm
The effective radius of Surface 8 is 1.187 mm

TABLE 14

Aspheric Coefficients

| Surface # | 2 | 3 | 4 | 5 | 6 |
|---|---|---|---|---|---|
| k = | −1.4935E−01 | 2.0390E+01 | 1.3722E+00 | 1.3753E+00 | −3.3508E+01 |
| A4 = | −1.7817E−03 | −1.4039E−01 | −1.5496E−01 | −5.0609E−02 | −3.3376E−02 |
| A6 = | 2.3574E−02 | 2.4420E−01 | 2.3459E−01 | 2.5892E−02 | −4.6054E−02 |
| A8 = | −4.8920E−02 | −2.8309E−01 | −2.2548E−01 | 4.0905E−03 | −8.0622E−04 |
| A10 = | 6.3139E−02 | 2.1219E−01 | 1.3490E−01 | −2.3732E−02 | 3.3668E−02 |
| A12 = | −4.6358E−02 | −1.0222E−01 | −4.0274E−02 | 1.6663E−02 | −1.0717E−01 |
| A14 = | 1.8209E−02 | 2.8885E−02 | 3.1236E−03 | −2.0885E−03 | 1.0179E−01 |
| A16 = | −3.0183E−03 | −3.8881E−03 | 9.2034E−04 | | −3.1350E−02 |

| Surface # | 7 | 9 | 10 | 11 | 12 |
|---|---|---|---|---|---|
| k = | −7.5778E+01 | 2.1770E+01 | 9.0000E+01 | 1.1329E+01 | −1.2126E+01 |
| A4 = | 1.4372E−02 | −8.1235E−02 | −9.6462E−02 | −1.3074E−01 | −8.9625E−02 |
| A6 = | −5.9892E−02 | 2.9326E−02 | −1.6117E−01 | −2.1146E−01 | −1.6041E−01 |
| A8 = | −2.3299E−02 | 6.6369E−03 | 5.2526E−01 | 6.1539E−01 | 3.2395E−01 |
| A10 = | 6.9945E−02 | −1.2281E−01 | −8.7890E−01 | −8.3511E−01 | −2.8400E−01 |
| A12 = | −1.2133E−01 | 1.2193E−01 | 7.7216E−01 | 5.9086E−01 | 1.2917E−01 |
| A14 = | 1.0493E−01 | −3.2115E−02 | −3.4091E−01 | −2.0884E−01 | −2.8984E−02 |
| A16 = | −3.0173E−02 | | 6.0425E−02 | 2.8903E−02 | 2.5198E−03 |

TABLE 14-continued

| Aspheric Coefficients | | | | |
|---|---|---|---|---|
| Surface # | 13 | 14 | 15 | 16 |
| k = | 9.0000E+01 | −6.1966E+00 | −3.3430E+00 | −1.1857E+01 |
| A4 = | −1.9886E−02 | −1.0228E−01 | −6.6243E−02 | −6.7930E−02 |
| A6 = | −3.5924E−02 | 1.4623E−01 | 4.8219E−03 | 2.6428E−02 |
| A8 = | −1.2466E−01 | −1.9786E−01 | −1.1653E−02 | −9.5791E−03 |
| A10 = | 2.6752E−01 | 1.5123E−01 | 1.7358E−02 | 2.5255E−03 |
| A12 = | −2.1949E−01 | −6.2229E−02 | −7.9611E−03 | −4.3794E−04 |
| A14 = | 9.0050E−02 | 1.4211E−02 | 1.8269E−03 | 4.4306E−05 |
| A16 = | −1.8218E−02 | −1.7259E−03 | −2.3231E−04 | −2.1167E−06 |
| A18 = | 1.4443E−03 | 9.1171E−05 | 1.5751E−05 | 1.2068E−08 |
| A20 = | | −6.6671E−07 | −4.4714E−07 | 1.6632E−09 |

In the 7th embodiment, the equation of the aspheric surface profiles of the aforementioned lens elements is the same as the equation from the 1st embodiment. Also, the definitions of the parameters shown in the table below are the same as those stated in the 1st embodiment, but the values for the conditions in the 7th embodiment are as specified below.

| Embodiment 7 | | | | |
|---|---|---|---|---|
| f [mm] | 4.31 | Y31/Y11 | 0.77 | Yc62/Yc72 | 0 |
| Fno | 1.58 | Y31/Y12 | 0.82 | EPD/(CT2 + CT3) | 5.69 |
| HFOV [deg.] | 39.0 | Y31/Y21 | 0.86 | CT1/(CT2 + CT3 + CT5) | 1.07 |
| V25 | 3 | Y31/Y22 | 0.96 | CT4/(CT2 + CT3) | 0.92 |
| V2 + V3 | 38.90 | Y31/Y41 | 0.87 | (T12 + T34 + T45 + T56)/(T23 + T67) | 0.70 |
| Nmax | 1.67 | Y31/Y42 | 0.80 | T67/T45 | 2.08 |
| V1/N1 | 36.30 | Y31/Y51 | 0.76 | (R11 + R12)/(R11 − R12) | 0.99 |
| V2/N2 | 11.66 | Y31/Y52 | 0.63 | f/R5 | 0.59 |
| V3/N3 | 11.66 | Y31/Y61 | 0.60 | f/R10 | 0.84 |
| V4/N4 | 36.26 | Y31/Y62 | 0.50 | TL/ImgH | 1.50 |
| V5/N5 | 11.66 | Y31/Y71 | 0.42 | f/f6 | 1.76 |
| V6/N6 | 36.26 | Y31/Y72 | 0.37 | (|P2| + |P3| + |P4| + |P5|)/(|P6| + |P7|) | 0.16 |
| V7/N7 | 36.46 | | | | |

8th Embodiment

Figure 8A:
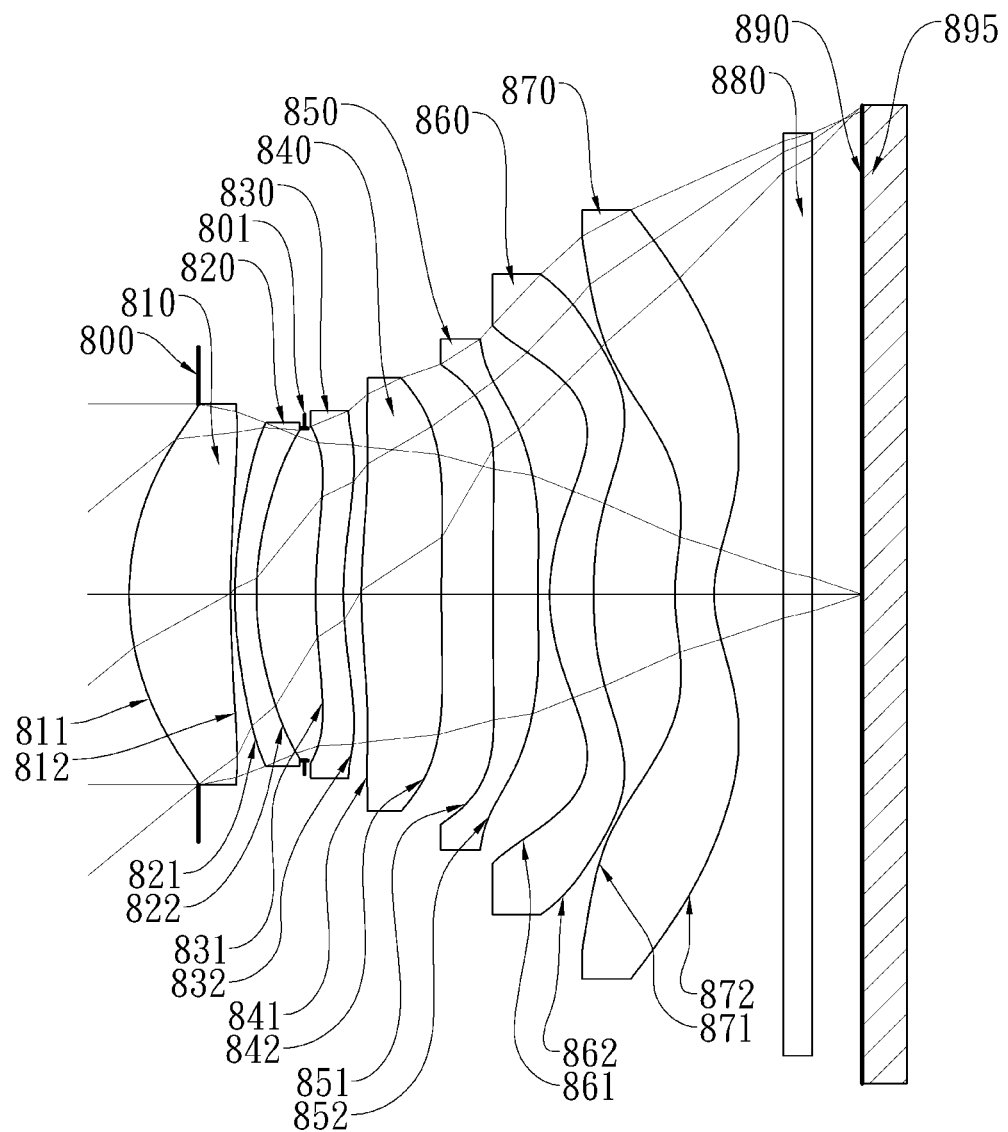
FIG. 8A is a schematic view of an imaging apparatus according to the 8th embodiment of the present disclosure.
Figure 8B:
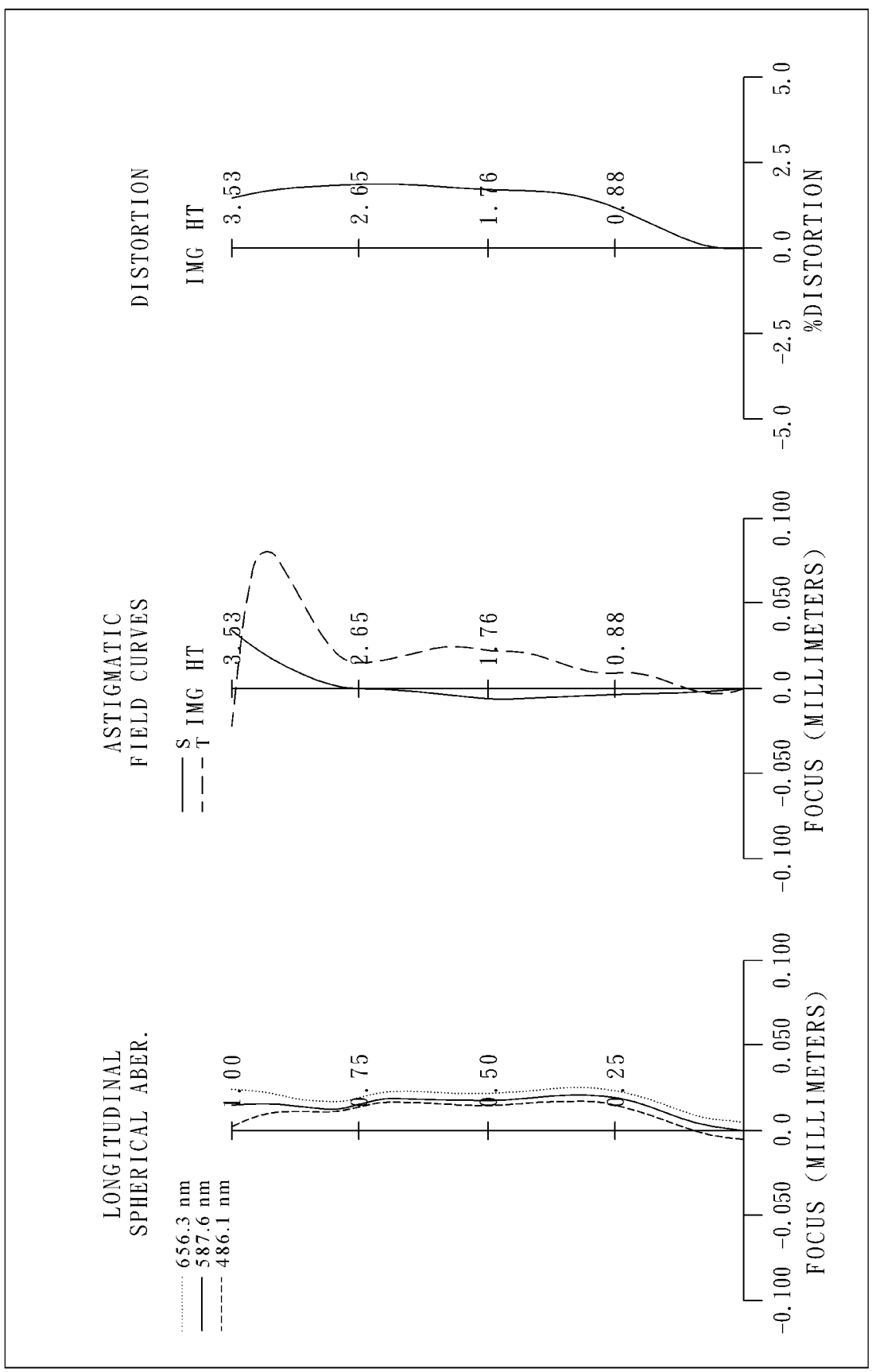
FIG. 8B shows aberration curves of the imaging apparatus according to the 8th embodiment of the present disclosure.

FIG. 8A is a schematic view of an imaging apparatus according to the 8th embodiment of the present disclosure. FIG. 8B shows, in order from left to right, longitudinal spherical aberration curves, astigmatic field curves and a distortion curve of the imaging apparatus according to the 8th embodiment.

In FIG. 8A, the imaging apparatus includes an imaging optical lens assembly (not otherwise herein labeled) of the present disclosure and an image sensor 895. The imaging optical lens assembly includes, in order from an object side to an image side: an aperture stop 800, a first lens element 810, a second lens element 820, a stop 801, a third lens element 830, a fourth lens element 840, a fifth lens element 850, a sixth lens element 860, a seventh lens element 870, an IR cut filter 880, and an image surface 890. The image sensor 895 is disposed on or near the image surface 890 of the imaging optical lens assembly. The optical image capturing lens assembly includes seven lens elements (810, 820, 830, 840, 850, 860 and 870) with no additional lens element disposed between the first lens element 810 and the seventh lens element 870.

The first lens element 810 with positive refractive power has an object-side surface 811 being convex in a paraxial region thereof and an image-side surface 812 being concave in a paraxial region thereof, which are both aspheric, and the first lens element 810 is made of glass material.

The second lens element 820 with negative refractive power has an object-side surface 821 being convex in a paraxial region thereof and an image-side surface 822 being concave in a paraxial region thereof, which are both aspheric, and the second lens element 820 is made of plastic material.

The third lens element 830 with negative refractive power has an object-side surface 831 being convex in a paraxial region thereof and an image-side surface 832 being concave in a paraxial region thereof, which are both aspheric, and the third lens element 830 is made of plastic material. Moreover, the image-side surface 832 has at least one critical point in an off-axis region thereof.

The fourth lens element 840 with positive refractive power has an object-side surface 841 being convex in a paraxial region thereof and an image-side surface 842 being concave in a paraxial region thereof, which are both aspheric, and the fourth lens element 840 is made of plastic material.

The fifth lens element 850 with negative refractive power has an object-side surface 851 being convex in a paraxial region thereof, an image-side surface 852 being concave in a paraxial region thereof, which are both aspheric, and the fifth lens element 850 is made of plastic material.

The sixth lens element 860 with positive refractive power has an object-side surface 861 being convex in a paraxial region thereof and an image-side surface 862 being concave in a paraxial region thereof, which are both aspheric, and the sixth lens element 860 is made of plastic material.

The seventh lens element 870 with negative refractive power has an object-side surface 871 being convex in a paraxial region thereof and an image-side surface 872 being concave in a paraxial region thereof, which are both aspheric, and the seventh lens element 870 is made of plastic material. Moreover, the image-side surface 872 has at least one critical point in an off-axis region thereof.

The IR cut filter 880 is disposed between the seventh lens element 870 and the image surface 890. Furthermore, the IR cut filter 880 is made of glass material and will not affect the focal length of the imaging optical lens assembly.

The detailed optical data of the 8th embodiment are shown in TABLE 15, the aspheric surface data are shown in TABLE 16, wherein the units of the curvature radius, the thickness and the focal length are expressed in mm, and HFOV is half of the maximal field of view.

TABLE 15

(Embodiment 8)
f = 4.21 mm, Fno = 1.53, HFOV = 39.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.500 | | | | |
| 2 | Lens 1 | 1.992 | ASP | 0.733 | Glass | 1.518 | 63.5 | 4.80 |
| 3 | | 8.756 | ASP | 0.030 | | | | |
| 4 | Lens 2 | 2.986 | ASP | 0.156 | Plastic | 1.671 | 19.3 | −12.86 |
| 5 | | 2.171 | ASP | 0.347 | | | | |
| 6 | Stop | Plano | | 0.081 | | | | |
| 7 | Lens 3 | 3.518 | ASP | 0.200 | Plastic | 1.671 | 19.3 | −18.20 |
| 8 | | 2.669 | ASP | 0.131 | | | | |
| 9 | Lens 4 | 4.527 | ASP | 0.577 | Plastic | 1.544 | 55.9 | 11.34 |
| 10 | | 16.259 | ASP | 0.373 | | | | |
| 11 | Lens 5 | 100.000 | ASP | 0.323 | Plastic | 1.550 | 50.0 | −15.71 |
| 12 | | 7.942 | ASP | 0.085 | | | | |
| 13 | Lens 6 | 1.433 | ASP | 0.317 | Plastic | 1.544 | 55.9 | 4.10 |
| 14 | | 3.697 | ASP | 0.588 | | | | |
| 15 | Lens 7 | 1.577 | ASP | 0.282 | Plastic | 1.544 | 55.9 | −4.63 |
| 16 | | 0.908 | ASP | 0.500 | | | | |
| 17 | IR cut filter | Plano | | 0.210 | Glass | 1.517 | 64.2 | — |
| 18 | | Plano | | 0.360 | | | | |
| 19 | Image surface | Plano | | — | | | | |

Note:
Reference wavelength is d-line 587.6 nm
The effective radius of Surface 6 is 1.200 mm

TABLE 16

Aspheric Coefficients

| Surface # | 2 | 3 | 4 | 5 | 7 |
|---|---|---|---|---|---|
| k = | −1.0424E+00 | 3.3506E+01 | −1.5532E+00 | −9.2701E−01 | −5.3417E+01 |
| A4 = | 1.2407E−02 | −2.2197E−02 | −5.4258E−02 | −4.3182E−02 | 1.2247E−02 |
| A6 = | 9.5681E−03 | −1.2676E−02 | 2.9626E−02 | 3.2849E−02 | −1.0986E−01 |
| A8 = | −1.0420E−02 | 2.4959E−02 | −1.4929E−02 | −1.7314E−02 | 1.3797E−01 |
| A10 = | 4.0177E−03 | −2.1939E−02 | 2.2328E−02 | 1.5131E−01 | −1.4514E−01 |
| A12 = | 1.6180E−04 | 8.8005E−03 | −1.3361E−02 | −4.6755E−03 | 6.9308E−02 |
| A14 = | −5.4900E−04 | −1.7184E−03 | 2.9423E−03 | | −1.1550E−02 |

| Surface # | 8 | 9 | 10 | 11 | 12 |
|---|---|---|---|---|---|
| k = | −2.4032E+01 | −2.3333E+01 | 6.2866E+01 | −9.0000E+01 | 7.7159E+00 |
| A4 = | −1.8835E−02 | −4.7959E−02 | −3.0805E−02 | 1.6237E−02 | −2.7550E−01 |
| A6 = | −7.9510E−02 | −4.8034E−02 | −3.6080E−02 | −2.2501E−02 | 2.2793E−01 |
| A8 = | 1.4953E−01 | 1.2751E−01 | 1.1550E−02 | 2.8919E−02 | −1.0691E−01 |
| A10 = | −1.6898E−01 | −1.2235E−01 | 7.3846E−03 | −4.9367E−02 | 1.0353E−02 |
| A12 = | 8.4364E−02 | 5.4476E−02 | −6.6742E−03 | 3.1673E−02 | 9.1617E−03 |
| A14 = | −1.4223E−02 | −9.0006E−03 | 1.3373E−03 | −9.2496E−03 | −3.0166E−03 |
| A16 = | | | | 1.0303E−03 | 2.7071E−04 |

| Surface # | 13 | 14 | 15 | 16 |
|---|---|---|---|---|
| k = | −2.6509E+00 | −8.2234E+01 | −1.3324E+01 | −5.1170E+00 |
| A4 = | −2.9747E−02 | 3.4764E−01 | −3.8913E−01 | −2.4798E−01 |
| A6 = | 5.6389E−02 | −3.9007E−01 | 2.2839E−01 | 1.6662E−01 |
| A8 = | −1.7088E−01 | 2.0575E−01 | −9.3920E−02 | −8.2271E−02 |
| A10 = | 1.6083E−01 | −6.7876E−02 | 3.2325E−02 | 2.8563E−02 |
| A12 = | −9.2986E−02 | 1.3297E−02 | −8.2437E−03 | −6.6058E−03 |
| A14 = | 3.5494E−02 | −1.0418E−03 | 1.3945E−03 | 9.7860E−04 |
| A16 = | −8.6163E−03 | −1.0360E−04 | −1.4602E−04 | −8.8376E−05 |
| A18 = | 1.1975E−03 | 2.6266E−05 | 8.5662E−06 | 4.3997E−06 |
| A20 = | −7.1869E−05 | −1.4455E−06 | −2.1546E−07 | −9.1876E−08 |

In the 8th embodiment, the equation of the aspheric surface profiles of the aforementioned lens elements is the same as the equation from the 1st embodiment. Also, the definitions of the parameters shown in the table below are the same as those stated in the 1st embodiment, but the values for the conditions in the 8th embodiment are as specified below.

| Embodiment 8 | | | | | |
|---|---|---|---|---|---|
| f [mm] | 4.21 | Y31/Y11 | 0.88 | Yc62/Yc72 | 1.24 |
| Fno | 1.53 | Y31/Y12 | 0.92 | EPD/(CT2 + CT3) | 7.73 |
| HFOV [deg.] | 39.4 | Y31/Y21 | 0.98 | CT1/(CT2 + CT3 + CT5) | 1.08 |

-continued

Embodiment 8

| V25 | 2 | Y31/Y22 | 1.02 | CT4/(CT2 + CT3) | 1.62 |
| V2 + V3 | 38.59 | Y31/Y41 | 0.84 | (T12 + T34 + T45 + T56)/(T23 + T67) | 0.61 |
| Nmax | 1.67 | Y31/Y42 | 0.78 | T67/T45 | 1.58 |
| V1/N1 | 41.87 | Y31/Y51 | 0.73 | (R11 + R12)/(R11 − R12) | −2.27 |
| V2/N2 | 11.55 | Y31/Y52 | 0.66 | f/R5 | 1.20 |
| V3/N3 | 11.55 | Y31/Y61 | 0.62 | f/R10 | 0.53 |
| V4/N4 | 36.23 | Y31/Y62 | 0.53 | TL/ImgH | 1.50 |
| V5/N5 | 32.26 | Y31/Y71 | 0.47 | f/f6 | 1.03 |
| V6/N6 | 36.23 | Y31/Y72 | 0.44 | (|P2| + |P3| + |P4| + |P5|)/(|P6| + |P7|) | 0.62 |
| V7/N7 | 36.23 | | | | |

9th Embodiment

Figure 9A:
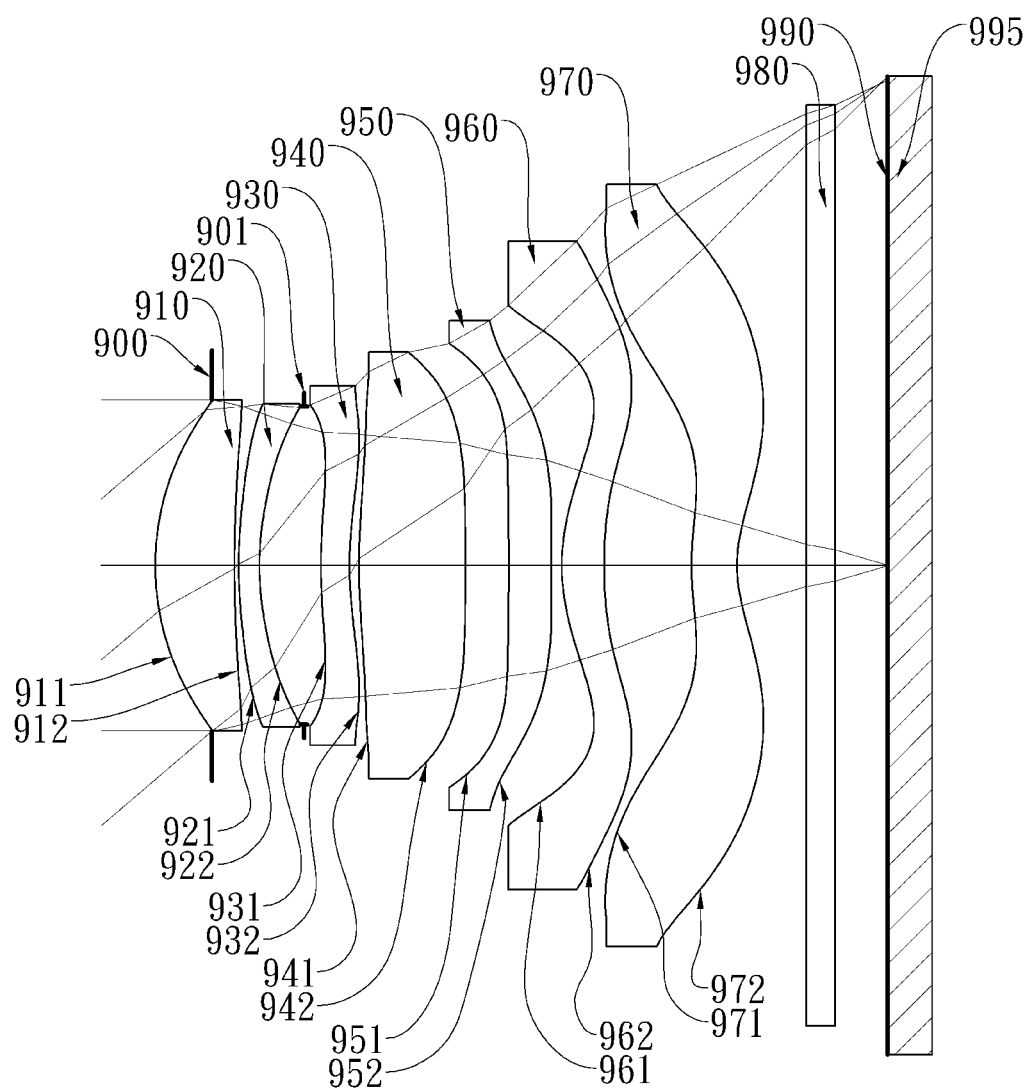
FIG. 9A is a schematic view of an imaging apparatus according to the 9th embodiment of the present disclosure.
Figure 9B:
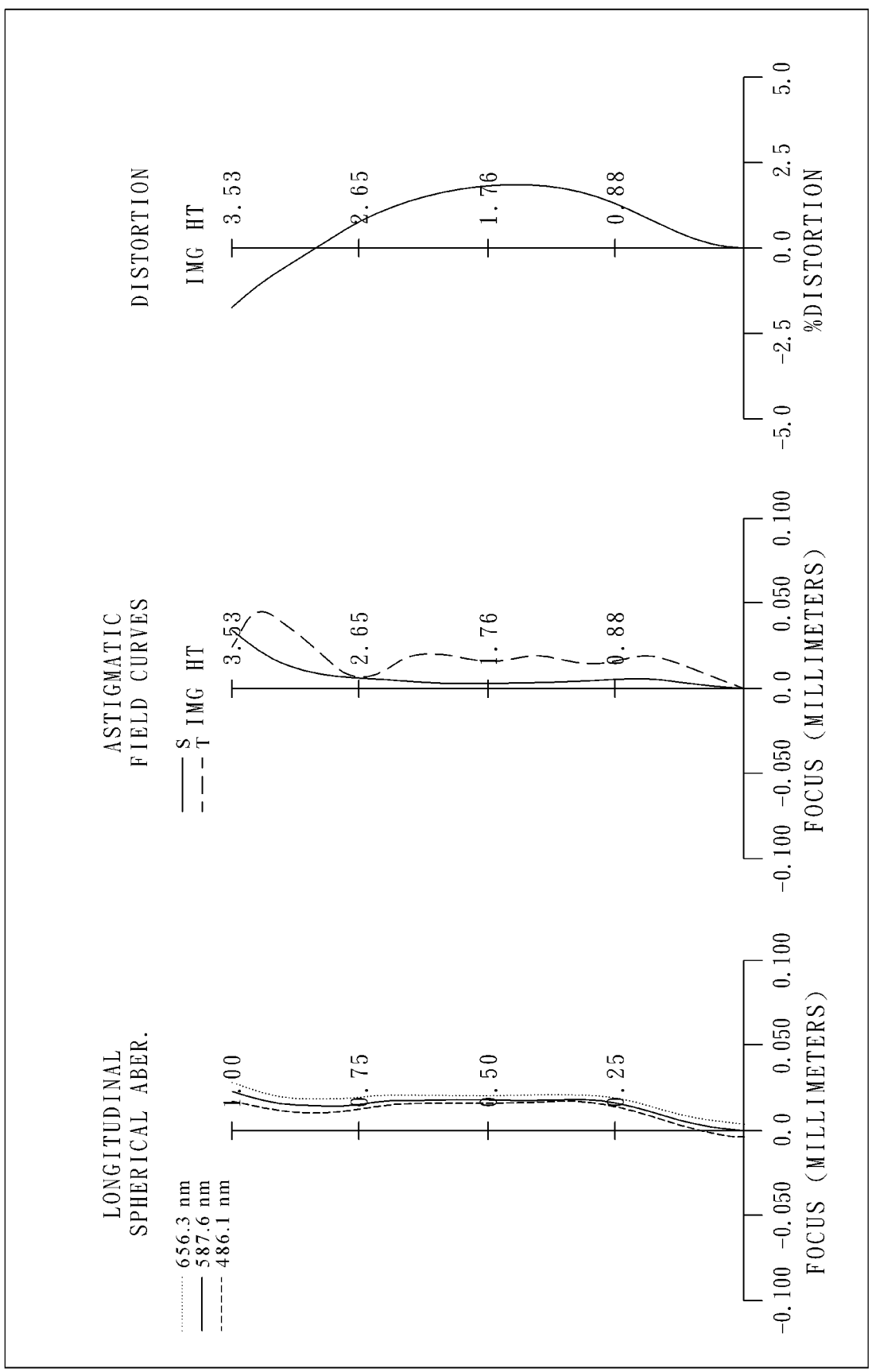
FIG. 9B shows aberration curves of the imaging apparatus according to the 9th embodiment of the present disclosure.

FIG. 9A is a schematic view of an imaging apparatus according to the 9th embodiment of the present disclosure. FIG. 9B shows, in order from left to right, longitudinal spherical aberration curves, astigmatic field curves and a distortion curve of the imaging apparatus according to the 9th embodiment.

In FIG. 9A, the imaging apparatus includes an imaging optical lens assembly (not otherwise herein labeled) of the present disclosure and an image sensor 995. The imaging optical lens assembly includes, in order from an object side to an image side: an aperture stop 900, a first lens element 910, a second lens element 920, a stop 901, a third lens element 930, a fourth lens element 940, a fifth lens element 950, a sixth lens element 960, a seventh lens element 970, an IR cut filter 980, and an image surface 990. The image sensor 995 is disposed on or near the image surface 990 of the imaging optical lens assembly. The optical image capturing lens assembly includes seven lens elements (910, 920, 930, 940, 950, 960 and 970) with no additional lens element disposed between the first lens element 910 and the seventh lens element 970.

The first lens element 910 with positive refractive power has an object-side surface 911 being convex in a paraxial region thereof and an image-side surface 912 being concave in a paraxial region thereof, which are both aspheric, and the first lens element 910 is made of plastic material.

The second lens element 920 with negative refractive power has an object-side surface 921 being convex in a paraxial region thereof and an image-side surface 922 being concave in a paraxial region thereof, which are both aspheric, and the second lens element 920 is made of plastic material.

The third lens element 930 with negative refractive power has an object-side surface 931 being convex in a paraxial region thereof and an image-side surface 932 being concave in a paraxial region thereof, which are both aspheric, and the third lens element 930 is made of plastic material. Moreover, the image-side surface 932 has at least one critical point in an off-axis region thereof.

The fourth lens element 940 with positive refractive power has an object-side surface 941 being convex in a paraxial region thereof and an image-side surface 942 being convex in a paraxial region thereof, which are both aspheric, and the fourth lens element 940 is made of plastic material.

The fifth lens element 950 with negative refractive power has an object-side surface 951 being concave in a paraxial region thereof, an image-side surface 952 being concave in a paraxial region thereof, which are both aspheric, and the fifth lens element 950 is made of plastic material.

The sixth lens element 960 with positive refractive power has an object-side surface 961 being convex in a paraxial region thereof and an image-side surface 962 being concave in a paraxial region thereof, which are both aspheric, and the sixth lens element 960 is made of plastic material.

The seventh lens element 970 with negative refractive power has an object-side surface 971 being convex in a paraxial region thereof and an image-side surface 972 being concave in a paraxial region thereof, which are both aspheric, and the seventh lens element 970 is made of plastic material. Moreover, the image-side surface 972 has at least one critical point in an off-axis region thereof.

The IR cut filter 980 is disposed between the seventh lens element 970 and the image surface 990. Furthermore, the IR cut filter 980 is made of glass material and will not affect the focal length of the imaging optical lens assembly.

Figure 10:
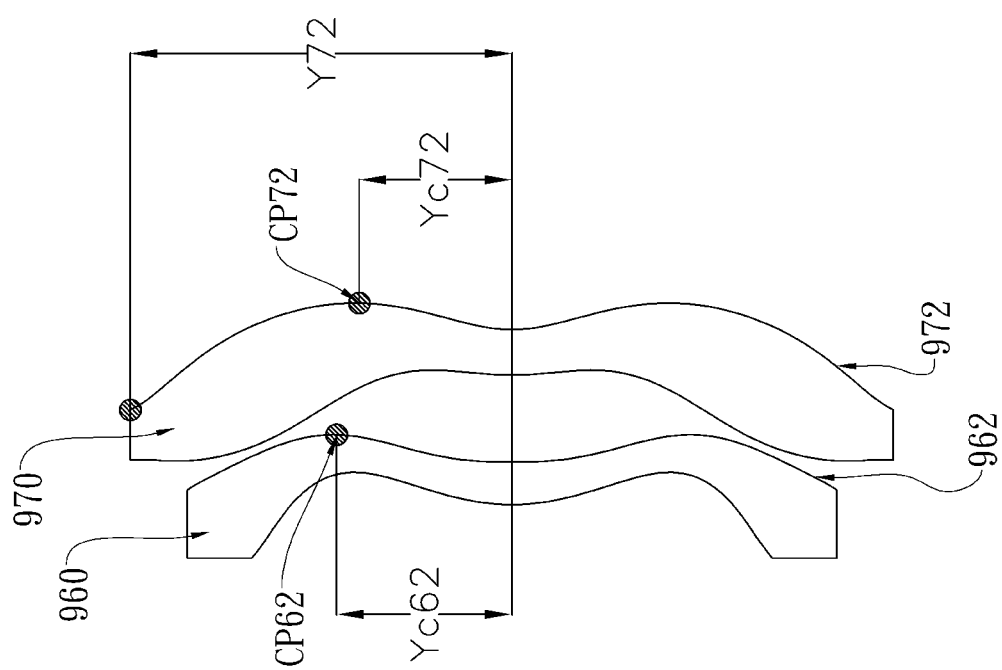
FIG. 10 is a schematic view showing parameters Y72, Yc62 and Yc72 obtained from the example according to the 9th embodiment.

Please refer to FIG. 10, which is a schematic view showing parameters Y72, Yc62 and Yc72 obtained from the example according to the 9th embodiment. A vertical distance between the convex critical point CP62 farthest away from the optical axis within a maximum effective diameter of the image-side surface 962 of the sixth lens element 960 and the optical axis is Yc62 (if the critical point is located on the optical axis, Yc62 is 0). A vertical distance between the convex critical point CP72 farthest away from the optical axis within a maximum effective diameter of the image-side surface 972 of the seventh lens element 970 and the optical axis is Yc72 (if the critical point is located on the optical axis, Yc72 is 0). A maximum effective radius of the image-side surface 972 of the seventh lens element 970 is Y72.

The detailed optical data of the 9th embodiment are shown in TABLE 17, the aspheric surface data are shown in TABLE 18, wherein the units of the curvature radius, the thickness and the focal length are expressed in mm, and HFOV is a half of the maximal field of view.

TABLE 17

(Embodiment 9)
f = 4.20 mm, Fno = 1.75, HFOV = 40.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.410 | | | | |
| 2 | Lens 1 | 1.907 | ASP | 0.573 | Plastic | 1.544 | 55.9 | 4.40 |
| 3 | | 8.423 | ASP | 0.030 | | | | |
| 4 | Lens 2 | 3.339 | ASP | 0.150 | Plastic | 1.639 | 23.5 | −10.18 |
| 5 | | 2.168 | ASP | 0.323 | | | | |
| 6 | Stop | Plano | | 0.122 | | | | |
| 7 | Lens 3 | 4.108 | ASP | 0.206 | Plastic | 1.671 | 19.3 | −12.69 |
| 8 | | 2.715 | ASP | 0.069 | | | | |
| 9 | Lens 4 | 4.987 | ASP | 0.769 | Plastic | 1.544 | 55.9 | 8.08 |

TABLE 17-continued (Embodiment 9)
f = 4.20 mm, Fno = 1.75, HFOV = 40.5 deg.

| Surface # | | Curvature Radius | | Thickness | Material | Index | Abbe # | Focal Length |
|---|---|---|---|---|---|---|---|---|
| 10 | | −35.016 | ASP | 0.313 | | | | |
| 11 | Lens 5 | −30.066 | ASP | 0.307 | Plastic | 1.560 | 43.3 | −15.20 |
| 12 | | 11.923 | ASP | 0.076 | | | | |
| 13 | Lens 6 | 1.515 | ASP | 0.307 | Plastic | 1.544 | 55.9 | 4.17 |
| 14 | | 4.233 | ASP | 0.630 | | | | |
| 15 | Lens 7 | 2.057 | ASP | 0.329 | Plastic | 1.544 | 55.9 | −4.28 |
| 16 | | 1.031 | ASP | 0.500 | | | | |
| 17 | IR cut filter | Plano | | 0.210 | Glass | 1.517 | 64.2 | — |
| 18 | | Plano | | 0.377 | | | | |
| 19 | Image surface | Plano | | — | | | | |

Note:
Reference wavelength is d-line 587.6 nm
The effective radius of Surface 6 is 1.150 mm

TABLE 16

Aspheric Coefficients

| Surface # | 2 | 3 | 4 | 5 | 7 |
|---|---|---|---|---|---|
| k = | −6.8901E−01 | 3.5820E+01 | −1.7632E+00 | −7.0952E−01 | −9.0000E+01 |
| A4 = | 1.5706E−02 | −8.0125E−02 | −1.4615E−01 | −8.7217E−02 | 8.6773E−03 |
| A6 = | −2.5985E−03 | 1.5605E−01 | 2.5575E−01 | 1.1647E−01 | −1.6166E−01 |
| A8 = | 1.2345E−02 | −2.0104E−01 | −2.7360E−01 | −6.9281E−02 | 2.1060E−01 |
| A10 = | −2.1716E−02 | 1.5577E−01 | 2.1504E−01 | 2.6212E−02 | −2.1791E−01 |
| A12 = | 1.7447E−02 | −6.8998E−02 | −1.0430E−01 | −4.9719E−03 | 1.1836E−01 |
| A14 = | −5.7817E−03 | 1.1846E−02 | 2.2817E−02 | | −2.7010E−02 |

| Surface # | 8 | 9 | 10 | 11 | 12 |
|---|---|---|---|---|---|
| k = | −2.7970E+01 | −1.1733E+01 | −9.0000E+01 | −9.0000E+01 | 3.3421E+01 |
| A4 = | −5.7300E−03 | −5.9177E−02 | −2.8535E−02 | 1.8421E−03 | −3.0039E−01 |
| A6 = | −1.1915E−01 | −1.4554E−02 | −2.6049E−02 | 2.4580E−02 | 3.2988E−01 |
| A8 = | 1.7225E−01 | 8.3785E−02 | −1.2262E−02 | −6.6265E−02 | −2.5657E−01 |
| A10 = | −1.6230E−01 | −8.5964E−02 | 2.9561E−02 | 2.0944E−02 | 1.0962E−01 |
| A12 = | 7.8370E−02 | 4.0167E−02 | −1.6103E−02 | 9.3129E−03 | −2.3372E−02 |
| A14 = | −1.3425E−02 | −7.0596E−03 | 2.7654E−03 | −6.7196E−03 | 2.1190E−03 |
| A16 = | | | | 1.0610E−03 | −3.9119E−05 |

| Surface # | 13 | 14 | 15 | 16 |
|---|---|---|---|---|
| k = | −2.7162E+00 | −5.0782E+01 | −1.3946E+01 | −4.8364E+00 |
| A4 = | −5.6042E−02 | 2.9956E−01 | −3.3619E−01 | −2.0712E−01 |
| A6 = | 6.7432E−02 | −3.7008E−01 | 1.8421E−01 | 1.2977E−01 |
| A8 = | −1.8119E−01 | 2.1899E−01 | −7.6134E−02 | −6.0223E−02 |
| A10 = | 1.8133E−01 | −8.4620E−02 | 2.8756E−02 | 1.9946E−02 |
| A12 = | −1.1264E−01 | 2.2340E−02 | −8.1963E−03 | −4.5791E−03 |
| A14 = | 4.6780E−02 | −3.9283E−03 | 1.5314E−03 | 7.0427E−04 |
| A16 = | −1.2547E−02 | 4.3262E−04 | −1.7464E−04 | −6.9062E−05 |
| A18 = | 1.9365E−03 | −2.6461E−05 | 1.1027E−05 | 3.9051E−06 |
| A20 = | −1.2841E−04 | 6.6460E−07 | −2.9588E−07 | −9.6814E−08 |

In the 9th embodiment, the equation of the aspheric surface profiles of the aforementioned lens elements is the same as the equation from the 1st embodiment. Also, the definitions of the parameters shown in the table below are the same as those stated in the 1st embodiment, but the values for the conditions in the 9th embodiment are as specified below.

| Embodiment 9 | | | | | |
|---|---|---|---|---|---|
| f [mm] | 4.20 | Y31/Y11 | 0.97 | Yc62/Yc72 | 1.14 |
| Fno | 1.75 | Y31/Y12 | 1.01 | EPD/(CT2 + CT3) | 6.74 |
| HFOV [deg.] | 40.5 | Y31/Y21 | 0.99 | CT1/(CT2 + CT3 + CT5) | 0.86 |
| V25 | 2 | Y31/Y22 | 1.02 | CT4/(CT2 + CT3) | 2.16 |
| V2 + V3 | 42.79 | Y31/Y41 | 0.83 | (T12 + T34 + T45 + T56)/(T23 + T67) | 0.45 |
| Nmax | 1.67 | Y31/Y42 | 0.75 | T67/T45 | 2.01 |
| V1/N1 | 36.23 | Y31/Y51 | 0.72 | (R11 + R12)/(R11 − R12) | −2.11 |
| V2/N2 | 14.34 | Y31/Y52 | 0.66 | f/R5 | 1.02 |
| V3/N3 | 11.55 | Y31/Y61 | 0.62 | f/R10 | 0.35 |
| V4/N4 | 36.23 | Y31/Y62 | 0.49 | TL/ImgH | 1.50 |
| V5/N5 | 27.78 | Y31/Y71 | 0.45 | f/f6 | 1.01 |
| V6/N6 | 36.23 | Y31/Y72 | 0.42 | (|P2| + |P3| + |P4| + |P5|)/(|P6| + |P7|) | 0.77 |
| V7/N7 | 36.23 | | | | |

10th Embodiment

Figure 11:
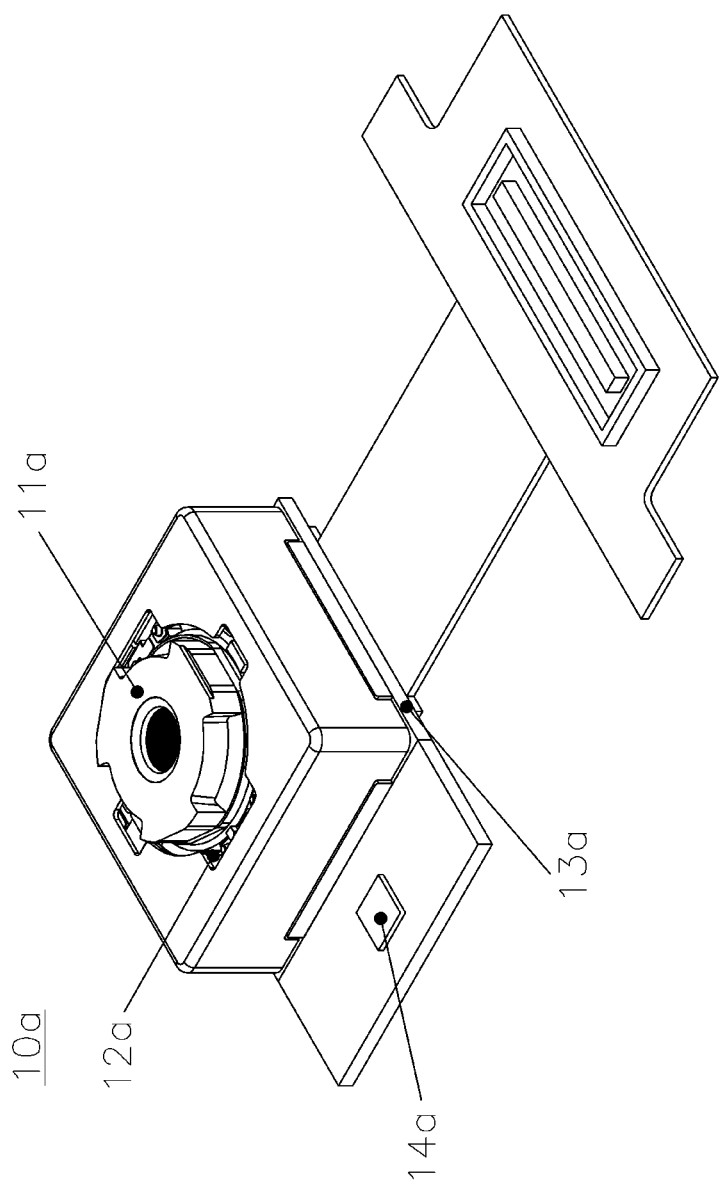
FIG. 11 is a schematic view of an imaging apparatus according to the 10th embodiment of the present disclosure.

FIG. 11 is a schematic block diagram of an imaging apparatus 10a according to the 10th embodiment. In the present embodiment, the imaging apparatus 10a is a camera module. The imaging apparatus 10a includes a lens unit 11a, a driving device 12a, and an image sensor 13a. The lens unit 11a includes the imaging optical lens assembly of the 1st embodiment, and a lens barrel (not otherwise herein labeled) for carrying the imaging optical lens assembly. The imaging apparatus 10a retrieves light and generates an image in the lens unit 11a, adjusts the focus by the driving device 12a to photograph on the image sensor 13a, and outputs the image data thereafter.

The driving device 12a may be an auto-focus module driven by a voice coil motor (VCM), a micro electro-mechanical system (MEMS), a piezoelectric system, shape memory metal or other driving systems. The driving device 12a allows the lens unit 11a to obtain a better imaging position, provide a clear image of an imaged object 30 (Please refer to FIG. 12B) at different object distances.

The imaging apparatus 10a may be configured to equip the image sensor 13a (e.g., CMOS, CCD) with high sensitivity and low noise on the image surface of the imaging optical lens assembly to provide high definition images obtained from the imaging optical lens assembly.

In addition, the imaging apparatus 10a may further include an image stabilizer 14a, which may be a dynamic sensing element such as an accelerometer, a gyro sensor or a Hall Effect sensor. The image stabilizer 14a in the 11th embodiment is a gyro sensor but is not limited thereto. By adjusting the imaging optical lens assembly in different axial directions to compensate image blurs due to motions during exposures, the image quality under dynamic and low-light circumstances can be further improved and enhanced image compensation functions such as optical image stabilization (OIS) or electronic image stabilization (EIS) can also be provided.

11th Embodiment

Figure 12A:
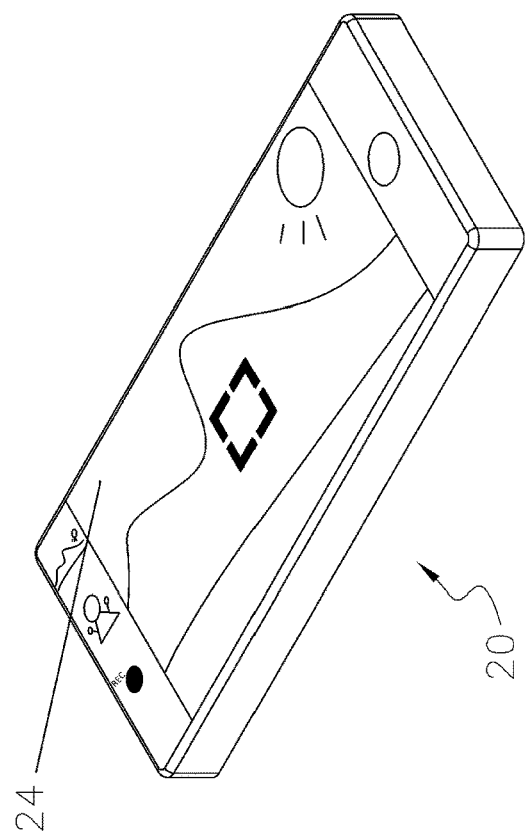
FIG. 12A is a 3-dimensional schematic view of an electronic device according to the 11th embodiment of the present disclosure.
Figure 12A:
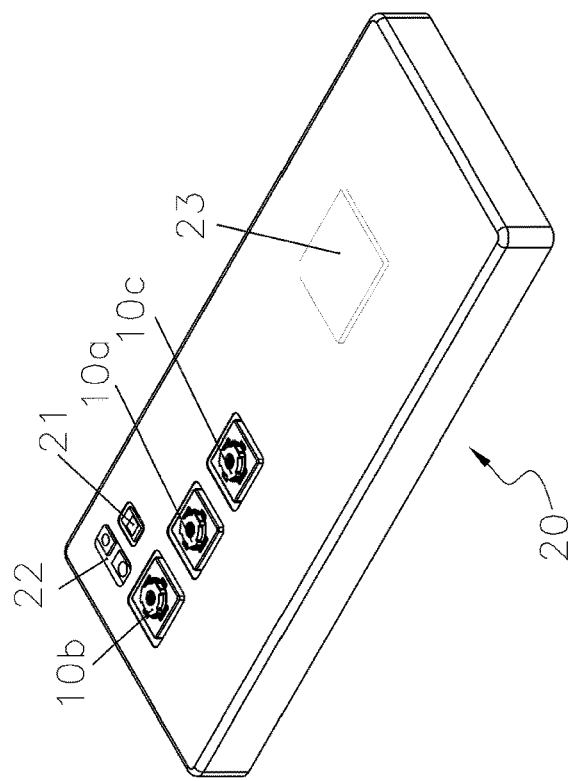
Figure 12B:
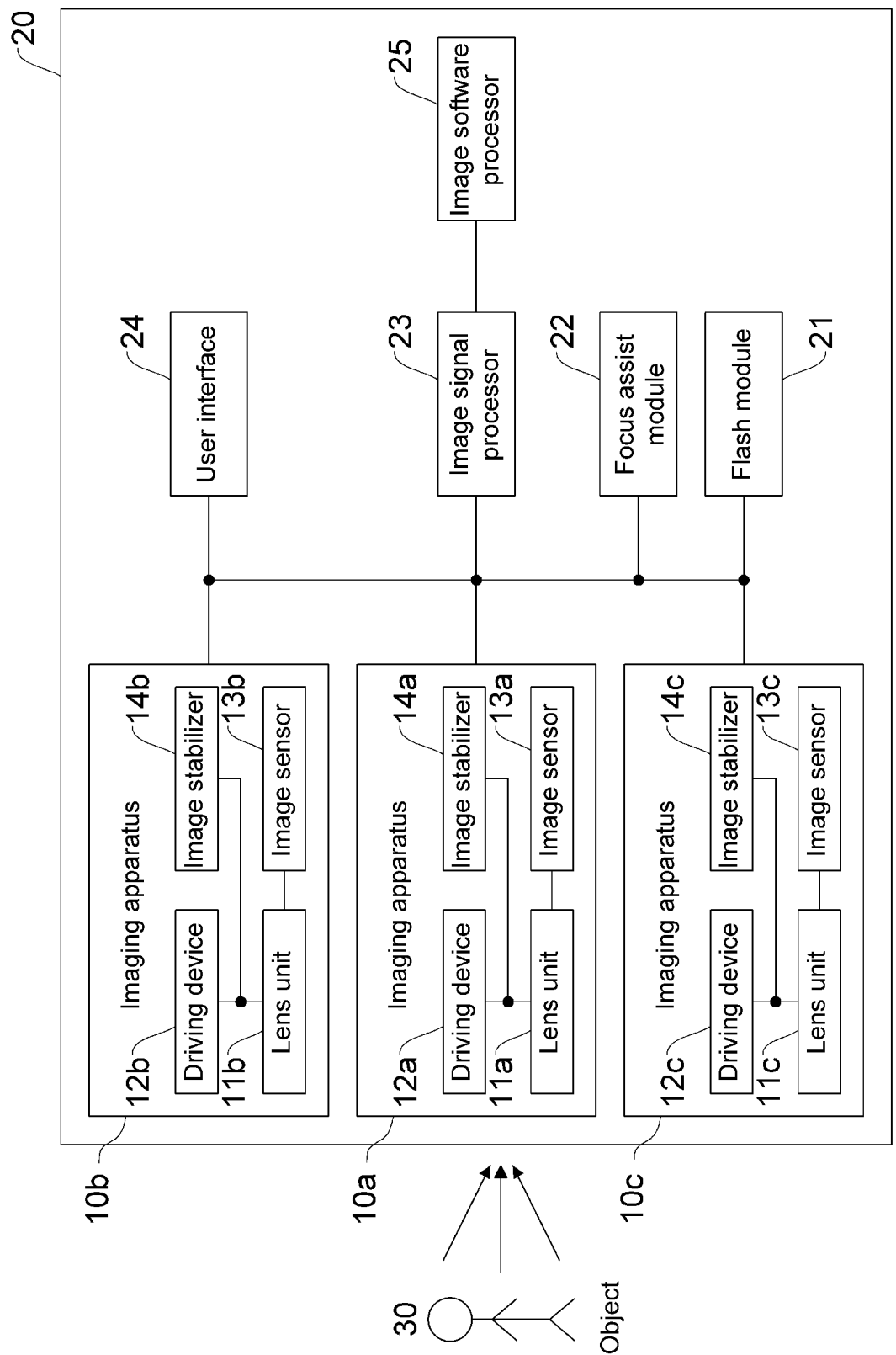
FIG. 12B shows a block diagram of the electronic device according to the 11th embodiment of the present disclosure.

Please refer to FIG. 12A and FIG. 12B. FIG. 12A is a 3-dimensional schematic view of an electronic device 20 according to the 11th embodiment. FIG. 12B is a schematic view of the electronic device 20 shown in FIG. 12A. In the present embodiment, the electronic device 20 is a smartphone. The electronic device 20 includes the imaging apparatus 10a of the 10th embodiment, a flash module 21, a focus assist module 22, an image signal processor 23, a user interface 24, and an image software processor 25 (Please refer to FIG. 12B). In the 11th embodiment, the electronic device 20 includes three imaging apparatus 10a, 10b, 10c, wherein the imaging apparatus 10a includes a main lens, the imaging apparatus 10b includes a wide-angle lens, and the imaging apparatus 10c includes a telephoto lens, but the disclosure is not limited thereto. For example, three imaging apparatus may be the imaging apparatus 10a, the imaging apparatus 10a, the imaging apparatus 10b, or other combinations. In addition, the electronic device 20 may include only one imaging apparatus 10a, or may include two or more imaging apparatus.

When a user utilizes the user interface 24 to capture images of the object 30 (Please refer to FIG. 12B), the electronic device 20 retrieves the light and captures an image via at least one of the imaging apparatus 10a, the imaging apparatus 10b, the imaging apparatus 10c, while triggering the flash module 21 to compensate in case of insufficient amount of light, and focusing instantly according to the distance information of the object 30 provided by the focus assist module 22. The images are further optimized by the image signal processor 23 to enhance the image quality generated by the imaging optical lens assembly. The focus assist module 22 may adopt an infrared or laser focus assist system to achieve quick focusing. The user interface 24 may adopt a touch screen or a physical shutter button with various functions of the image software processor 25 to perform image capturing and image processing.

The imaging apparatus 10a of the present disclosure is not limited to utilizations in the smartphone. The imaging apparatus 10a may be installed in a system of moving focus and features in excellent aberration corrections and image quality. For example, the imaging apparatus 10a may be applied in various applications such as car electronics, drones, smart electronic products, tablet computers, wearable devices, medical devices, precision instruments, surveillance cameras, portable video recorders, identification systems, multi-lens devices, somatosensory detections, virtual reality systems, motion devices, home intelligent auxiliary systems and other electronic devices. The aforementioned electronic apparatus is merely exemplary of practical use of the present disclosure and does not limit the scope of application of the imaging apparatus of the present disclosure.

The aforementioned exemplary figures of different electronic devices are only exemplary for showing the imaging apparatus of the present disclosure installed in an electronic device, and the present disclosure is not limited thereto. Preferably, the electronic device can further include a control unit, a display unit, a storage unit, a random access memory unit (RAM) or a combination thereof.

The foregoing description, for purpose of explanation, has been described with reference to specific embodiments. It is to be noted that TABLES 1-18 show different data of the different embodiments; however, the data of the different embodiments are obtained from experiments. The embodiments were chosen and described in order to best explain the principles of the disclosure and its practical applications, and thereby to enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging optical lens assembly, comprising seven lens elements, the seven lens elements being, in order from an object side to an image side:

a first lens element, a second lens element, a third lens element, a fourth lens element, a fifth lens element, a sixth lens element, and a seventh lens element; wherein the first lens element with positive refractive power has an object-side surface being convex in a paraxial region thereof;

the second lens element has negative refractive power; and the seventh lens element with negative refractive power has an image-side surface being concave in a paraxial region thereof and at least one critical point in an off-axis region thereof, while the image-side surface and an object-side surface of the seventh lens element being both aspheric;

wherein an Abbe number of the second lens element is V2, an Abbe number of the third lens element is V3, a focal length of the imaging optical lens assembly is f, a curvature radius of an object-side surface of the third lens element is R5, a curvature radius of an image-side surface of the fifth lens element is R10, an axial distance between the fourth lens element and the fifth lens element on the optical axis is T45, an axial distance between the sixth lens element and the seventh lens element is T67, an axial distance between the first lens element and an image surface is TL, a maximum image height of the imaging optical lens assembly is ImgH, and the following conditions are satisfied:

$V2+V3 \leq 44.7;$ $0 \leq f/R5;$ $0 \leq f/R10;$ $T67/T45<8.0;$ and $TL/ImgH \leq 1.62.$ 2. The imaging optical lens assembly of claim 1, wherein the Abbe number of the second lens element is V2, the Abbe number of the third lens element is V3, and the following condition is satisfied:

$20<V2+V3<50.$

3. The imaging optical lens assembly of claim 1, wherein a vertical distance between a convex critical point farthest away from the optical axis within a maximum effective diameter of an image-side surface of the sixth lens element and the optical axis is Yc62; a vertical distance between a convex critical point farthest away from the optical axis within a maximum effective diameter of the image-side surface of the seventh lens element and the optical axis is Yc72, and the following condition is satisfied:

$0.20<Yc62/Yc72<1.70.$

4. The imaging optical lens assembly of claim 1, wherein the sixth lens element has positive refractive power.

5. The imaging optical lens assembly of claim 1, wherein a central thickness of the second lens element is CT2, a central thickness of the third lens element is CT3, a central thickness of the fourth lens element is CT4, and the following condition is satisfied:

$0.75<CT4/(CT2+CT3)<2.5.$

6. The imaging optical lens assembly of claim 1, wherein the fourth lens element has an object-side surface being convex in a paraxial region thereof.

7. The imaging optical lens assembly of claim 1, wherein an Abbe number of one lens elements is V, a refractive index of the said lens element is N, an Abbe number of the first element is V1, and the following conditions are satisfied:

$50<V1;$ and at least one of the lens elements satisfies $8.0<V/N<12.5.$

8. The imaging optical lens assembly of claim 1, wherein the focal length of the imaging optical lens assembly is f, a focal length of the sixth lens element is f6, and the following condition is satisfied:

$0.50<f/f6<1.80.$

9. The imaging optical lens assembly of claim 1, wherein an axial distance between the first lens element and the second lens element is T12, an axial distance between the second lens element and the third lens element is T23, an axial distance between the third lens element and the fourth lens element is T34, the axial distance between the fourth lens element and the fifth lens element is T45, an axial distance between the fifth lens element and the sixth lens element is T56, the axial distance between the sixth lens element and the seventh lens element is T67, and the following condition is satisfied:

$(T12+T34+T45+T56)/(T23+T67)<1.0.$

10. The imaging optical lens assembly of claim 1, wherein the third lens element has an image-side surface being concave in a paraxial region thereof, and the image-side surface of the third lens element has at least one critical point in an off-axis region thereof.

11. The imaging optical lens assembly of claim 1, wherein a curvature radius of an object-side surface of the sixth lens element is R11, a curvature radius of an image-side surface of the sixth lens element is R12, and the following condition is satisfied:

$(R11+R12)/(R11-R12)<0.65.$

12. The imaging optical lens assembly of claim 1, wherein the second lens element has an object-side surface being convex in a paraxial region thereof and an image-side surface being concave in a paraxial region thereof.

13. The imaging optical lens assembly of claim 1, wherein a maximum effective radius of the object-side surface of the first lens element is Y11, a maximum effective radius of an image-side surface of the first lens element is Y12, a maximum effective radius of an object-side surface of the second lens element is Y21, a maximum effective radius of an image-side surface of the second lens element is Y22, a maximum effective radius of the object-side surface of the third lens element is Y31, a maximum effective radius of an object-side surface of the fourth lens element is Y41, a maximum effective radius of an image-side surface of the fourth lens element is Y42, a maximum effective radius of an object-side surface of the fifth lens element is Y51, a maximum effective radius of the image-side surface of the fifth lens element is Y52, a maximum effective radius of an object-side surface of the sixth lens element is Y61, a maximum effective radius of an image-side surface of the sixth lens element is Y62, a maximum effective radius of the object-side surface of the seventh lens element is Y71, a maximum effective radius of the image-side surface of the seventh lens element is Y72, and the following conditions are satisfied:

$Y31/Y11<1.0;$ $Y31/Y12<1.0;$ $Y31/Y21<1.0;$ $Y31/Y22<1.0;$ $Y31/Y41<1.0;$ $Y31/Y42<1.0;$ $Y31/Y51<1.0;$ $Y31/Y52<1.0;$ $Y31/Y61<1.0;$ $Y31/Y62<1.0;$ $Y31/Y71<1.0;$ and $Y31/Y72<1.0.$ 14. The imaging optical lens assembly of claim 1, wherein a total number of the lens elements having an Abbe number less than 25 is V25, and the following condition is satisfied:

$$3 \leq V25.$$

15. The imaging optical lens assembly of claim 1, wherein an Abbe number of a lens element is V, a refractive index of the said lens element is N, and at least one of the seven lens elements satisfies the following condition:

$$8.0 < V/N < 12.0.$$

16. The imaging optical lens assembly of claim 1, wherein an entrance pupil diameter of the imaging optical lens assembly is EPD, a central thickness of the second lens element is CT2, a central thickness of the third lens element is CT3, and the following condition is satisfied:

$$4.50 < EPD/(CT2+CT3) < 9.0.$$

17. The imaging optical lens assembly of claim 1, wherein a highest refractive index of a lens element among the seven lens elements is Nmax, and the following condition is satisfied:

$$1.650 < Nmax < 1.750.$$

18. The imaging optical lens assembly of claim 1, wherein a central thickness of the first lens element is CT1, a central thickness of the second lens element is CT2, a central thickness of the third lens element is CT3, a central thickness of the fifth lens element is CT5, and the following condition is satisfied:

$$0.75 < CT1/(CT2+CT3+CT5) < 2.0.$$

19. The imaging optical lens assembly of claim 1, wherein the focal length of the imaging optical lens assembly is f, a focal length of a lens element is fx, a parameter of the refractive power of the said lens element is Px, and the following conditions are satisfied:

$$Px = f/fx, \ x = 2\sim7; \text{ and}$$

$$0.25 < (|P2|+|P3|+|P4|+|P5|)/(|P6|+|P7|) < 1.0.$$

20. The imaging optical lens assembly of claim 1, wherein an f-number of the imaging optical lens assembly is Fno, the axial distance between the object-side surface of the first lens element and the image surface is TL, the maximum image height of the imaging optical lens assembly is ImgH, the Abbe number of the second lens element is V2, the Abbe number of the third lens element is V3, and the following conditions are satisfied:

$$1.0 < Fno \leq 1.70;$$

$$1.0 < TL/ImgH \leq 1.53; \text{ and}$$

$$V2 + V3 \leq 42.8.$$

21. An imaging apparatus, comprising the imaging optical lens assembly of claim 1 and an image sensor disposed on the image surface of the imaging optical lens assembly.

22. An electronic device, comprising the imaging apparatus of claim 21.

23. An imaging optical lens assembly, comprising seven lens elements, the seven lens elements being, in order from an object side to an image side: a first lens element, a second lens element, a third lens element, a fourth lens element, a fifth lens element, a sixth lens element, and a seventh lens element;

wherein the first lens element has positive refractive power and an object-side surface being convex in a paraxial region thereof;

the second lens element has negative refractive power; and, the seventh lens element with negative refractive power has an object-side surface being convex in a paraxial region thereof, an image-side surface being concave in a paraxial region and having at least one critical point in an off-axis region thereof; the image-side surface and the object-side surface of the seventh lens element are both aspheric;

wherein an Abbe number of the second lens element is V2, an Abbe number of the third lens element is V3, a focal length of the imaging optical lens assembly is f, a curvature radius of an object-side surface of the third lens element is R5, a curvature radius of an image-side surface of the fifth lens element is R10, an axial distance between the first lens element and an image surface is TL, a maximum image height of the imaging optical lens assembly is ImgH, and the following conditions are satisfied:

$$V2+V3 \leq 42.8;$$

$$0 \leq f/R5;$$

$$0 \leq f/R10, \text{ and}$$

$$TL/ImgH \leq 1.50.$$

24. The imaging optical lens assembly of claim 23, wherein a maximum effective radius of the object-side surface of the first lens element is Y11, a maximum effective radius of an image-side surface of the first lens element is Y12, a maximum effective radius of an object-side surface of the second lens element is Y21, a maximum effective radius of an image-side surface of the second lens element is Y22, a maximum effective radius of the object-side surface of the third lens element is Y31, a maximum effective radius of an object-side surface of the fourth lens element is Y41, a maximum effective radius of an image-side surface of the fourth lens element is Y42, a maximum effective radius of an object-side surface of the fifth lens element is Y51, a maximum effective radius of the image-side surface of the fifth lens element is Y52, a maximum effective radius of an object-side surface of the sixth lens element is Y61, a maximum effective radius of an image-side surface of the sixth lens element is Y62, a maximum effective radius of the object-side surface of the seventh lens element is Y71, a maximum effective radius of the image-side surface of the seventh lens element is Y72, and the following conditions are satisfied:

$$Y31/Y11 < 1.0;$$

$$Y31/Y12 < 1.0;$$

$$Y31/Y21 < 1.0;$$

$$Y31/Y22 < 1.0;$$

$$Y31/Y41 < 1.0;$$

$$Y31/Y42 < 1.0;$$

$$Y31/Y51 < 1.0;$$

$$Y31/Y52 < 1.0;$$

$$Y31/Y61 < 1.0;$$

$Y31/Y62<1.0;$ $Y31/Y71<1.0;$ and $Y31/Y72<1.0.$

25. The imaging optical lens assembly of claim 23, wherein a highest refractive index of a lens element among the seven lens elements is Nmax, and the following condition is satisfied:

$1.650<Nmax<1.750.$

26. The imaging optical lens assembly of claim 23, wherein the focal length of the imaging optical lens assembly is f, a focal length of a lens element is fx, a parameter of the refractive power of the said lens element is Px, and the following conditions are satisfied:

$Px=f/fx,\ x=2\sim7;$ and $0.25<(|P2|+|P3|+|P4|+|P5|)/(|P6|+|P7|)<1.0.$

27. The imaging optical lens assembly of claim 23, wherein a central thickness of the second lens element is CT2, a central thickness of the third lens element is CT3, a central thickness of the fourth lens element is CT4, and the following condition is satisfied:

$0.75<CT4/(CT2+CT3)<2.0.$

28. The imaging optical lens assembly of claim 23, wherein a total number of the lens elements having an Abbe number less than 25 is V25, and the following condition is satisfied:

$3\leq V25.$

29. The imaging optical lens assembly of claim 23, wherein an entrance pupil diameter of the imaging optical lens assembly is EPD, a central thickness of the second lens element is CT2, a central thickness of the third lens element is CT3, and the following condition is satisfied:

$4.50<EPD/(CT2+CT3)<9.0.$

30. The imaging optical lens assembly of claim 23, wherein an Abbe number of a lens element is V and a refractive index of the said lens element is N, and at least one lens element of the seven lens elements satisfies the following condition:

$8.0<V/N<12.0.$

* * * * *